(12) United States Patent
Hamada et al.

(10) Patent No.: US 11,892,095 B2
(45) Date of Patent: Feb. 6, 2024

(54) VALVE DEVICE

(71) Applicant: DENSO CORPORATION, Kariya (JP)

(72) Inventors: Takuya Hamada, Kariya (JP); Hiroki Shimada, Kariya (JP); Akira Higuchi, Kariya (JP); Takehito Mizunuma, Kariya (JP); Syota Kimura, Kariya (JP); Ryou Sano, Kariya (JP)

(73) Assignee: DENSO CORPORATION, Kariya (JP)

( * ) Notice: Subject to any disclaimer, the term of this patent is extended or adjusted under 35 U.S.C. 154(b) by 260 days.

(21) Appl. No.: 17/540,979

(22) Filed: Dec. 2, 2021

(65) Prior Publication Data

US 2022/0090700 A1 Mar. 24, 2022

Related U.S. Application Data

(63) Continuation of application No. PCT/JP2020/020922, filed on May 27, 2020.

(30) Foreign Application Priority Data

Jun. 11, 2019 (JP) ................................. 2019-108987

(51) Int. Cl.
*F16K 31/53* (2006.01)
*B60H 1/00* (2006.01)
(Continued)

(52) U.S. Cl.
CPC ....... *F16K 31/535* (2013.01); *B60H 1/00328* (2013.01); *B60H 1/00485* (2013.01);
(Continued)

(58) Field of Classification Search
CPC ........ F16K 31/44; F16K 31/53; F16K 31/535; F16K 31/047; F16K 11/074;
(Continued)

(56) References Cited

U.S. PATENT DOCUMENTS 2,051,155 A 8/1936 Staegemann
3,964,728 A * 6/1976 Flider ................... F16K 31/563
251/313

(Continued)

FOREIGN PATENT DOCUMENTS

CN 108758005 A 11/2018
JP 11-62631 A 3/1999
(Continued)

*Primary Examiner* — William M McCalister
(74) *Attorney, Agent, or Firm* — Nixon & Vanderhye P.C.

(57) ABSTRACT

A valve device includes: a driving source making rotational motion; a rotated part provided rotatably around a predetermined axis; and a fluid passage portion having a flow hole for passing a fluid. The valve device further includes: a gear mechanism having gears to transmit rotational motion of the driving source to the rotated part by engagement between the gears to rotate the rotated part; and a biasing part biasing the rotated part toward one side in a circumferential direction with the predetermined axis at the center. The rotated part includes a rotor increasing or reducing an opening of the flow hole in conjunction with rotation of the rotated part and is rotated according to rotational motion of the driving source while being biased toward the one side in the circumferential direction by the biasing part.

11 Claims, 33 Drawing Sheets

(51) Int. Cl.
*F16K 31/04* (2006.01)
*F16K 11/074* (2006.01)
*F16K 11/085* (2006.01)
*F16K 11/087* (2006.01)
*F16K 31/44* (2006.01)

(52) U.S. Cl.
CPC .......... *F16K 11/074* (2013.01); *F16K 11/085* (2013.01); *F16K 11/0876* (2013.01); *F16K 31/047* (2013.01); *F16K 31/44* (2013.01); *F16K 31/53* (2013.01); *B60H 2001/00307* (2013.01); *Y10T 137/86533* (2015.04); *Y10T 137/86863* (2015.04); *Y10T 137/86871* (2015.04)

(58) Field of Classification Search
CPC ...... F16K 11/085; F16K 11/0876; F16K 3/08; F16K 3/314; F16K 27/04; F16K 27/045; F16K 27/048; B60H 1/00328; B60H 1/00485; B60H 2001/00307; Y10T 137/86533; Y10T 137/86863; Y10T 137/86871
USPC ............... 251/248, 313; 137/625.15, 625.46, 137/625.47
See application file for complete search history.

(56) References Cited

U.S. PATENT DOCUMENTS

| | | | | |
|---|---|---|---|---|
| 4,046,350 A * | 9/1977 | Massey | ............... | F16K 31/1635 137/556 |
| 4,940,292 A * | 7/1990 | Bezos | ................... | B60T 13/665 303/68 |
| 5,809,780 A * | 9/1998 | de Jong | ................. | F16K 31/53 251/249 |
| 6,626,203 B1 * | 9/2003 | Schneider | ............. | F16K 11/074 251/288 |
| 7,770,557 B2 * | 8/2010 | Ikeda | ...................... | F02D 9/106 251/305 |
| 8,136,552 B2 * | 3/2012 | Carignan | ............... | F16K 27/044 251/95 |
| 9,803,759 B2 | 10/2017 | Bachofer | | |
| 10,920,894 B2 * | 2/2021 | Wu | ....................... | F16K 27/045 |
| 10,941,871 B2 * | 3/2021 | Yu | ......................... | F16K 27/048 |
| 10,982,780 B2 * | 4/2021 | Yu | ......................... | F16K 31/535 |
| 2005/0150547 A1 * | 7/2005 | Ballenger | ............... | F02C 9/263 137/68.19 |
| 2005/0183705 A1 * | 8/2005 | Nanba | .................... | F02M 26/50 123/568.24 |
| 2006/0144450 A1 * | 7/2006 | Hasegawa | ......... | H01M 8/04089 137/625.46 |
| 2009/0266432 A1 * | 10/2009 | Chen | ........................ | F16K 3/04 137/625.34 |
| 2011/0073191 A1 * | 3/2011 | Gray, Jr. | ............... | G05D 7/0641 251/336 |
| 2014/0238517 A1 * | 8/2014 | Chen | .................... | F16K 11/0743 137/605 |
| 2014/0345730 A1 * | 11/2014 | Chang | ................... | F16K 11/074 137/625.17 |
| 2015/0159595 A1 * | 6/2015 | Keefover | ............... | F02M 26/54 123/568.24 |
| 2015/0233476 A1 * | 8/2015 | Bachofer | ............... | F16J 15/447 251/319 |
| 2016/0102775 A1 * | 4/2016 | Shakkour | ............... | F16K 31/043 251/129.12 |
| 2016/0258548 A1 * | 9/2016 | Bartolo | .................. | F16K 11/052 |
| 2017/0009894 A1 | 1/2017 | Seko et al. | | |
| 2017/0089474 A1 * | 3/2017 | Zhan | .................... | F16K 11/0743 |
| 2018/0202575 A1 * | 7/2018 | Telep | ...................... | F16K 31/53 |
| 2018/0264913 A1 | 9/2018 | Enomoto et al. | | |
| 2018/0340618 A1 | 11/2018 | Seko et al. | | |
| 2019/0017612 A1 | 1/2019 | Ikemoto et al. | | |
| 2019/0186641 A1 | 6/2019 | Seko et al. | | |
| 2019/0301619 A1 * | 10/2019 | Wu | ........................ | B23P 15/001 |
| 2019/0309859 A1 * | 10/2019 | Yu | ......................... | F16K 31/041 |
| 2020/0141502 A1 | 5/2020 | Kondo et al. | | |

FOREIGN PATENT DOCUMENTS

| | | |
|---|---|---|
| JP | 2010-265923 A | 11/2010 |
| JP | 2011-112212 A | 6/2011 |
| JP | 6475778 B2 | 2/2019 |
| JP | 2020-104841 A | 7/2020 |
| JP | 2020-178469 A | 10/2020 |
| JP | 2021-42808 A | 3/2021 |
| JP | 2021-42809 A | 3/2021 |
| KR | 20-0476689 Y1 | 3/2015 |
| WO | 2011072584 A1 | 6/2011 |
| WO | 2020/213635 A1 | 10/2020 |
| WO | 2021/049542 A1 | 3/2021 |

\* cited by examiner

XXXV–XXXV

VALVE DEVICE

CROSS REFERENCE TO RELATED APPLICATION

The present application is a continuation application of International Patent Application No. PCT/JP2020/020922 filed on May 27, 2020, which designated the U.S. and claims the benefit of priority from Japanese Patent Application No. 2019-108987 filed on Jun. 11, 2019. The entire disclosures of all of the above applications are incorporated herein by reference.

TECHNICAL FIELD

The present disclosure relates to a valve device for circulating a fluid.

BACKGROUND ART

A channel switching valve includes a valve body and a gear mechanism having a driving gear coupled with the valve body and transmitting rotating force of a motor to the valve body. In the channel switching valve, a state of communication of a plurality of inlets and outlets is switched by the valve body being rotated by the motor

SUMMARY

According to an aspect of the present disclosure, a valve device through which a fluid flows includes: a driving source making rotational motion; a rotated part provided rotatably around a predetermined axis; a fluid passage portion having a flow hole for passing the fluid; a gear mechanism that includes a plurality of gears and transmits rotational motion of the driving source to the rotated part by engagement between the gears to rotate the rotated part; and a biasing part biasing the rotated part toward one side in a circumferential direction about the predetermined axis. The rotated part includes a rotor increasing or reducing an opening of the flow hole in conjunction with rotation of the rotated part and is rotated according to rotational motion of the driving source while being biased toward the one side in the circumferential direction by the biasing part.

DESCRIPTION OF EMBODIMENTS

Figure 1:
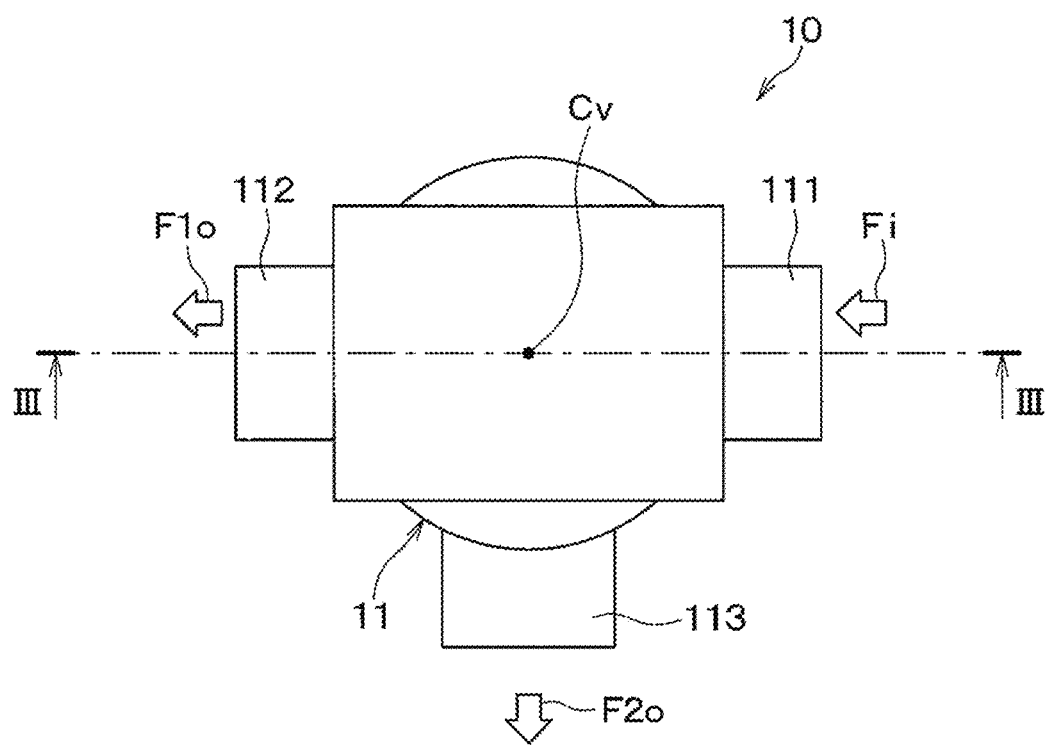
FIG. 1 is a plan view schematically illustrating a valve device in a first embodiment as viewed from an arrow I in FIG. 2.

To begin with, examples of relevant techniques will be described.

A channel switching valve includes a valve body and a gear mechanism having a driving gear coupled with the valve body and transmitting rotating force of a motor to the valve body. In this channel switching valve, a state of communication of a plurality of inlets and outlets is switched by the valve body being rotated by the motor.

In such a valve device as the channel switching valve, a rotor as a valve body is rotated by a motor and as a result, an opening of a flow hole through which a fluid going from an inlet port to an outlet port passes is increased or reduced. A flow rate of a fluid going from the inlet port to the outlet port is increased or reduced according to an opening of the flow hole. However, no measures may be taken to eliminate a backlash of a gear in the gear mechanism; therefore, a variation caused by the backlash is produced in an opening of the flow hole. When a variation is produced in an opening of the flow hole, a variation is accordingly produced also in a flow rate of a fluid passing through the channel switching valve. That is, it is difficult to accurately control a flow rate in the channel switching valve. The foregoing was found as the result of a close study by the present inventors.

The present disclosure provides a valve device enabling suppression of a variation in an opening of a flow hole caused by a backlash of a gear in a gear mechanism and highly accurate control on a flow rate of a fluid.

According to an aspect of the present disclosure, a valve device through which a fluid flows includes:

a driving source making rotational motion;

a rotated part provided rotatably around a predetermined axis;

a fluid passage portion having a flow hole for passing the fluid;

a gear mechanism that includes a plurality of gears and transmits rotational motion of the driving source to the rotated part by engagement between the gears to rotate the rotated part; and a biasing part biasing the rotated part toward one side in a circumferential direction about the predetermined axis.

The rotated part includes a rotor increasing or reducing an opening of the flow hole in conjunction with rotation of the rotated part and is rotated according to rotational motion of the driving source while being biased toward the one side in the circumferential direction by the biasing part.

Since the rotated part is biased toward one side in the circumferential direction as mentioned above, the energization force on the rotated part from the biasing part is transmitted from the rotated part to the gear in the gear mechanism. Therefore, a variation in an opening of a flow hole caused by a backlash of the gear in the gear mechanism can be suppressed as compared with, for example, cases where energization in the circumferential direction by the biasing part is absent. For this reason, a flow rate of a fluid can be controlled with accuracy in the valve device.

The reference numerals in parentheses attached to the components and the like indicate an example of correspondence between the components and the like and specific components and the like described in embodiments to be described below.

Hereinafter, embodiments will be described according to the drawings. Same or equivalent portions among respective embodiments below are labeled with same reference numerals in the drawings.

First Embodiment

A valve device 10 according to the present embodiment is a vehicular cooling water control valve mounted in, for example, an engine vehicle, a hybrid vehicle, or an electric vehicle. The valve device 10 shown in FIG. 1 constitutes a part of a cooling water circuit circulating cooling water through a power source for driving, a radiator, and the like. Therefore, cooling water circulated in the cooling water circuit flows through the valve device 10.

The valve device 10 is capable of increasing or reducing a flow rate of cooling water in a circulation route through the valve device 10 in the cooling water circuit and blocking a flow of cooling water in the circulation route as well. The cooling water is a liquid fluid and for example, LLC containing ethylene glycol or the like is used for the cooling water.

Figure 2:
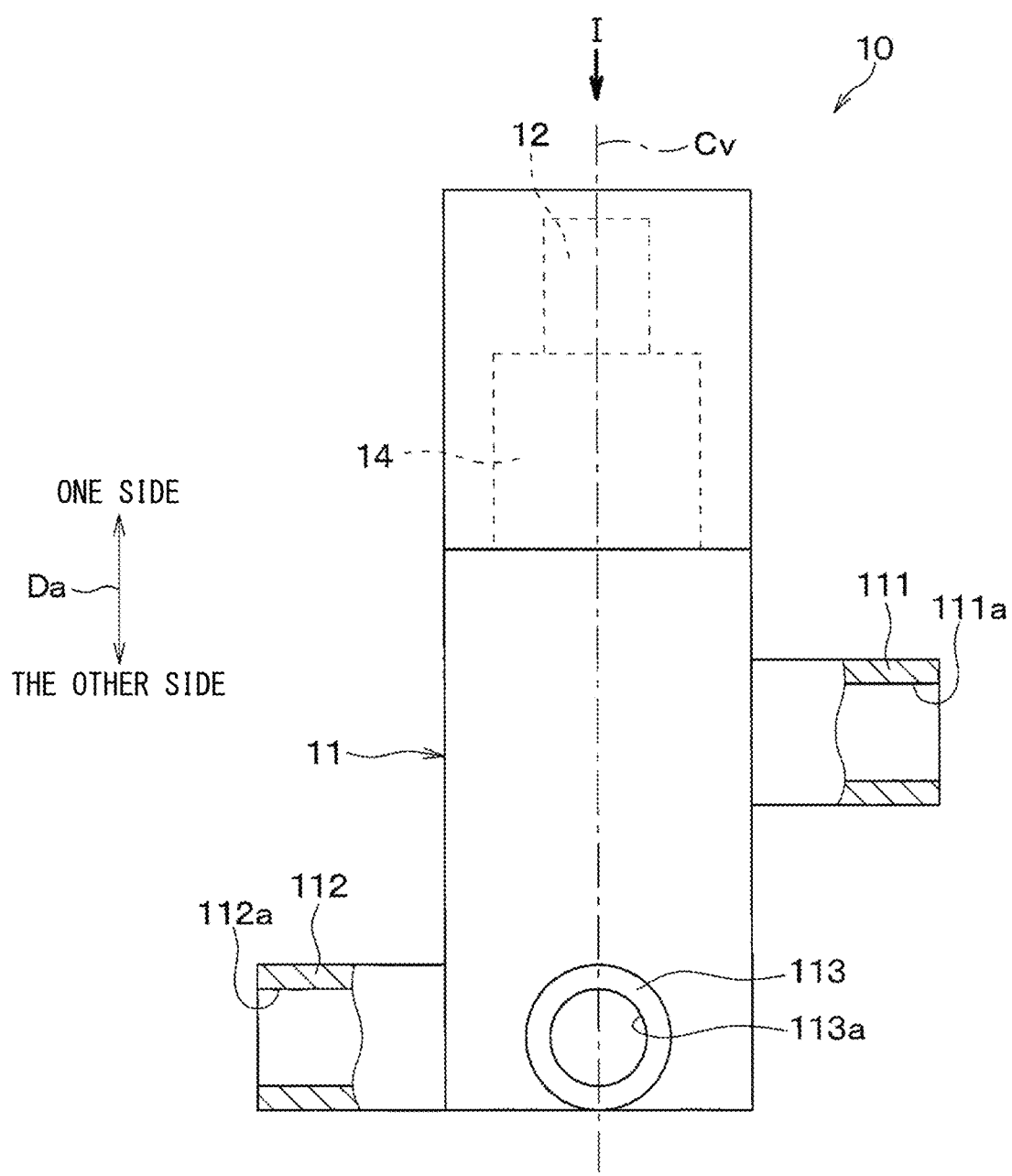
FIG. 2 is a front view schematically illustrating the valve device in the first embodiment.
Figure 3:
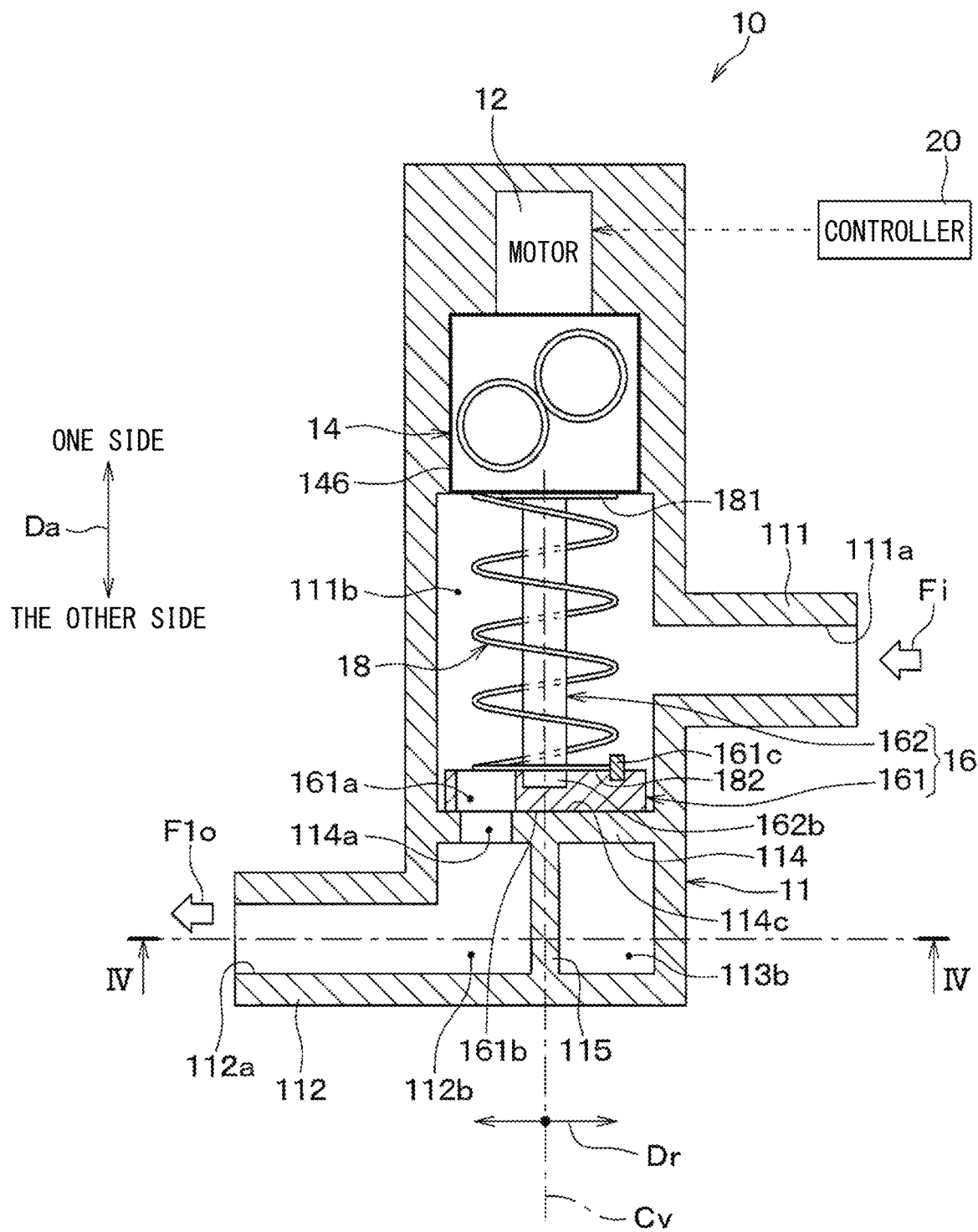
FIG. 3 is a sectional view schematically illustrating a section taken along a line III-III of FIG. 1 in the first embodiment.

As shown in FIGS. 1 to 3, specifically, the valve device 10 is a disc valve in which a disc-shaped rotor 161 is rotated around a valve axis Cv as a predetermined axis and valve opening/closing operation is thereby performed. The valve device 10 is a three-way valve having an inlet port 111, a first outlet port 112, and a second outlet port 113. The valve device 10 adjusts a flow rate ratio of a flow rate of cooling water flowing from the inlet port 111 to the first outlet port 112 and a flow rate of cooling water flowing from the inlet port 111 to the second outlet port 113. In the description of the present embodiment, the axial direction of the valve axis Cv will be also referred to as valve axis direction Da; the radial direction of the valve axis Cv will be also referred to as valve radial direction Dr; and the circumferential direction centered on the valve axis Cv will be also referred to as valve circumferential direction Dc.

The valve device 10 includes a housing 11, a motor 12, a gear mechanism 14, a rotated part 16, and a coil spring 18.

The housing 11 is a non-rotational member that does not rotate and is made of, for example, resin. The housing 11 accommodates the motor 12, the gear mechanism 14, the rotated part 16, and the coil spring 18 in the housing 11. The housing 11 further includes the inlet port 111 with a cooling water inlet 111a formed therein, the first outlet port 112 with a first outlet 112a formed therein, and the second outlet port 113 with a second outlet 113a formed therein.

Figure 4:
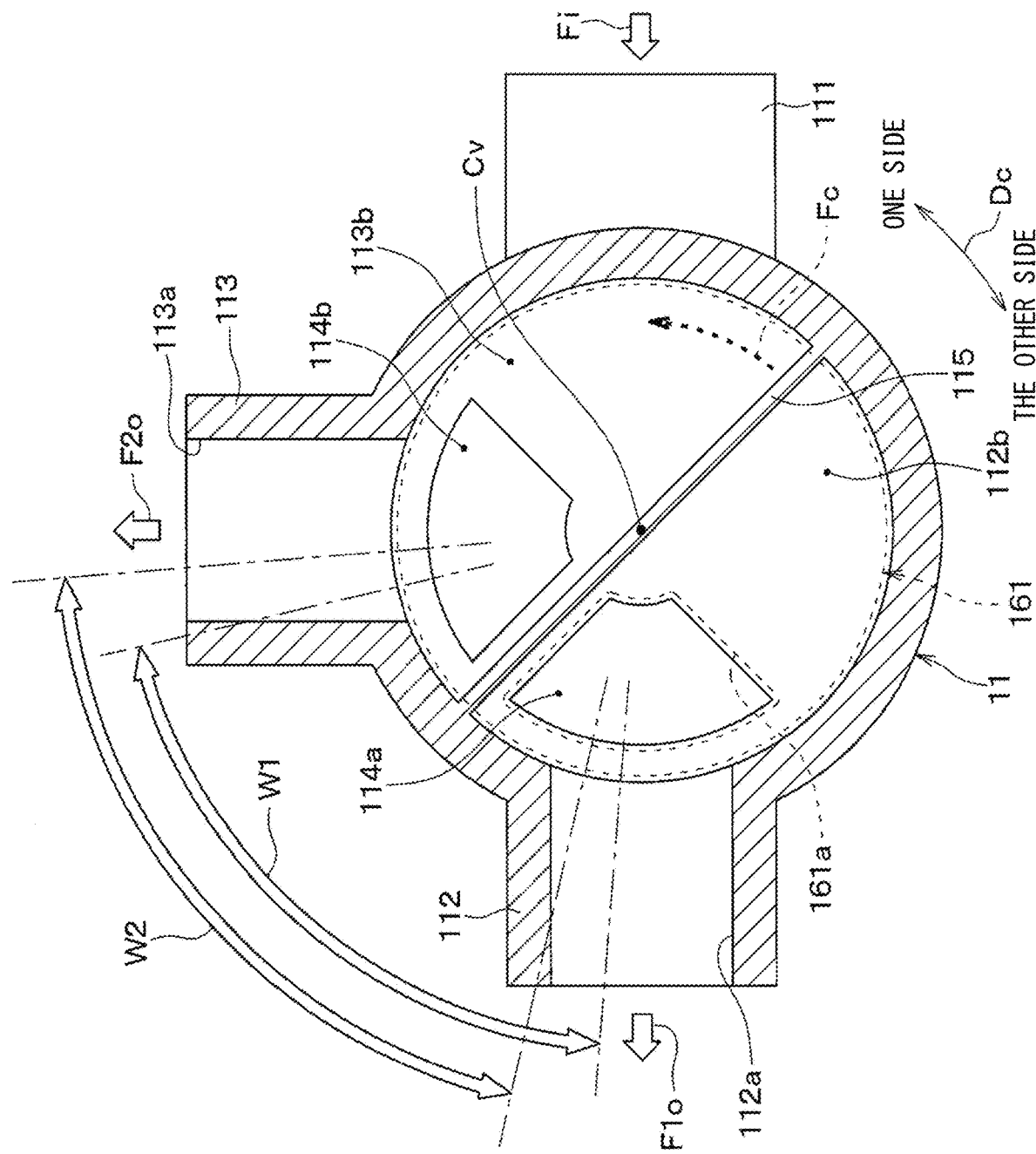
FIG. 4 is a sectional view schematically illustrating a section taken along a line IV-IV of FIG. 3 in the first embodiment.

As shown in FIG. 3 and FIG. 4, the housing 11 includes an inlet/outlet partitioning portion 114 and an outlet-side partitioning portion 115. The inlet/outlet partitioning portion 114 and the outlet-side partitioning portion 115 is provided in the housing 11 and partition an internal space of the housing 11.

Partitioning by the partitioning portions 114, 115 forms an inlet space 111b communicating to the cooling water inlet 111a, a first outlet space 112b communicating to the first outlet 112a, and a second outlet space 113b communicating to the second outlet 113a in the housing 11.

The outlet-side partitioning portion 115 is formed in a plate shape and divides the first outlet space 112b and the second outlet space 113b from each other. The inlet/outlet partitioning portion 114 is formed in a shape of a plate with the valve axis direction Da taken as a thickness direction and divides the inlet space 111b and the first outlet space 112b and second outlet space 113b from each other. The inlet space 111b is positioned on one side in the valve axis direction Da with respect to the inlet/outlet partitioning portion 114 and the first outlet space 112b and the second outlet space 113b are positioned on the other side in the valve axis direction Da with respect to the inlet/outlet partitioning portion 114.

The inlet/outlet partitioning portion 114 is provided in the housing 11 as a fluid passage portion. First and second flow holes 114a, 114b through which cooling water passes are formed in the fluid passage portion. The first flow hole 114a causes the inlet space 111b and the first outlet space 112b to communicate with each other and the second flow hole 114b causes the inlet space 111b and the second outlet space 113b to communicate with each other.

The motor 12 is a driving source supplied with power and performing rotational motion. The motor 12 according to the present embodiment is, for example, a servomotor or a brushless motor. The motor 12 rotates according to a control signal from a control device 20 electrically coupled with the motor 12.

The control device 20 is a computer including a non-transitional substantive storage medium, such as semiconductor memory, a processor, and the like and executes a computer program stored in the non-transitional substantive storage medium. When a computer program is executed, a method corresponding to the computer program is performed. That is, the control device 20 performs varied control processing according to these computer programs.

The rotated part 16 is a component of the valve device 10 rotated by rotational motion of the motor 12. The rotated part 16 is rotatably provided around the valve axis Cv. Specifically, the rotated part 16 includes the rotor 161 and a valve rotating shaft 162 as an intermediate element.

The rotor 161 is a valve body increasing or reducing an opening of the first flow hole 114a and an opening of the second flow hole 114b in conjunction with rotation of the rotated part 16. In short, the rotor 161 is a valve body rotating around the valve axis Cv. The rotor 161 is positioned in the inlet space 111b and is formed in a shape of a disc with the valve axis direction Da taken as a thickness direction. The rotor 161 according to the present embodiment is made of, for example, resin.

An opening of the first flow hole 114a refers to a degree of how the first flow hole 114a is opened and when the first flow hole 114a is fully opened, the opening is represented as 100% and when the first flow hole is fully closed, the opening is represented as 0%. The first flow hole 114a being fully opened indicates a state in which the first flow hole 114a is not closed with the rotor 161 at all and the first flow hole 114a being fully closed indicates a state in which the first flow hole 114a is entirely closed with the rotor 161. This is also the same with an opening of the second flow hole 114b.

A rotor hole 161a penetrating in the valve axis direction Da is formed in the rotor 161 and the rotor hole 161a is eccentrically positioned from the valve axis Cv.

For example, when the rotor hole 161a overlaps with the first flow hole 114a on one side in the valve axis direction Da in conjunction with rotation of the rotor 161 around the valve axis Cv, the first flow hole 114a is opened. Similarly, when the rotor hole 161a overlaps with the second flow hole 114b on one side in the valve axis direction Da, the second flow hole 114b is opened. The rotor 161 is rotated in such a manner that an opening of the second flow hole 114b is reduced as an opening of the first flow hole 114a is increased. FIG. 4 shows a state in which the first flow hole 114a is fully opened and at the same time the second flow hole 114b is fully closed.

The rotor 161 has a rotor sealing surface 161b facing to the other side in the valve axis direction Da. The inlet/outlet partitioning portion 114 has a fixed-side sealing surface 114c opposite the rotor sealing surface 161b in the valve axis direction Da. Since the fixed-side sealing surface 114c is brought into slidable contact with the rotor sealing surface 161b, the fixed-side sealing surface 114c is a mating-side slide portion with which the rotor 161 is brought into slidable contact. The rotor sealing surface 161b is pressed against the fixed-side sealing surface 114c by, for example, a spring member or the like other than the coil spring 18. The rotor sealing surface 161b and the fixed-side sealing surface 114c restrict a leakage of cooling water passing between the sealing surfaces 161b, 114c.

The valve rotating shaft 162 is a rotating shaft extended in the valve axis direction Da and rotated around the valve axis Cv. The valve rotating shaft 162 has a one end portion 162a (refer to FIG. 5) on one side in the valve axis direction Da and has the other end portion 162b on the other side in the valve axis direction Da.

The one end portion 162a of the valve rotating shaft 162 is coupled with the gear mechanism 14 and the other end portion 162b is coupled with the rotor 161 in such a manner that relative rotation is impermissible. That is, the valve rotating shaft 162 and the rotor 161 are integrally rotated. As a result, the valve rotating shaft 162 transmits rotation between the gear mechanism 14 and the rotor 161.

Figure 5:
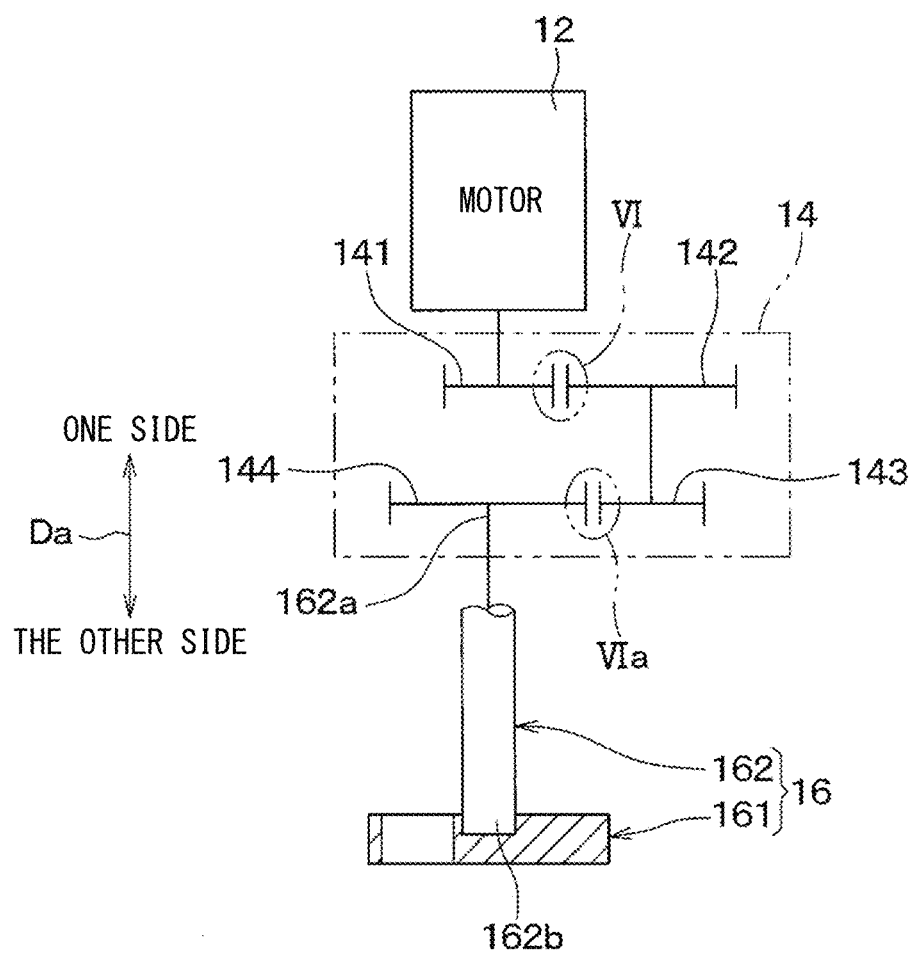
FIG. 5 is a drawing schematically illustrating an internal configuration of a gear mechanism in the first embodiment.

As shown in FIG. 3 to FIG. 5, the gear mechanism 14 includes a plurality of gears 141, 142, 143, 144 and a gear case 146 housing the gears 141, 142, 143, 144. Since the gear case 146 is fixed on the housing 11 of the valve device 10, the gear case 146 is also a non-rotational member. The gears 141, 142, 143, 144 may be designated as gears 141 to 144 for brevity.

The gear mechanism 14 transmits rotational motion of the motor 12 to the rotated part 16 by mutual engagement of the gears 141 to 144 to rotate the rotated part 16. That is, the gears 141 to 144 are provided in a route of power transmission from the motor 12 to the rotated part 16. Specifically, the gear mechanism 14 transmits rotational motion of the motor 12 to the valve rotating shaft 162 of the rotated part 16 to rotate the valve rotating shaft 162 and the rotor 161. The gears 141 to 144 according to the present embodiment are, for example, helical gears or spur gears.

A description will be given to an internal structure of the gear mechanism 14. A first gear 141 in the gear mechanism 14 is coupled with the rotating shaft of the motor 12 in such a manner that relative rotation is impermissible and a second gear 142 and a third gear 143 are coupled with each other in an integrally rotatable manner. A fourth gear 144 is coupled with the one end portion 162a of the valve rotating shaft 162 in such a manner that relative rotation is impermissible. The first gear 141 is engaged with the second gear 142 and the third gear 143 is engaged with the fourth gear 144. As a result, for example, when the motor 12 produces rotating force, the rotating force of the motor 12 is transmitted to the first gear 141 to the second gear 142 to the third gear 143 to the fourth gear 144 in this order and is transferred from the fourth gear 144 to the rotor 161 via the valve rotating shaft 162.

Figure 6:
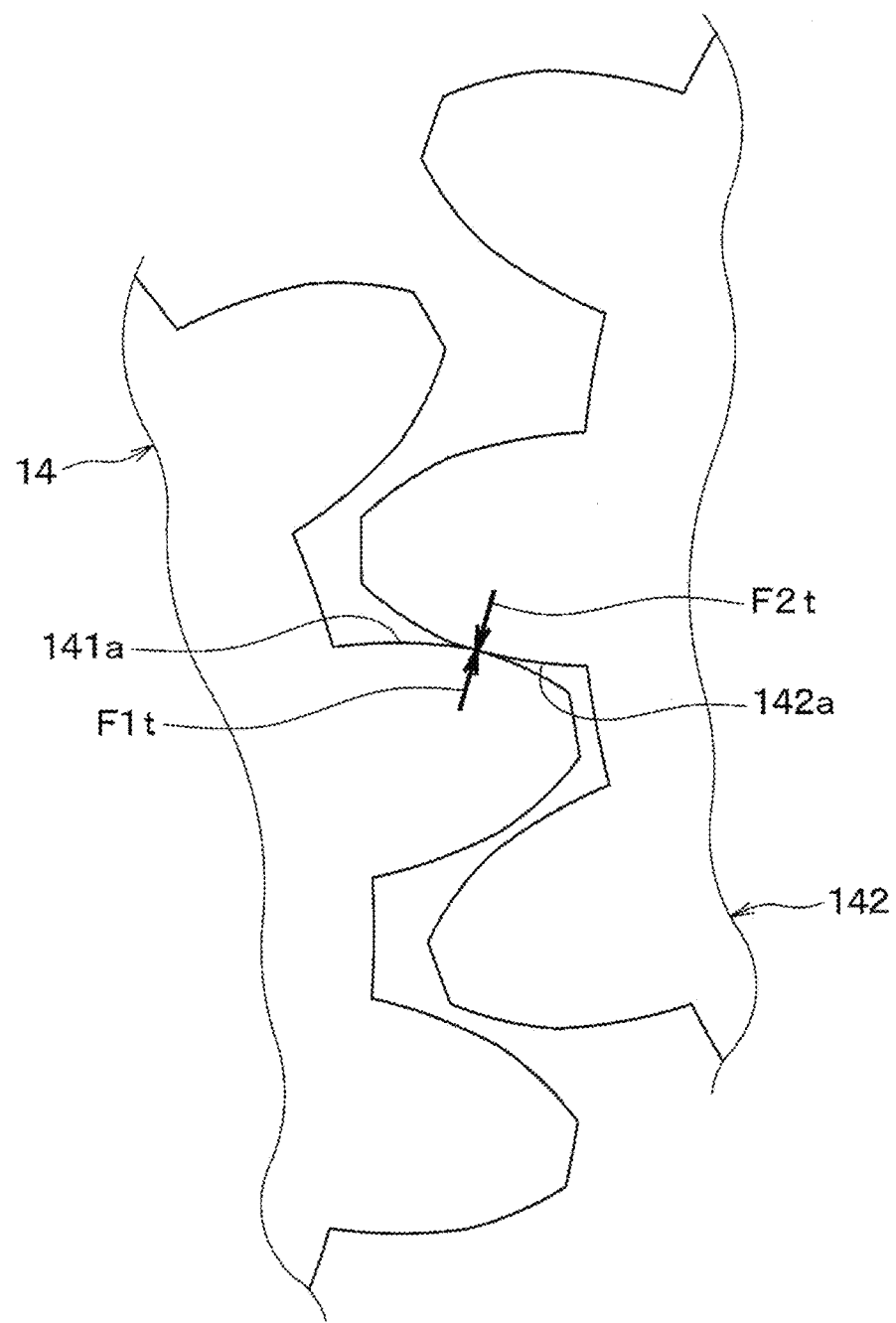
FIG. 6 is a partial enlarged view showing how gears are engaged with each other at a point of engagement in a part of VI in FIG. 5 in the first embodiment.

A detailed description will be given to engagement of the gears. The gears 141 to 144 provided in the gear mechanism 14 are individually engaged with one another at one or two or more points of engagement. In the present embodiment, two points of engagement in a part of VI and a part of VIa in FIG. 5, are provided and at the part of VI, the first gear 141 is engaged with the second gear 142 as shown in FIG. 6. The first gear 141 has a tooth flank 141a in contact with the mating second gear 142 at the point of engagement in the part of VI and the second gear 142 has a tooth flank 142a in contact with the mating first gear 141 at the above-mentioned point of engagement. Therefore, at the point of engagement, the tooth flank 141a of the first gear 141 and the tooth flank 142a of the second gear 142 are brought into slidable contact with each other.

Also, with respect to the point of engagement in the part of VIa, the above situation is the same with the point of engagement in the part of VI. Though not shown, in the part of VIa, the third gear 143 is engaged with the fourth gear 144. The third gear 143 has a tooth flank in contact with the mating fourth gear 144 at the point of engagement in the part of VIa and the fourth gear 144 has a tooth flank in contact with the mating third gear 143 at the above-mentioned point of engagement.

As shown in FIG. 3, the coil spring 18 is a biasing part biasing the rotated part 16 toward one side in the valve circumferential direction Dc and is formed by being wound around the valve axis Cv.

The coil spring 18 is disposed between the gear mechanism 14 and the rotor 161 in the valve axis direction Da. The valve rotating shaft 162 is inserted inside the coil spring 18.

As the result of this arrangement, the coil spring 18 is disposed on the upstream side of a cooling water flow relative to the rotor 161 in the inlet space 111b as a flow passage through which cooling water in the housing 11 flows. The coil spring 18, the rotor 161, and the inlet/outlet partitioning portion 114 are arranged and disposed from one side of the valve axis direction Da in the valve axis direction Da in the order of the coil spring 18, the rotor 161, and the inlet/outlet partitioning portion 114. The above-mentioned upstream side of a cooling water flow translates to the upstream side of a fluid flow and the downstream side of a cooling water flow translates to the downstream side of a fluid flow.

The coil spring 18 has a one end portion 181 on one side in the valve axis direction Da and has the other end portion 182 on the other side in the valve axis direction Da. The one end portion 181 is coupled with, for example, the gear case 146 in such a manner that relative rotation is impermissible and the other end portion 182 is coupled with the rotor 161 in such a manner that relative rotation is impermissible. That is, the other end portion 182 is a rotor coupling portion coupled with the rotor 161 of the rotated part 16 in such a manner that relative rotation is impermissible. Various methods are possible to couple the other end portion 182 of the coil spring 18 to the rotor 161. For example, the other end portion 182 is anchored to a pin 161c fixed on the rotor 161 and is thereby coupled with the rotor 161.

As shown in FIG. 3 and FIG. 4, when the coil spring 18 is used, the coil spring 18 is twisted in the valve circumferential direction Dc and elastically deformed (that is, torsionally elastically deformed). The coil spring 18 produces energization force Fc biasing the rotated part 16 toward one side in the valve circumferential direction Dc by the torsional elastic deformation of the coil spring 18. In short, the coil spring 18 is an elastic member producing energization force Fc by torsional elastic deformation of the coil spring 18. As mentioned above, the coil spring 18 functions as a torsion spring.

Torsional elastic deformation of the coil spring 18 is produced by the coil spring 18 being twisted to the side on which a winding number of the coil spring 18 is increased when the coil spring 18 is unloaded. That is, torsional elastic deformation of the coil spring 18 according to the present embodiment is elastic deformation on the side on which an outside diameter of the coil spring 18 is reduced when the coil spring 18 is unloaded.

Since the other end portion 182 of the coil spring 18 is coupled with the rotor 161 in such a manner that relative rotation is impermissible as mentioned above, a point of biasing action where the coil spring 18 directly energizes the rotated part 16 is the rotor 161. Therefore, that the coil spring 18 energizes the rotated part 16 toward one side in the valve circumferential direction Dc is strictly that the other end portion 182 of the coil spring 18 energizes the rotor 161 toward one side in the valve circumferential direction Dc.

Energization force Fc of the coil spring 18 acts on the rotor 161 when the rotated part 16 is being rotated as well as when the rotated part is at a stop. Therefore, the rotated part 16 is rotated according to rotational motion of the motor 12 while being biased toward one side in the valve circumferential direction Dc by the coil spring 18.

As shown in FIG. 3 to FIG. 5, energization force Fc of the coil spring 18 is transferred as rotating force from the rotated part 16 to the fourth gear 144 to the third gear 143 to the second gear 142 to the first gear 141 to the motor 12 in this order. Therefore, with the valve device 10 in action, counterforce against energization force Fc of the coil spring 18 is produced even when the motor 12 is not rotated.

For example, between the first gear 141 and the second gear 142, the tooth flank 141a of the first gear 141 and the tooth flank 142a of the second gear 142 push each other by energization force Fc of the coil spring 18 and counterforce of the motor 12 as indicated by arrows F1t, F2t in FIG. 6. This mutual push between tooth flanks similarly occurs between the third gear 143 and the fourth gear 144.

Therefore, by biasing the rotated part 16 toward one side in the valve circumferential direction Dc, the coil spring 18 presses one tooth flank of a pair of tooth flanks in contact with each other at the gears' respective points of engagement within the gear mechanism 14 against the other tooth flank at every point of engagement. The points of engagement in the part of VI in FIG. 6 will be taken as an example. In this example, the coil spring 18 presses the tooth flank 142a of the second gear 142 as one tooth flank against the tooth flank 141a of the first gear 141 as the other tooth flank.

As shown in FIG. 3 and FIG. 4, the rotor 161 is capable of continuously increasing or reducing an opening of the first flow hole 114a and an opening of the second flow hole 114b in conjunction of rotation of the rotor 161. For this reason, a movable range of the rotated part 16 in the valve circumferential direction Dc includes a first opening limiting range W1 in which an opening of the first flow hole 114a is smaller than the fully opened opening and is larger than the fully closed opening. In other words, the first opening limiting range W1 is a rotational position range (in other words, rotation angle range) of the rotated part 16 within which the first flow hole 114a is partly closed with the rotor 161. The above-mentioned movable range of the rotated part 16 includes a second opening limiting range W2 within which an opening of the second flow hole 114b is smaller than the fully opened opening and larger than the fully closed opening. In other words, the second opening limiting range W2 is a rotational position range of the rotated part 16 within which the second flow hole 114b is partly closed with the rotor 161.

In other words, the above-mentioned movable range of the rotated part 16 is a rotational position range within which the rotated part 16 can be rotated around the valve axis Cv. Depending on a rotational position of the rotor 161, the rotor 161 may partly close both the first flow hole 114a and the second flow hole 114b; therefore, the first opening limiting range W1 and the second opening limiting range W2 partly overlap with each other.

A movable range of the rotated part 16 could include, for example, a rotational position range of one or more turns. However, since the coil spring 18 is coupled with the rotor 161, a movable range of the rotated part 16 is taken as a limited rotational position range. Since the rotor 161 and the valve rotating shaft 162 are integrally rotated, the above-mentioned rotational position of the rotor 161 may be reworded into a rotational position of the rotated part 16 including the rotor 161 and the valve rotating shaft 162.

In the present embodiment, the coil spring 18 energizes the rotated part 16 toward one side in the valve circumferential direction Dc when the rotated part 16 is located in a rotational position within the first opening limiting range W1. This energization takes place wherever the rotational position is within the first opening limiting range W1. This is also the same when the rotated part 16 is located in a rotational position within the second opening limiting range W2. That is, the coil spring 18 energizes the rotated part 16 toward one side in the valve circumferential direction Dc when the rotated part 16 is located in a rotational position within the second opening limiting range W2. This energization takes place wherever the rotational position is within the second opening limiting range W2.

Needless to add, a rotational position range within which the rotated part 16 is biased toward one side in the valve circumferential direction Dc by the coil spring 18 is not limited to the first or second opening limiting range W1, W2. Even when the rotated part 16 is located in a rotational position out of both the first and second opening limiting ranges W1, W2, the coil spring 18 energizes the rotated part 16 toward one side in the valve circumferential direction Dc.

In the present embodiment, however, a movable range of the rotated part 16 in the valve circumferential direction Dc also includes a rotational position (that is, non-biasing rotational position) in which the coil spring 18 does not energize the rotated part 16 in the valve circumferential direction Dc. The above-mentioned non-biasing rotational position of the rotated part 16 is a rotational position out of the first opening limiting range W1 and out of the second opening limiting range W2.

In the valve device 10 configured as mentioned above, as shown in FIG. 3 and FIG. 4, cooling water flows from the cooling water inlet 111a into the inlet space 111b as indicated by arrow Fi. When the first flow hole 114a is opened, the cooling water in the inlet space 111b flows from the inlet space 111b into the first outlet space 112b through the first flow hole 114a. The cooling water in the first outlet space 112b then flows from the first outlet space 112b to outside the valve device 10 through the first outlet 112a as indicated by arrow F1o.

In this case, a flow rate of cooling water passing through the first flow hole 114a is determined according to an opening of the first flow hole 114a. That is, a flow rate of cooling water flowing from the cooling water inlet 111a to the first outlet 112a through the first flow hole 114a is increased with increase in an opening of the first flow hole 114a. When a variation is produced in an opening of the first flow hole 114a, a variation is accordingly produced also in a flow rate of cooling water flowing to the first outlet 112a.

When the second flow hole 114b is opened, cooling water in the inlet space 111b flows from the inlet space 111b into the second outlet space 113b through the second flow hole 114b. The cooling water in the second outlet space 113b flows from the second outlet space 113b to outside the valve device 10 through the second outlet 113a as indicated by arrow F2o.

In this case, a flow rate of cooling water passing through the second flow hole 114b is determined according to an opening of the second flow hole 114b. That is, a flow rate of cooling water flowing from the cooling water inlet 111a to the second outlet 113a through the second flow hole 114b is increased with increase in an opening of the second flow hole 114b. When a variation is produced in an opening of the second flow hole 114b, a variation is accordingly produced also in a flow rate of cooling water flowing to the second outlet 113a.

According to the present embodiment, as mentioned above and as shown in FIG. 3 and FIG. 4, the rotated part 16 is rotated according to rotational motion of the motor 12 while being biased toward one side in the valve circumferential direction Dc by the coil spring 18. As a result, the gears 141 to 144 in the gear mechanism 14 are rotated under energization force Fc of the coil spring 18 subjected from the rotated part 16.

Therefore, a variation in an opening of each flow hole 114a, 114b caused by a backlash of the gears 141 to 144 in the gear mechanism 14 can be suppressed as compared with, for example, cases where energization in the valve circumferential direction Dc by the coil spring 18 is absent. For this reason, a flow rate of cooling water can be controlled with accuracy in the valve device 10 as compared with cases where energization in the valve circumferential direction Dc by the coil spring 18 is absent. In the present embodiment, energization force Fc of the coil spring 18 reaches the rotating shaft of the motor 12; therefore, a backlash can be eliminated in every point of engagement between gears in the gear mechanism 14.

Attention will be directed to the gear mechanism 14. By biasing the rotated part 16 toward one side in the valve circumferential direction Dc, the coil spring 18 presses one tooth flank of a pair of tooth flanks in contact with each other at their point of engagement against the other tooth flank at every point of engagement between gears in the gear mechanism 14. Therefore, a variation in an opening of each flow hole 114a, 114b caused by a backlash of a gear 141 to 144 can be suppressed as compared with, for example, cases where a mutual push is absent between one tooth flank and the other tooth flank at some of a plurality of points of engagement in the gear mechanism 14. A flow rate of cooling water can be eventually controlled with accuracy.

According to the present embodiment, a movable range of the rotated part 16 in the valve circumferential direction Dc includes the first opening limiting range W1 within which an opening of the first flow hole 114a is smaller than the fully opened opening and is larger than the fully closed opening. When the rotated part 16 is located at least at a rotational position within the first opening limiting range W1, the coil spring 18 energizes the rotated part 16 toward one side in the valve circumferential direction Dc wherever the rotational position is within the first opening limiting range W1.

Therefore, the above-mentioned accurate flow rate control on cooling water can be implemented throughout a range within which a flow rate of cooling water passing through the first flow hole 114a is increased or reduced according to rotation of the rotated part 16. This is also the same with control of a flow rate of cooling water passing through the second flow hole 114b.

According to the present embodiment, the coil spring 18 is an elastic member that produces energization force Fc biasing the rotated part 16 toward one side in the valve circumferential direction Dc by tortional elastic deformation of the coil spring 18. Therefore, this energization force Fc can be caused to act on the rotated part 16 without applying power from outside the valve device 10. Thus, energization force Fc corresponding to an amount of tortional elastic deformation of the coil spring 18 can be obtained.

According to the present embodiment, a movable range of the rotated part 16 in the valve circumferential direction Dc includes a non-biasing rotational position in which the coil spring 18 does not energize the rotated part 16 in the valve circumferential direction Dc. Thus, the coil spring 18 need not be twisted before assembly to the rotor 161. For this purpose, when the valve device 10 is manufactured, a non-biasing rotational position only has to be taken as an initial rotational position of the initial rotated part 16 before the coil spring 18 is assembled to the rotor 161. In this case, tortional elastic deformation of the coil spring 18 can be obtained by rotating the rotor 161 to some extent at the motor 12 after incorporation of the coil spring 18.

According to the present embodiment, a biasing part biasing the rotated part 16 toward one side in the valve circumferential direction Dc is specifically the coil spring 18. The coil spring 18 is caused to produce energization force Fc (refer to FIG. 4) biasing the rotated part 16 toward one side in the valve circumferential direction Dc by tortional elastic deformation of the coil spring 18. Therefore, a change in energization force Fc in conjunction with rotation of the rotated part 16 can be suppressed without increasing an installation space for the biasing part.

According to the present embodiment, the valve rotating shaft 162 is inserted inside the coil spring 18. Therefore, an arrangement of the coil spring 18 in which the one end portion 181 of the coil spring 18 is coupled with a non-rotational member in such a manner that relative rotation is impermissible can be implemented. At the same time, rotation can be transmitted between the gear mechanism 14 and the rotor 161.

According to the present embodiment, the coil spring 18, the rotor 161, and the inlet/outlet partitioning portion 114 are arranged from one side of the valve axis direction Da in the valve axis direction Da in the order of the coil spring 18, the rotor 161, and the inlet/outlet partitioning portion 114. The coil spring 18 is disposed on the upstream side of a cooling water relative to the rotor 161 in the inlet space 111b as a flow passage through which cooling water in the housing 11 passes. Therefore, since an installation space for the coil spring 18 can be overlapped with the flow passage, increase in a physical size of the valve device 10 due to provision of the coil spring 18 can be suppressed.

According to the present embodiment, that the coil spring 18 energizes the rotated part 16 toward one side in the valve circumferential direction Dc is equivalent to that the other end portion 182 of the coil spring 18 energizes the rotor 161 toward one side in the valve circumferential direction Dc. Therefore, in addition to elimination of a backlash in the gear mechanism 14, a gap between the rotor 161 and the valve rotating shaft 162 in the valve circumferential direction Dc and a gap between the fourth gear 144 and the valve rotating shaft 162 in the valve circumferential direction Dc can also be eliminated by energization force Fc shown in FIG. 4. As a result, a flow rate of cooling water can be controlled with accuracy.

According to the present embodiment, the motor 12 is, for example, a servomotor or a brushless motor. With this configuration, a rotation angle of the motor 12 is grasped owing to the functionality of the servomotor or brushless motor; therefore, an angle detecting function need not be provided aside from the motor 12.

Second Embodiment

A description will be given to a second embodiment. With respect to the present embodiment, a description will be mainly given to a difference from the first embodiment. The description of an element identical with or similar to the above-mentioned embodiment will be omitted or simplified. This is the same with descriptions of the following embodiments.

Figure 7:
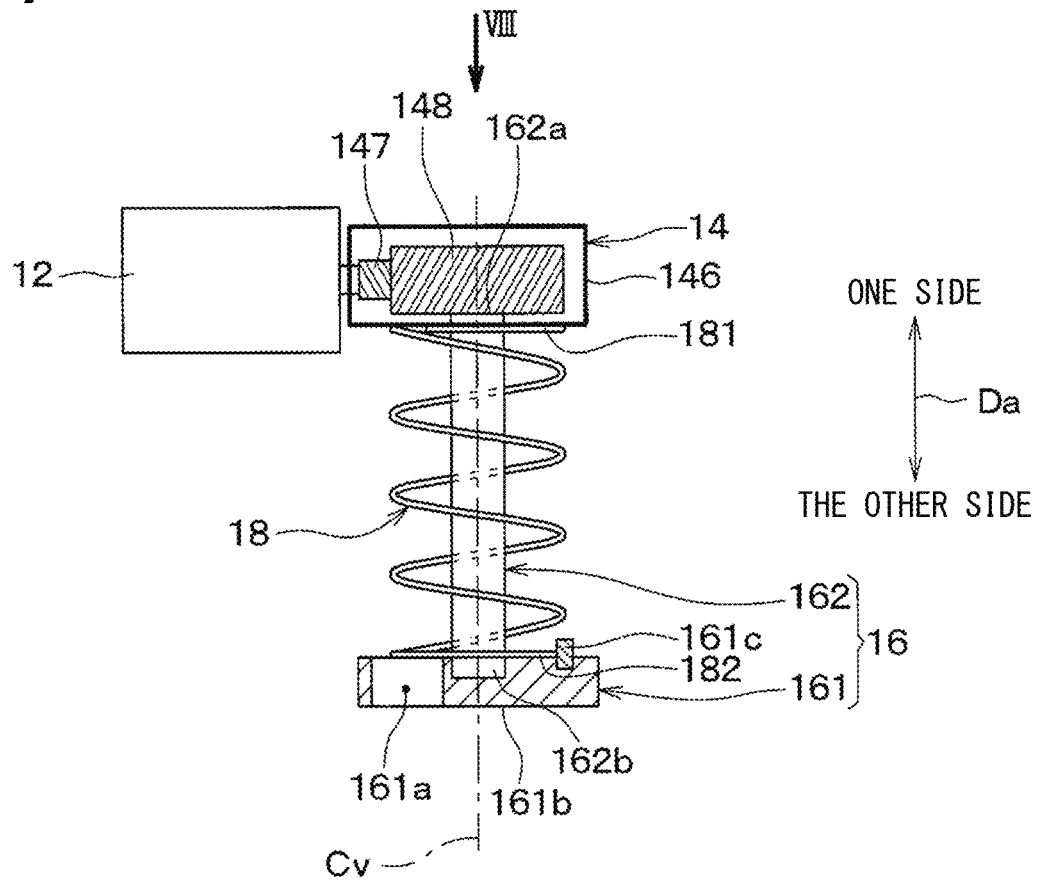
FIG. 7 is a sectional view schematically illustrating an internal structure of a valve device in a second embodiment, partly excerpted from a drawing equivalent to FIG. 3.
Figure 8:
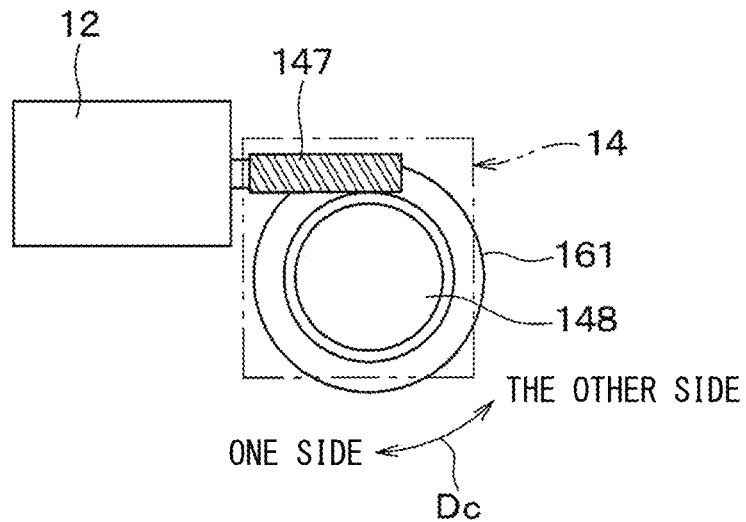
FIG. 8 is a drawing illustrating the valve device as viewed from arrow VIII in FIG. 7.

As shown in FIG. 7 and FIG. 8, the gear mechanism 14 according to the present embodiment includes a worm 147 having helical teeth and a worm wheel 148 engaged with the worm 147 instead of the first to fourth gears 141 to 144 in FIG. 5. That is, the gear mechanism 14 according to the present embodiment is a worm gear mechanism.

In FIG. 8, the contour of the gear mechanism 14 is indicated by alternate long and two short dashes line for making the drawing easier to understand. In FIG. 7 and FIG. 8, a representation of the housing 11 of the valve device 10 is omitted. Also, in some of a plurality of the following drawings, a representation of the housing 11 is similarly omitted.

The worm 147 is coupled with the rotating shaft of the motor 12 in such a manner that relative rotation is impermissible and the worm wheel 148 is coupled with the one end portion 162a of the valve rotating shaft 162 in such a manner that relative rotation is impermissible. As a result, for example, when the motor 12 produces rotating force, the rotating force of the motor 12 is transmitted to the worm 147 to the worm wheel 148 in this order and transmitted from the worm wheel 148 to the rotor 161 through the valve rotating shaft 162.

Therefore, in the gear mechanism 14 according to the present embodiment, the worm 147 is equivalent to a driving-side gear provided in a route of power transmission from the motor 12 to the rotated part 16. The worm wheel 148 is equivalent to a driven-side gear provided between the driving-side gear and the rotated part 16 in the route of power transmission.

Even when an attempt is made to rotate the worm 147 from the worm wheel 148 side, the worm is not rotated. That is, the worm 147 is so configured as to restrict transmission of rotating force from the worm wheel 148 to the motor 12. In other words, the worm 147 is configured as a reverse transmission restricting gear that restricts reverse transmission of rotating force opposite rotating force transmission from the motor 12 to the rotated part 16. For this reason, when the motor 12 is not rotated, the motor does not produce counterforce against energization force Fc of the coil spring 18 (refer to FIG. 4).

As in the first embodiment, also in the present embodiment, the coil spring 18 energizes the rotated part 16 toward one side in the valve circumferential direction Dc. Therefore, at a point of engagement between the worm 147 and the worm wheel 148, a tooth flank of the worm wheel 148 is pressed against a tooth flank of the worm 147 by energization force Fc (refer to FIG. 4) of the coil spring 18 as in the state shown in FIG. 6.

The motor 12 according to the present embodiment is a stepping motor. Since a rotation angle of the motor 12 can be controlled by the functionality of the stepping motor, a rotational position of the rotor 161 can be uniquely determined and an angle detecting function need not be provided aside from the motor 12.

In the present embodiment, a movable range of the rotated part 16 does not include a non-biasing rotational position of the rotated part 16 described above in relation to the first embodiment. That is, in no matter which rotational position the rotated part 16 is within the above-mentioned movable range, the coil spring 18 energizes the rotated part 16 toward one side in the valve circumferential direction Dc. When the coil spring 18 is coupled with the rotor 161 during manufacture of the valve device 10, for example, the coil spring 18 is coupled with the rotor 161 as is twisted in advance at no load.

According to the present embodiment, the worm 147 as a driving-side gear is so configured as to restrict transmission of rotating force from the worm wheel 148 as a driven-side gear to the motor 12. Therefore, since the motor 12 is not rotated due to rotating force produced in the rotor 161 by energization of the coil spring 18, non-biased holding can be implemented and a rotational position of the rotor 161 can be held without passing a current through the motor 12. The above-mentioned accurate flow rate control on cooling water is exercised and as a result, reduction in a number of operations of the motor 12 can be achieved. Because of the foregoing and the above-mentioned non-biased holding, power consumption reduction, which is especially required in electric vehicles, can be achieved.

Since the gear mechanism 14 in the present embodiment is a worm gear mechanism, a number of parts can be reduced as compared with cases where any other structure than a worm gear mechanism is adopted as a structure for restricting transmission of rotating force from the rotated part 16 to the motor 12. As a result, simplification of a structure and a manufacture of the gear mechanism 14 is facilitated.

In addition, a high reducing ratio is obtained at the gear mechanism 14 and locking force for restricting transmission of rotating force from the rotated part 16 to the motor 12 is easily enhanced.

The present embodiment is identical with the first embodiment except the foregoing. In the present embodiment, an effect brought about by a configuration element common to the first embodiment is obtained as in the first embodiment.

Third Embodiment

A description will be given to a third embodiment. With respect to the present embodiment, a description will be mainly given to a difference from the second embodiment.

Figure 9:
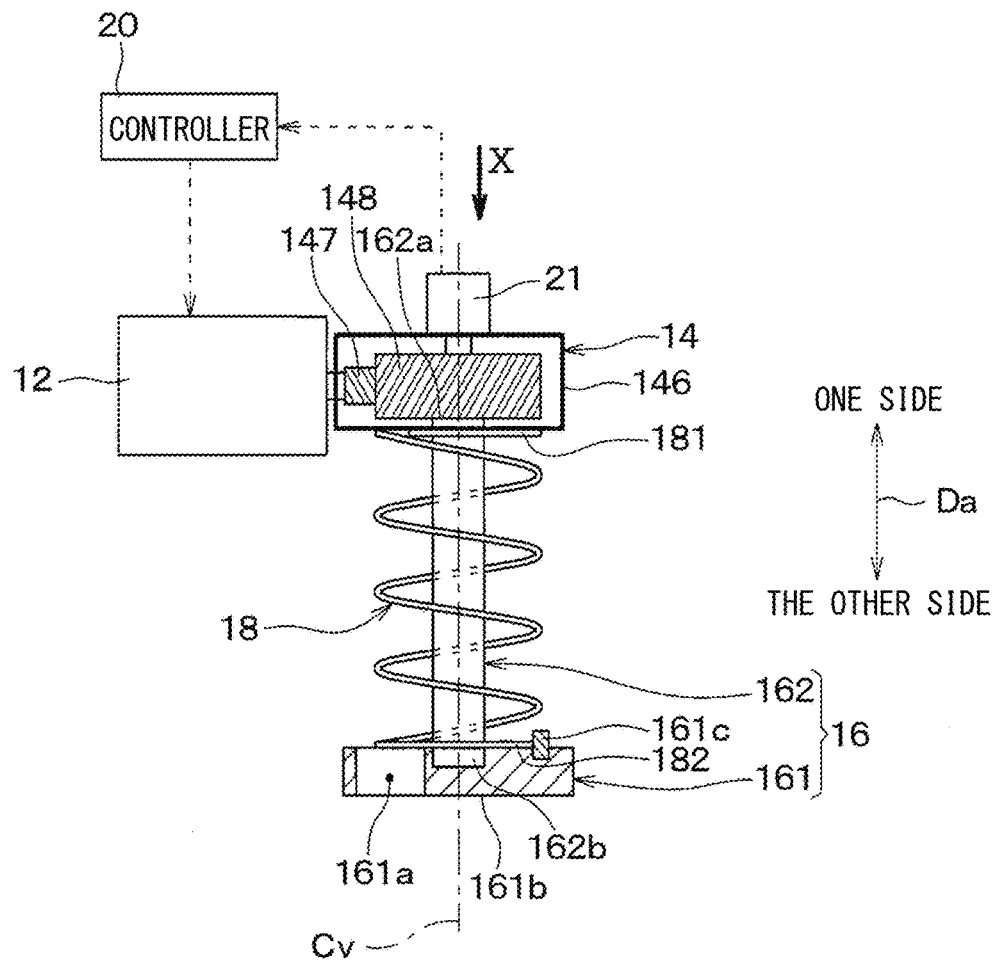
FIG. 9 is a drawing schematically illustrating an internal structure of a valve device in a third embodiment, equivalent to FIG. 7.
Figure 10:
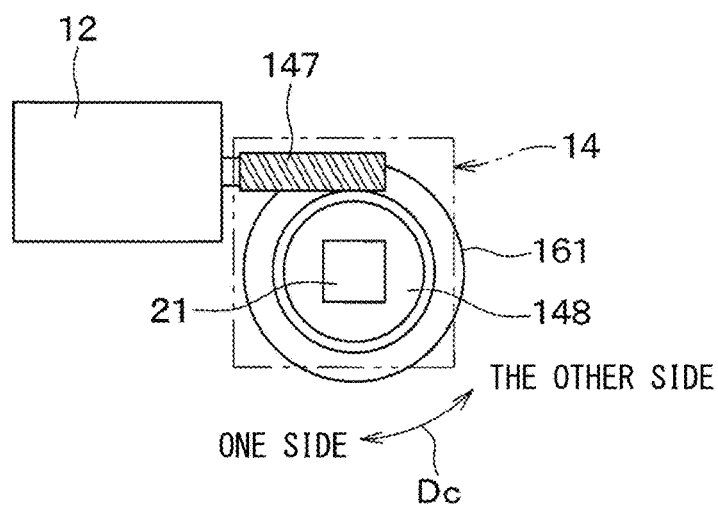
FIG. 10 is a drawing illustrating the valve device as viewed from arrow X in FIG. 9, equivalent to FIG. 8.

As shown in FIG. 9 and FIG. 10, the motor 12 in the present embodiment is a direct-current motor. The valve device 10 is provided with an angle detecting mechanism 21.

The angle detecting mechanism 21 is an angle sensor detecting a rotation angle of the valve rotating shaft 162 and is coupled with the valve rotating shaft 162. A detection signal representative of a rotation angle of the valve rotating shaft 162 (in other words, a rotational position of the rotor 161) is sent from the angle detecting mechanism 21 to the control device 20.

The control device 20 detects a rotational position of the rotor 161 with the angle detecting mechanism 21 and feeds back a result of the detection to control a rotation angle of the motor 12. By exercising this control, a rotational position of the rotor 161 can be controlled with an overshoot suppressed.

The present embodiment is identical with the second embodiment except the foregoing. In the present embodiment, an effect brought about by a configuration element common to the second embodiment is obtained as in the second embodiment.

Though the present embodiment is a modification based on the second embodiment, the present embodiment can also be combined with the first embodiment.

Fourth Embodiment

A description will be given to a fourth embodiment. With respect to the present embodiment, a description will be mainly given to a difference from the second embodiment.

Figure 11:
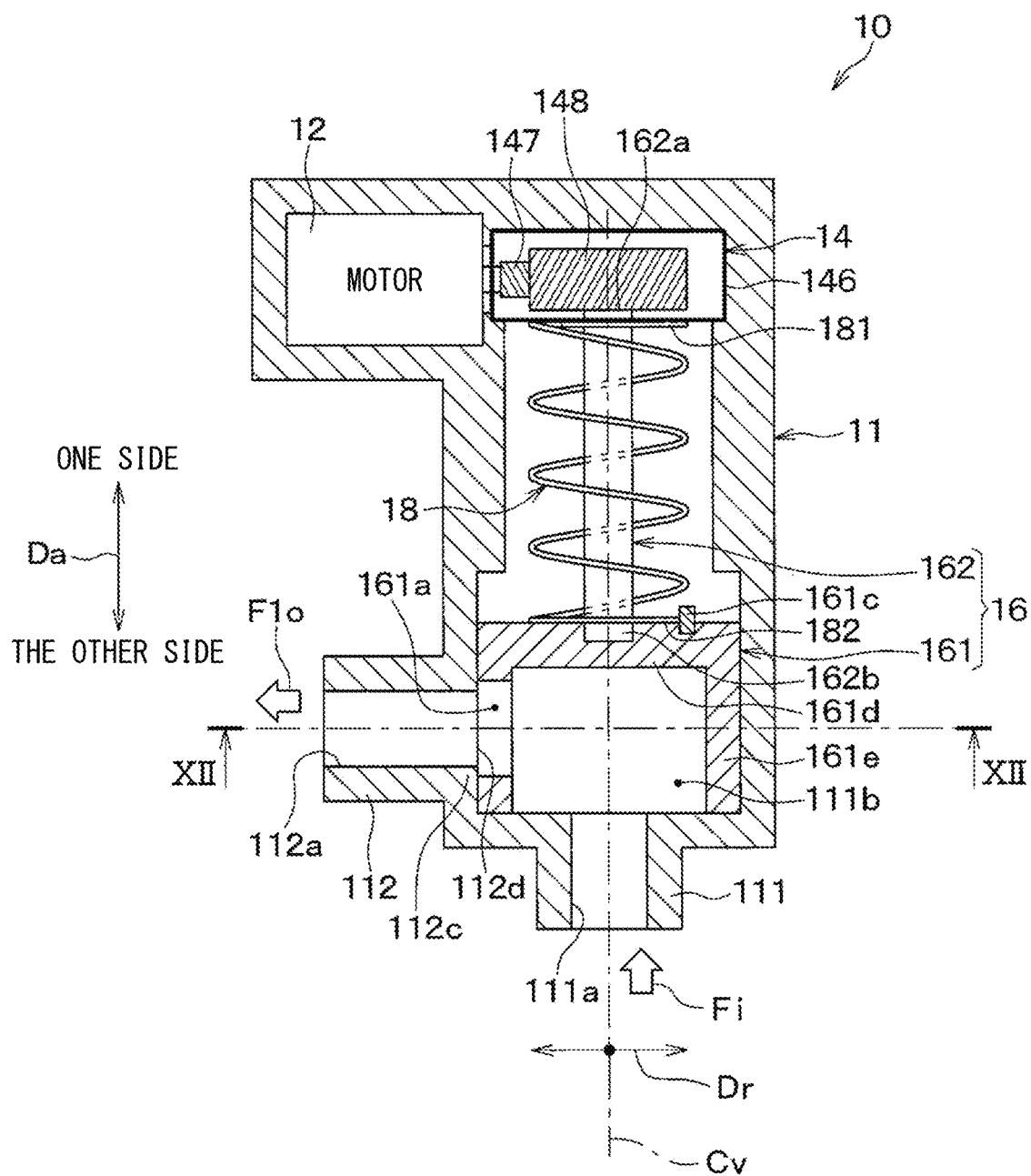
FIG. 11 is a sectional view schematically illustrating an internal structure of a valve device in a fourth embodiment, equivalent to FIG. 3.
Figure 12:
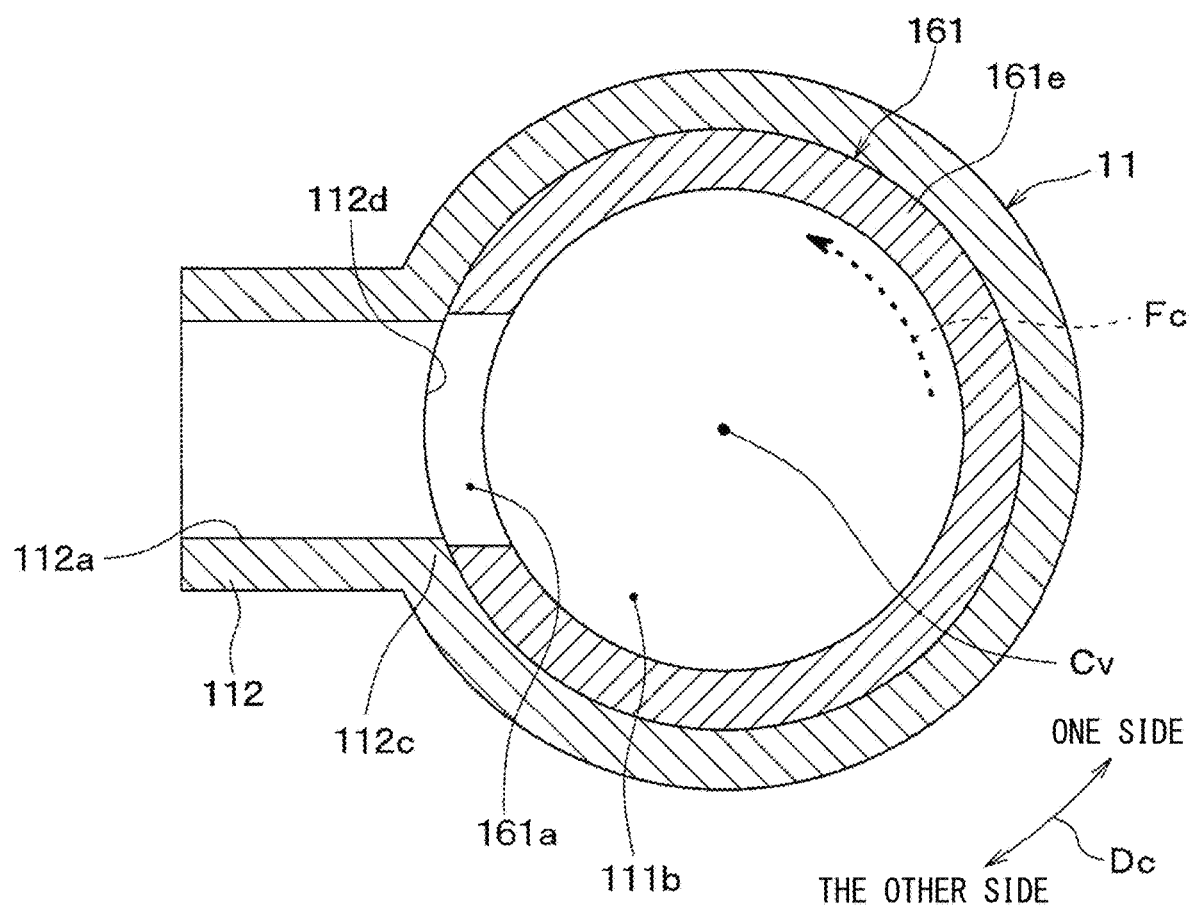
FIG. 12 is a sectional view schematically illustrating a section taken along line XII-XII of FIG. 11 related to the fourth embodiment.

As shown in FIG. 11 and FIG. 12, in the present embodiment, a shape of the rotor 161 is different from that in the second embodiment. Since the valve device 10 according to the present embodiment is configured as a two-way valve, the valve device is not provided with the second outlet port 113. For this reason, in the description of the present embodiment, the first outlet port 112 is simply referred to as outlet port 112 and the first outlet 112a is simply referred to as cooling water outlet 112a. Because of a structure of the valve device 10 in the present embodiment, the first outlet space 112b or the second outlet space 113b (refer to FIG. 4) is not formed.

Specifically, the rotor 161 is housed in the housing 11 and is supported in such a manner that relative rotation to the housing 11 is permissible. The inlet port 111 is disposed on the other side in the valve axis direction Da with respect to the rotor 161 and the outlet port 112 is disposed outside the rotor 161 in the valve radial direction Dr.

The rotor 161 includes a top plate portion 161d and a cylindrical portion 161e. The top plate portion 161d is in a shape of a disc with the valve axis direction Da taken as a thickness direction and centered on the valve axis Cv. The other end portion 162b of the valve rotating shaft 162 and the other end portion 182 of the coil spring 18 are coupled with one side of the top plate portion 161d in the valve axis direction Da.

The cylindrical portion 161e of the rotor 161 is substantially in a shape of a cylinder extended in the valve axis direction Da and centered on the valve axis Cv. The cylindrical portion 161e is extended from a limb portion of the top plate portion 161d toward the other side in the valve axis direction Da. For this reason, in the valve axis direction Da, one side of an internal space of the cylindrical portion 161e is closed with the top plate portion 161d but the other side of the internal space is open.

The cooling water inlet 111a communicates to the internal space of the cylindrical portion 161e. Consequently, the internal space of the cylindrical portion 161e provides the inlet space 111b.

The rotor hole 161a penetrating in the valve radial direction Dr is formed in the cylindrical portion 161e. The cooling water outlet 112a communicates with the inlet space 111b provided inside the cylindrical portion 161e through the rotor hole 161a. In the present embodiment, therefore, an opening of the upstream end portion 112d of the cooling water outlet 112a is increased or reduced by the rotor 161. That is, the upstream end portion 112d of the cooling water outlet 112a corresponds to a flow hole whose opening is increased or reduced in conjunction with rotation of the rotated part 16. Of the housing 11, an outlet upstream end formation portion 112c where the upstream end portion 112d as a flow hole is formed corresponds to a fluid passage portion.

In the present embodiment, the valve rotating shaft 162 or the coil spring 18 is not disposed in the inlet space 111b.

The present embodiment is identical with the second embodiment except the foregoing. In the present embodiment, an effect brought about by a configuration element common to the second embodiment is obtained as in the second embodiment.

Though the present embodiment is a modification based on the second embodiment, the present embodiment can also be combined with the first embodiment or the third embodiment.

Fifth Embodiment

A description will be given to a fifth embodiment. With respect to the present embodiment, a description will be mainly given to a difference from the fourth embodiment.

Figure 13:
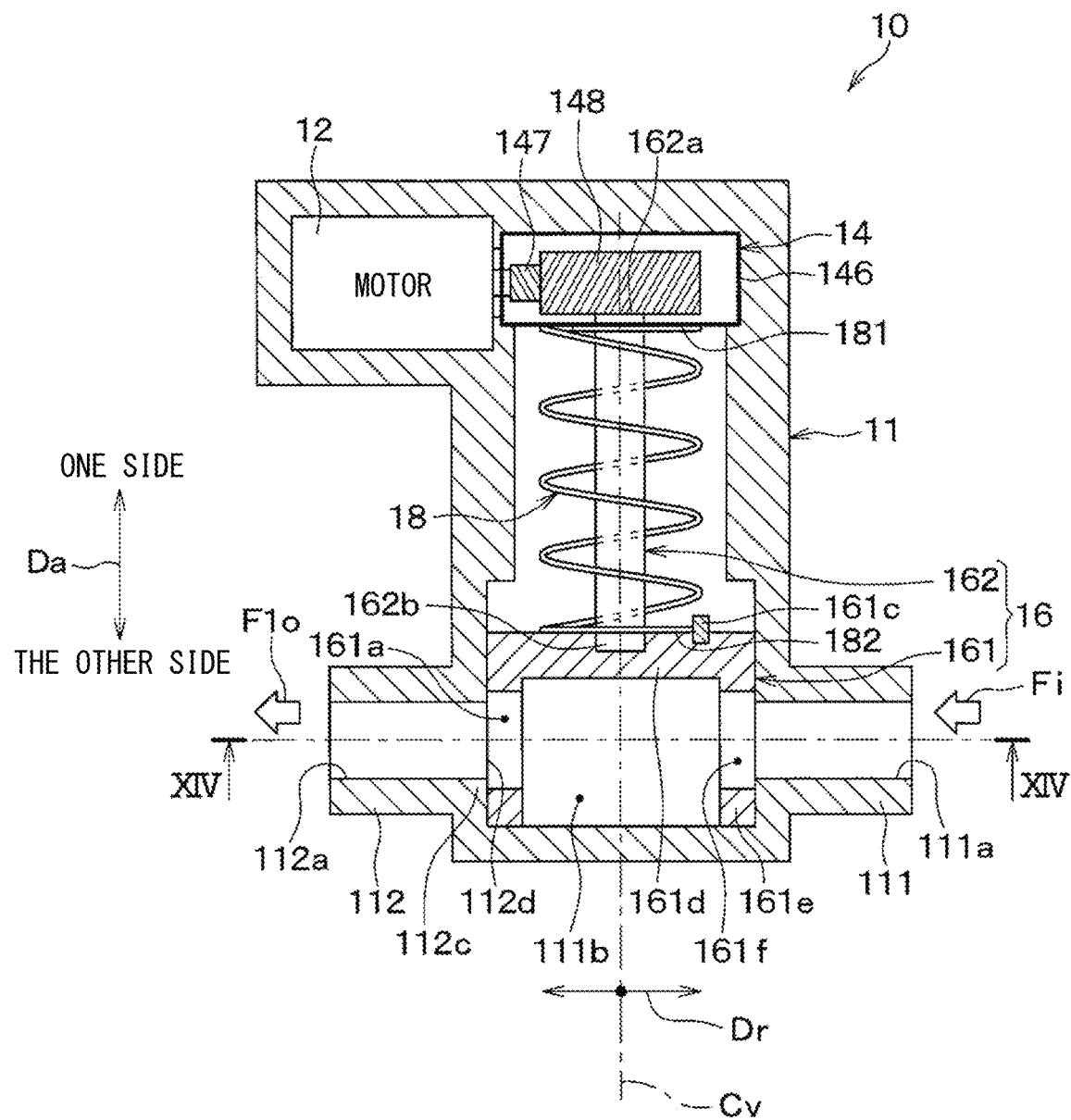
FIG. 13 is a sectional view schematically illustrating an internal structure of a valve device in a fifth embodiment, equivalent to FIG. 11.
Figure 14:
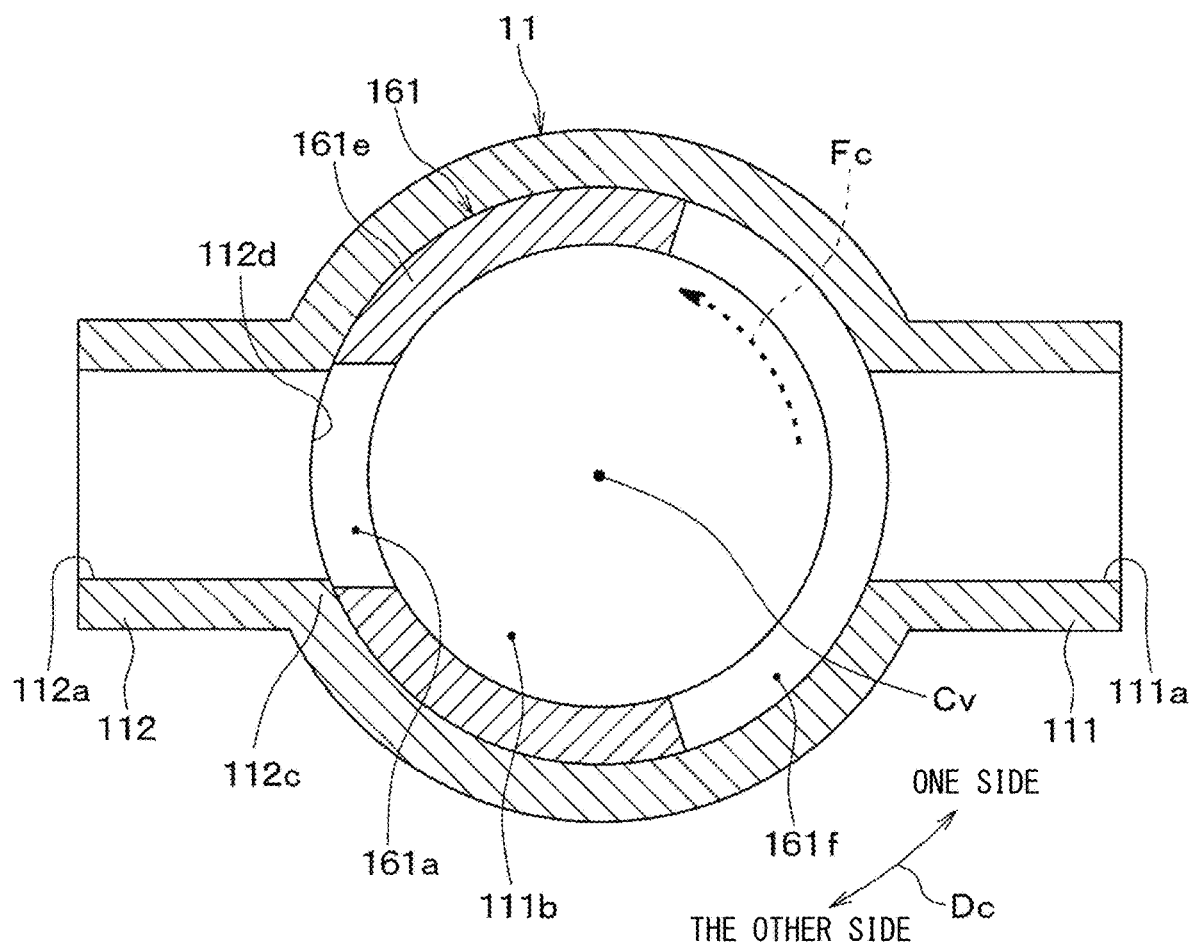
FIG. 14 is a sectional view schematically illustrating a section taken along line XIV-XIV of FIG. 13 related to the fifth embodiment, equivalent to FIG. 12.

As shown in FIG. 13 and FIG. 14, in the present embodiment, a disposition of the inlet port 111 is different from that in the fourth embodiment.

Specifically, in the present embodiment, the inlet port 111 is disposed outside the rotor 161 in the valve radial direction Dr. For example, the inlet port 111 is disposed opposite to the outlet port 112 with the rotor 161 in between. For this reason, the other side of the inlet space 111b in the valve axis direction Da as an internal space of the cylindrical portion 161e is closed with the housing 11.

Aside from the rotor hole 161a, an inlet communication hole 161f penetrating in the valve radial direction Dr is formed in the cylindrical portion 161e of the rotor 161. The cooling water inlet 111a communicates with the inlet space 111b provided inside the cylindrical portion 161e through the inlet communication hole 161f. The inlet communication hole 161f is so shaped as to be widened in the valve circumferential direction Dc, so that even when the rotor 161 is rotated for adjusting an opening of the upstream end portion 112d of the cooling water outlet 112a, the inlet communication hole 161f does not reduce a cooling water flow from the cooling water inlet 111a to the inlet space 111b.

The present embodiment is identical with the fourth embodiment except the foregoing. In the present embodiment, an effect brought about by a configuration element common to the fourth embodiment is obtained as in the fourth embodiment.

Sixth Embodiment

A description will be given to a sixth embodiment. With respect to the present embodiment, a description will be mainly given to a difference from the first embodiment.

Figure 15:
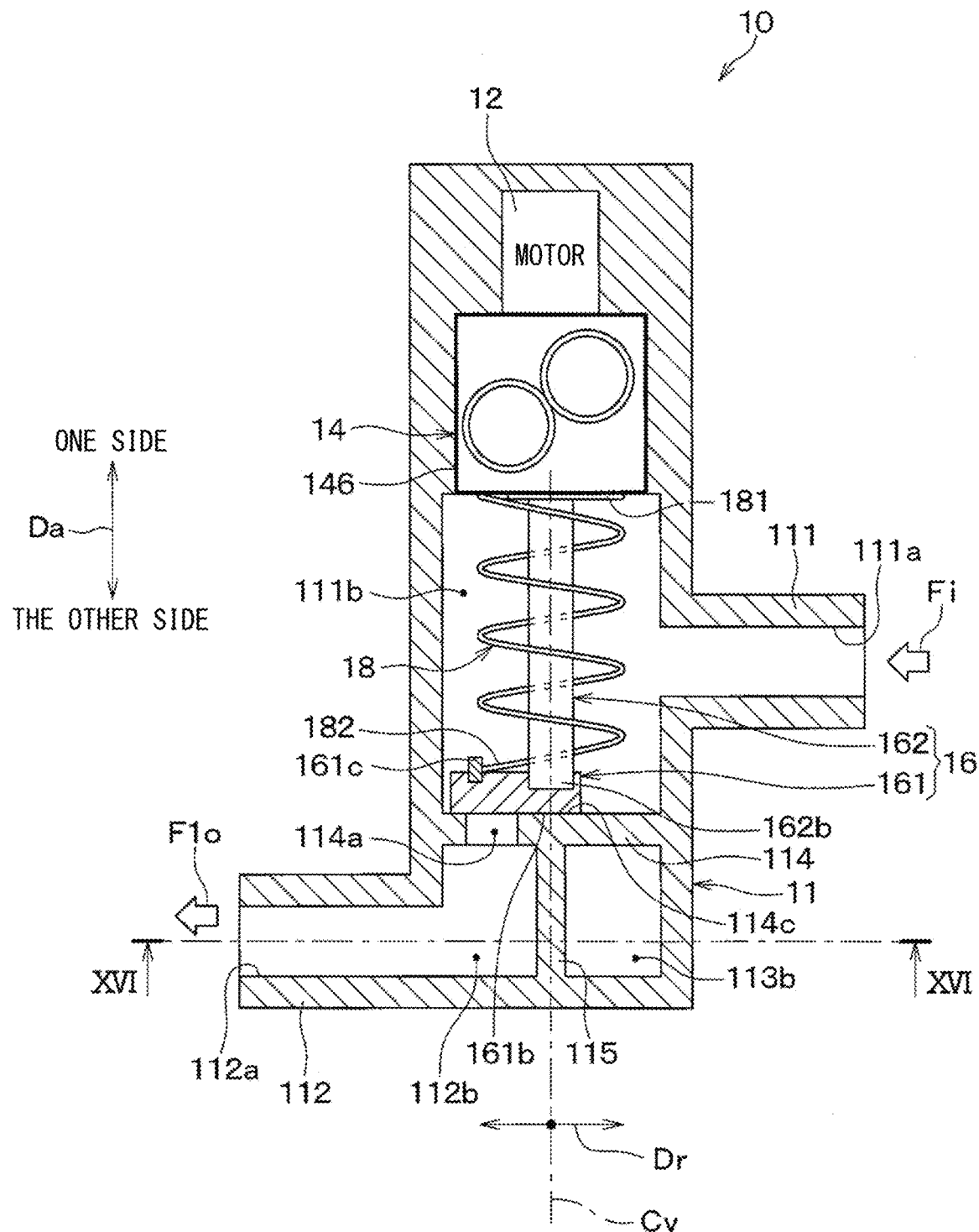
FIG. 15 is a sectional view schematically illustrating an internal structure of a valve device in a sixth embodiment, equivalent to FIG. 3.
Figure 16:
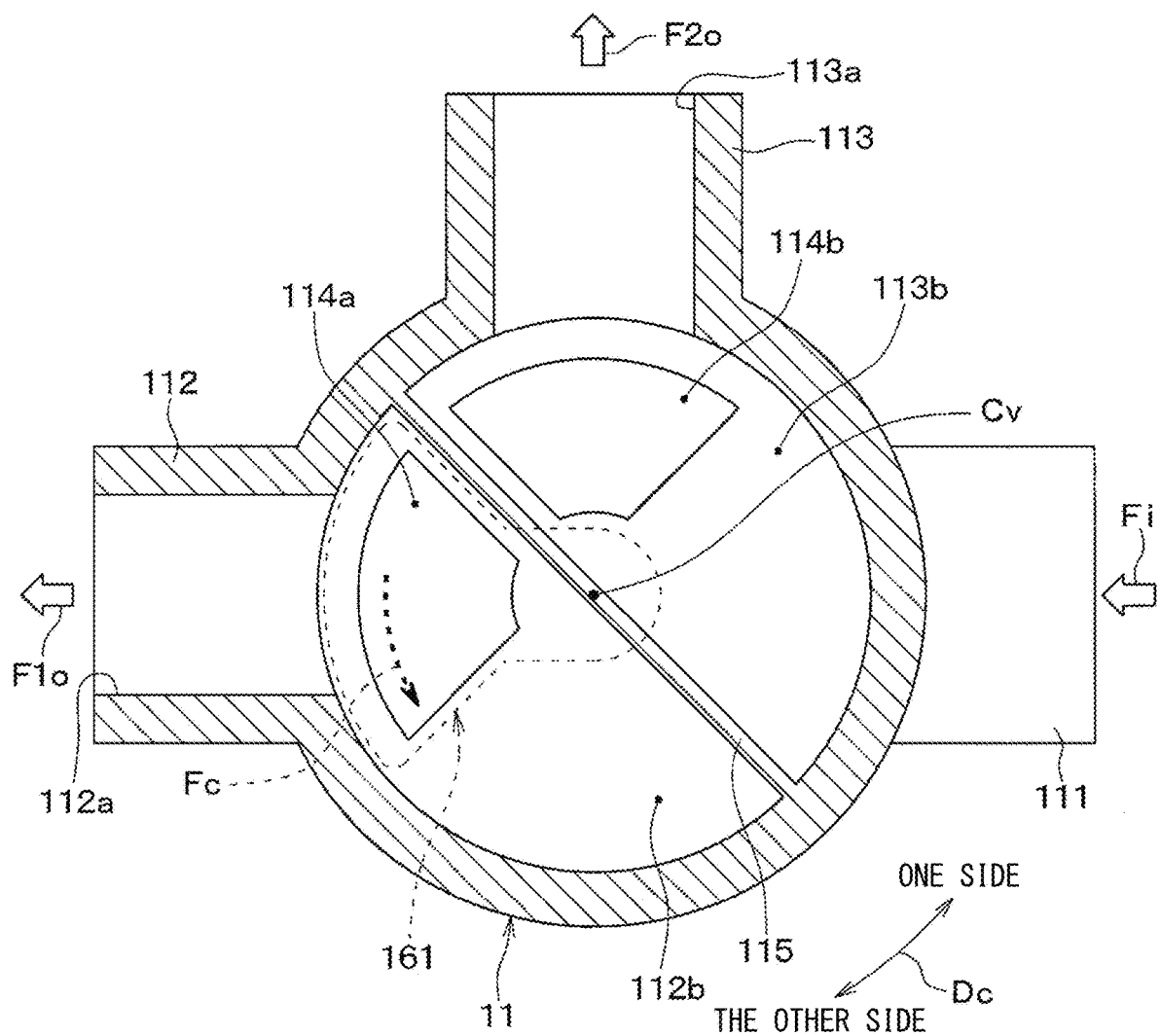
FIG. 16 is a sectional view schematically illustrating a section taken along line XVI-XVI of FIG. 15 related to the sixth embodiment, equivalent to FIG. 4.

As shown in FIG. 15 and FIG. 16, in the present embodiment, a shape of the rotor 161 is different from that in the first embodiment.

Specifically, in the present embodiment, the rotor hole 161a (refer to FIG. 3) is not formed in the rotor 161 and the rotor 161 is in a shape of a plate with the valve axis direction Da taken as a thickness direction. The rotor 161 is not in a shape of a disc but in an eccentric shape with respect to the valve axis Cv.

The rotor 161 overlaps with the first flow hole 114a on one side in the valve axis direction Da and the rotor 161 thereby closes the first flow hole 114a. Similarly, the rotor 161 overlaps with the second flow hole 114b on one side in the valve axis direction Da and the rotor 161 thereby closes the second flow hole 114b. Therefore, like the rotor 161 in the first embodiment, the rotor 161 in the present embodiment also increases or reduces an opening of the first flow hole 114a and an opening of the second flow hole 114b in conjunction with rotation around the valve axis Cv. FIG. 16 shows a state in which the first flow hole 114a is fully closed and the second flow hole 114b is fully opened.

The present embodiment is identical with the first embodiment except the foregoing. In the present embodiment, an effect brought about by a configuration element common to the first embodiment is obtained as in the first embodiment.

Though the present embodiment is a modification based on the first embodiment, the present embodiment can also be combined with the second embodiment or the third embodiment.

Seventh Embodiment

A description will be given to a seventh embodiment. With respect to the present embodiment, a description will be mainly given to a difference from the fourth embodiment.

Figure 17:
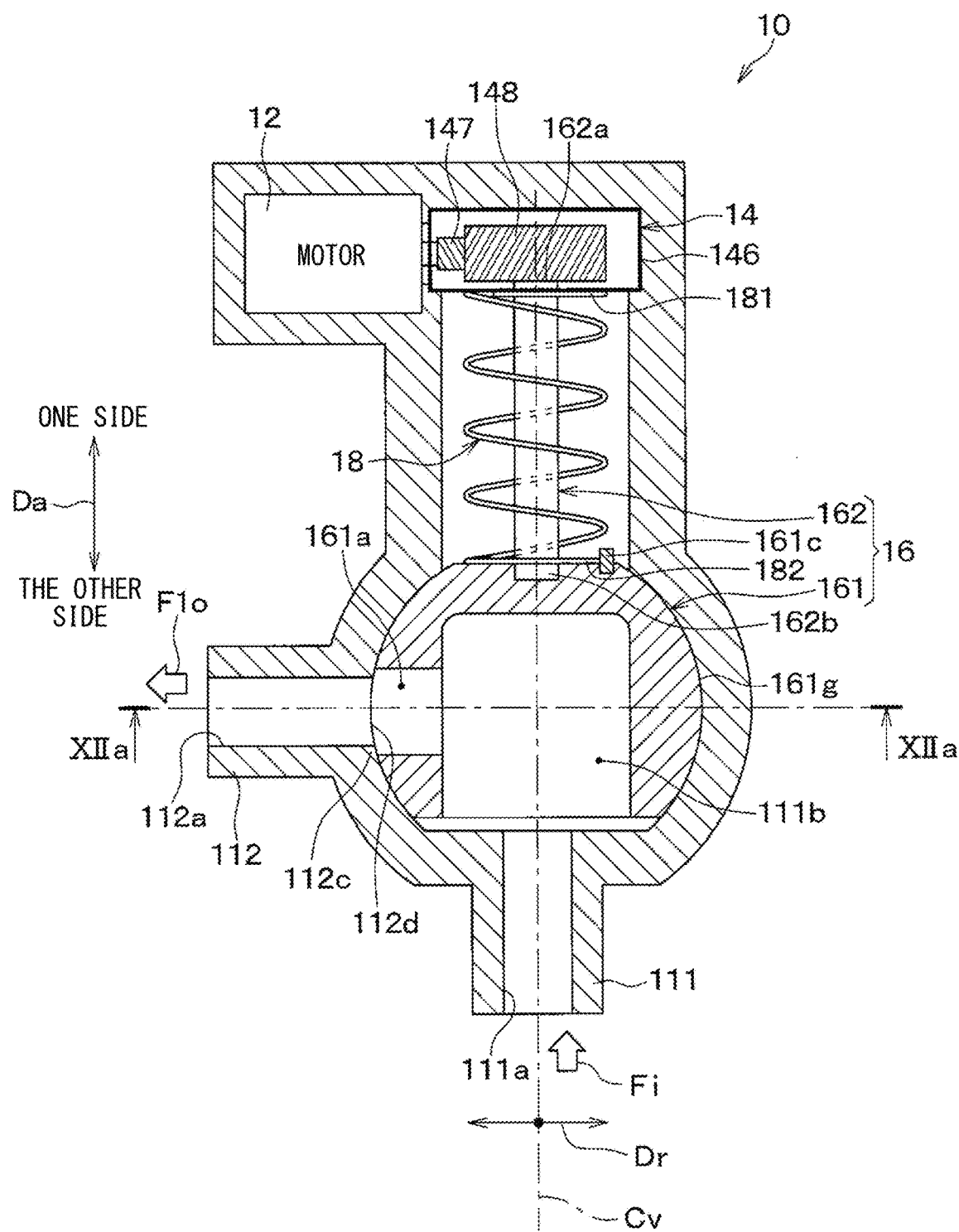
FIG. 17 is a sectional view schematically illustrating an internal structure of a valve device in a seventh embodiment, equivalent to FIG. 11.

As shown in FIG. 17, the valve device 10 according to the present embodiment is a ball valve. Therefore, in the present embodiment, a shape of the rotor 161 is different from that in the fourth embodiment.

Specifically, the rotor 161 includes a spherical ball surface 161g formed as an outer surface of the rotor 161. The other end portion 162b of the valve rotating shaft 162 and the other end portion 182 of the coil spring 18 are coupled with one side of the rotor 161 in the valve axis direction Da.

As in the fourth embodiment, the inlet space 111b is formed inside the rotor 161 and one side of the inlet space 111b in the valve axis direction Da is closed and the other side of the inlet space 111b in the valve axis direction Da is open. The cooling water inlet 111a communicates to the inlet space 111b.

In the present embodiment, a section taken along line XIIa-XIIa of the FIG. 17 is identical with FIG. 12 and a representation of the section taken along line XIIa-XIIa is omitted.

The present embodiment is identical with the fourth embodiment except the foregoing. In the present embodiment, an effect brought about by a configuration element common to the fourth embodiment is obtained as in the fourth embodiment.

Eighth Embodiment

A description will be given to an eighth embodiment. With respect to the present embodiment, a description will be mainly given to a difference from the first embodiment.

Figure 18:
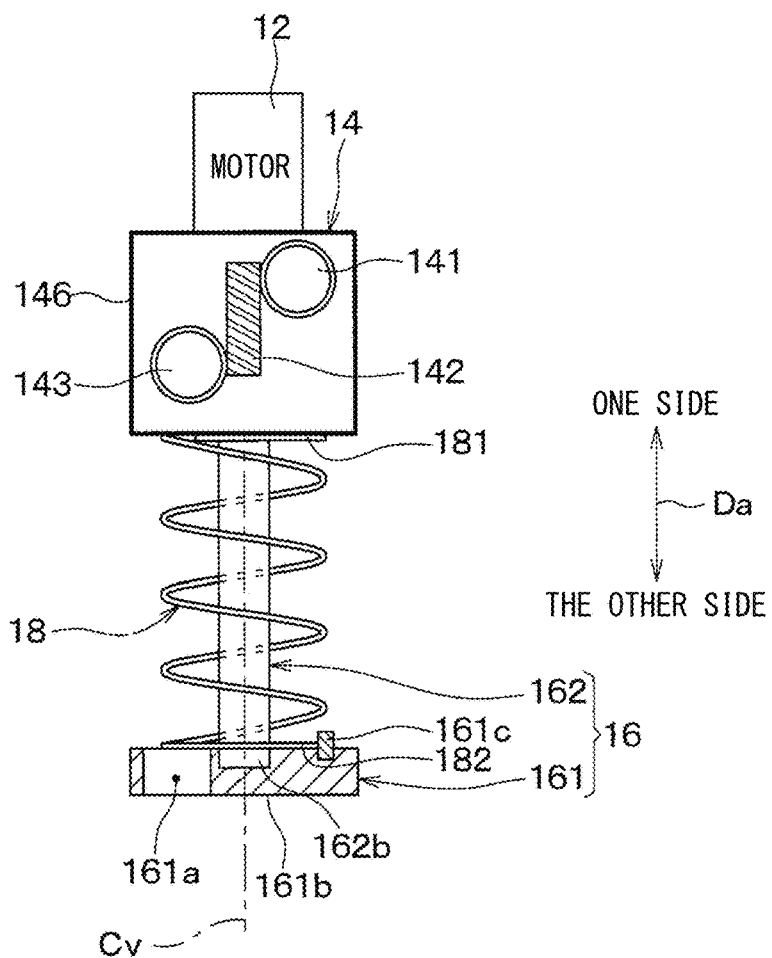
FIG. 18 is a drawing schematically illustrating an internal structure of a valve device in an eighth embodiment, equivalent to FIG. 7.
Figure 19:
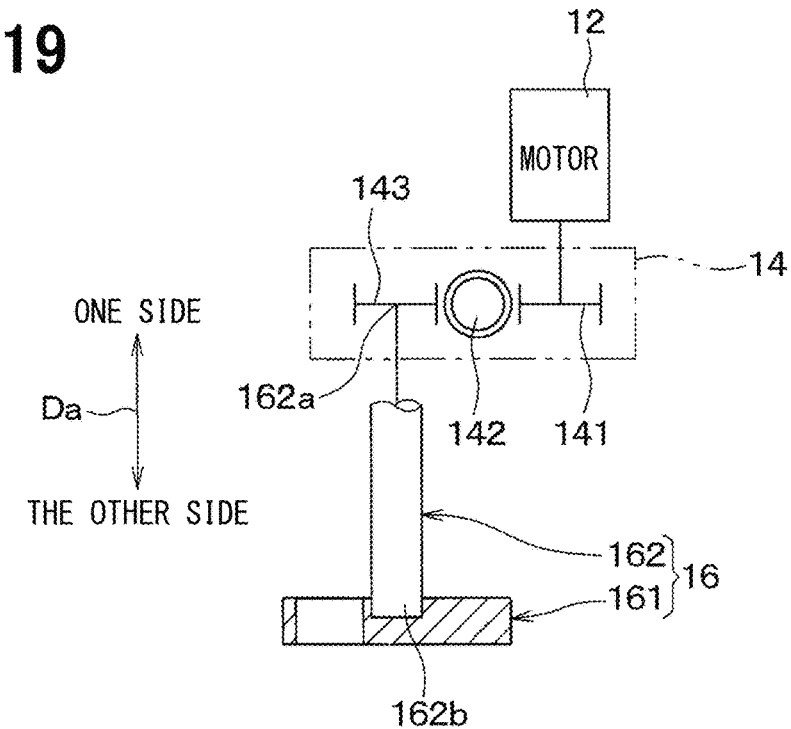
FIG. 19 is a drawing schematically illustrating an internal configuration of a gear mechanism in the eighth embodiment, equivalent to FIG. 5.

As shown in FIG. 18 and FIG. 19, in the present embodiment, the gear mechanism 14 includes the first to third gears 141 to 143 but does not include the fourth gear 144 (refer to FIG. 5). Therefore, the third gear 143 is coupled with the one end portion 162a of the valve rotating shaft 162 in such a manner that relative rotation is impermissible.

The second gear 142 is a worm and the first gear 141 and the third gear 143 are worm wheels respectively engaged with the worm. As in the first embodiment, the first gear 141 is coupled with the rotating shaft of the motor 12 in such a manner that relative rotation is impermissible.

For example, when the motor 12 produces rotating force, the rotating force of the motor 12 is transmitted to the first gear 141 to the second gear 142 to the third gear 143 and is transferred from the third gear 143 to the rotor 161 via the valve rotating shaft 162.

The present embodiment is identical with the first embodiment except the foregoing. In the present embodiment, an effect brought about by a configuration element common to the first embodiment is obtained as in the first embodiment.

Ninth Embodiment

A description will be given to a ninth embodiment. With respect to the present embodiment, a description will be mainly given to a difference from the second embodiment.

Figure 20:
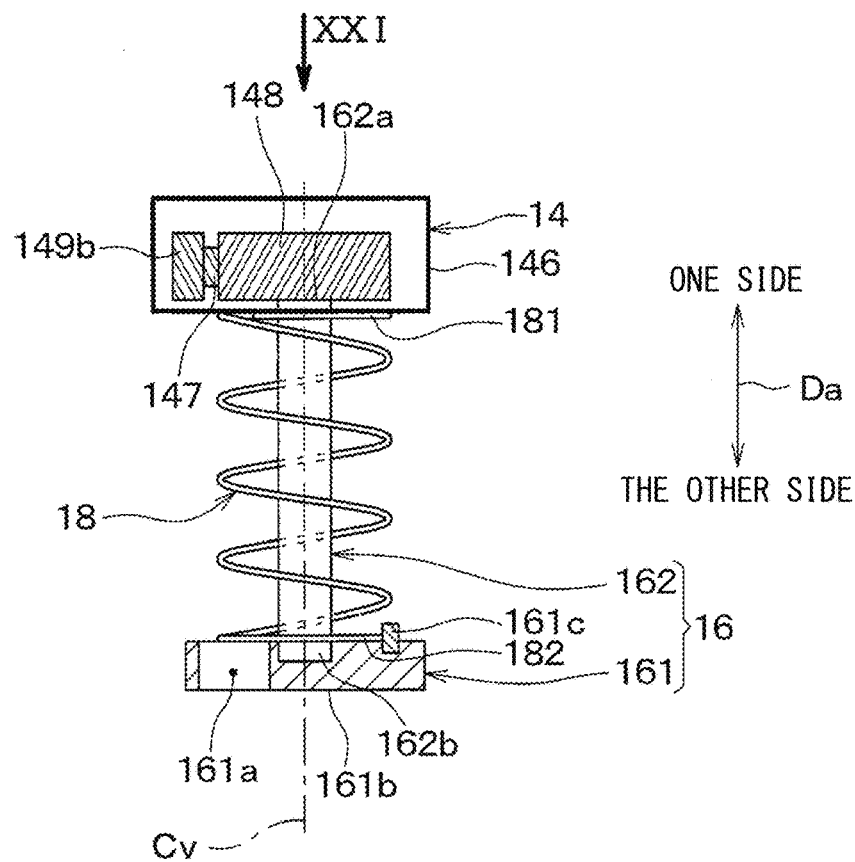
FIG. 20 is a drawing schematically illustrating an internal structure of a valve device in a ninth embodiment, equivalent to FIG. 7.
Figure 21:
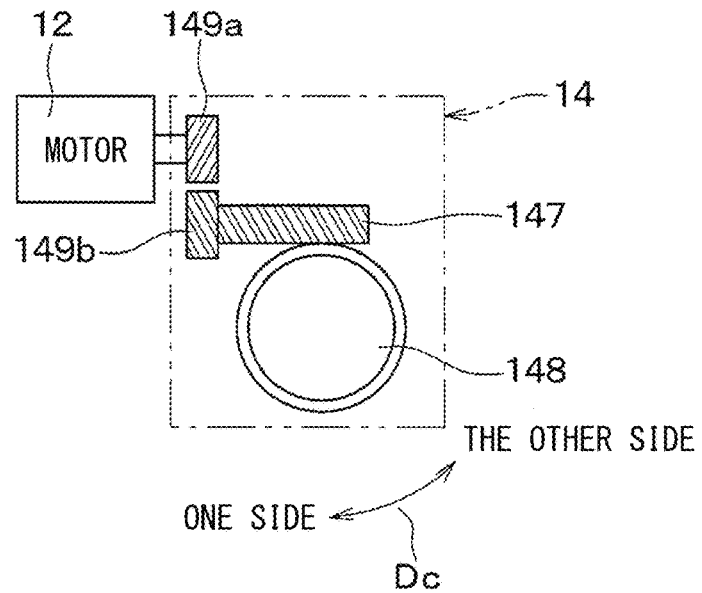
FIG. 21 is a drawing illustrating the valve device as viewed from arrow XXI in FIG. 20, equivalent to FIG. 8.

As shown in FIG. 20 and FIG. 21, in the present embodiment, the gear mechanism 14 includes paired gears 149a, 149b in addition to the worm 147 and the worm wheel 148. The worm 147 is not directly coupled with the rotating shaft of the motor 12 and is disposed on another axis different from the axis of the rotating shaft of the motor 12.

Specifically, the paired gears 149a, 149b in the gear mechanism 14 are made up of a motor-side gear 149a and a worm-side gear 149b. The motor-side gear 149a and the worm-side gear 149b are, for example, helical gears and engaged with each other. The motor-side gear 149a is coupled with the rotating shaft of the motor 12 in such a manner that relative rotation is impermissible and the worm-side gear 149b is coupled with the worm 147 in such a manner that relative rotation is impermissible.

For example, when the motor 12 produces rotating force, the rotating force of the motor 12 is transmitted to the motor-side gear 149a to the worm-side gear 149b to the worm 147 to the worm wheel 148. The rotating force transmitted to the worm wheel 148 is then transferred from the worm wheel 148 to the rotor 161 via the valve rotating shaft 162.

Therefore, as in the second embodiment, also in the present embodiment, the worm 147 corresponds to the above-mentioned driving-side gear in the gear mechanism 14. The worm wheel 148 corresponds to the above-mentioned driven-side gear. The worm 147 is configured as an above-mentioned reverse transmission restricting gear.

The present embodiment is identical with the second embodiment except the foregoing. In the present embodiment, an effect brought about by a configuration element common to the second embodiment is obtained as in the second embodiment.

Though the present embodiment is a modification based on the second embodiment, the present embodiment can also be combined with any of the third to seventh embodiments.

10th Embodiment

A description will be given to a 10th embodiment. With respect to the present embodiment, a description will be mainly given to a difference from the first embodiment.

Figure 22:
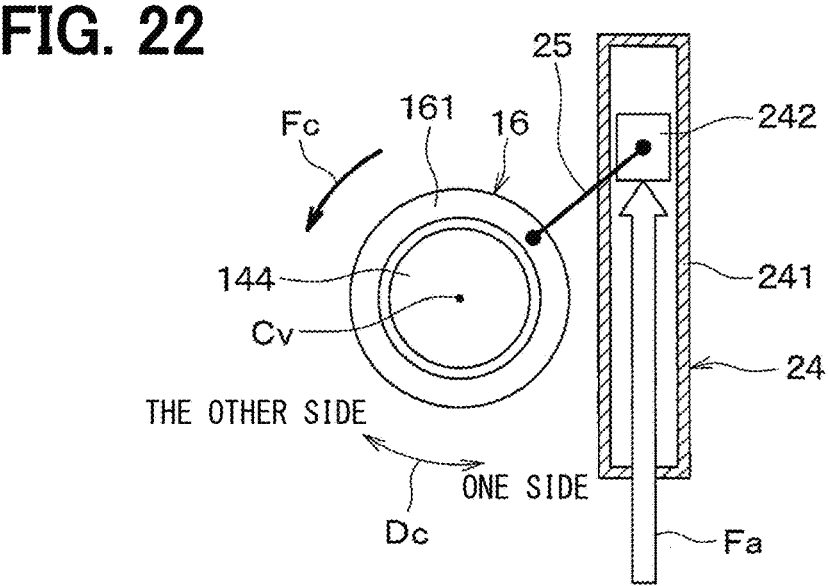
FIG. 22 is a drawing schematically illustrating a configuration of a part of a valve device in a 10th embodiment as viewed from one side toward the other side in a valve axis direction, showing coupling between a cylinder device as a biasing part and a rotor.

As shown in FIG. 22, the valve device 10 according to the present embodiment includes a cylinder device 24 as a biasing part biasing the rotated part 16 toward one side in the valve circumferential direction Dc. For this reason, the coil spring 18 (refer to FIG. 3) is not provided.

The cylinder device 24 includes a hollow cylinder 241 and a piston 242 capable of reciprocating in the axial direction of the cylinder 241 in the cylinder 241. For example, cooling water branched from the cooling water inlet 111a (refer to FIG. 3) is guided as a pressure fluid into the cylinder 241 and the pressure fluid produces pressing force Fa pressing the piston 242 toward one side in the axial direction of the cylinder 241.

The piston 242 is coupled with the rotor 161 via a link 25. Owing to coupling via the link 25, the rotor 161 is rotated toward one side in the valve circumferential direction Dc as the piston 242 moves toward one side in the axial direction of the cylinder 241. For this reason, the cylinder device 24 produces energization force Fc biasing the rotated part 16 toward one side in the valve circumferential direction Dc by pressing force Fa of a pressure fluid.

The present embodiment is identical with the first embodiment except the foregoing. In the present embodiment, an effect brought about by a configuration element common to the first embodiment is obtained as in the first embodiment.

Though the present embodiment is a modification based on the first embodiment, the present embodiment can also be combined with any of the second to ninth embodiments.

11th Embodiment

A description will be given to an 11th embodiment. With respect to the present embodiment, a description will be mainly given to a difference from the 10th embodiment.

Figure 23:
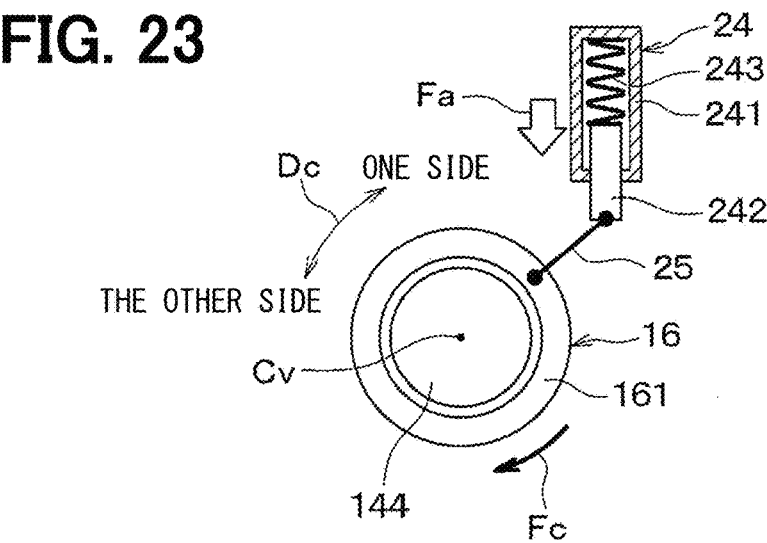
FIG. 23 is a drawing schematically illustrating a configuration of a part of a valve device in an 11th embodiment as viewed from one side toward the other side in a valve axis direction, equivalent to FIG. 22.

As shown in FIG. 23, in the present embodiment, a pressure fluid is not guided into the cylinder 241 in the cylinder device 24. Instead, the cylinder device 24 includes a spring 243 housed in the cylinder 241. In the present embodiment, the spring 243 functions as a biasing part.

Specifically, the spring 243 of the cylinder device 24 is a compression spring held compressed. The spring 243 produces pressing force Fa pressing the piston 242 toward one side in the axial direction of the cylinder 241 by compression elastic deformation of the spring 243.

As the result of intervention of the link 25, pressing force Fa of the spring 243 becomes energization force Fc biasing the rotated part 16 toward one side in the valve circumferential direction Dc. That is, the spring 243 of the cylinder device 24 is an elastic member that produces energization force Fc for the rotated part 16 by compression elastic deformation of the spring 243. As mentioned above, the spring 243 functions as a biasing part biasing the rotated part 16 toward one side in the valve circumferential direction Dc.

The present embodiment is identical with the 10th embodiment except the foregoing. In the present embodiment, an effect brought about by a configuration element common to the 10th embodiment is obtained as in the 10th embodiment.

12th Embodiment

A description will be given to a 12th embodiment. With respect to the present embodiment, a description will be mainly given to a difference from the first embodiment.

Figure 24:
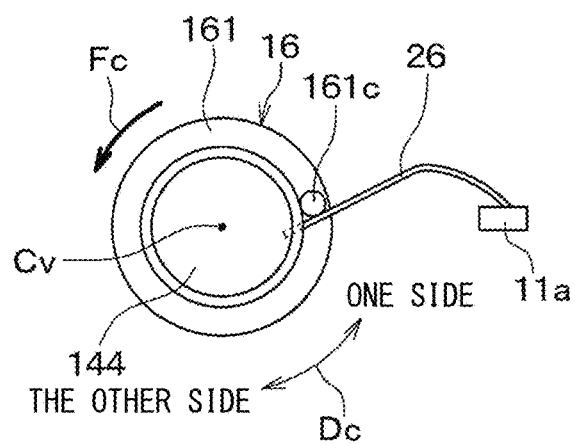
FIG. 24 is a drawing schematically illustrating a configuration of a part of a valve device in a 12th embodiment as viewed from one side toward the other side in a valve axis direction, equivalent to FIG. 22.

As shown in FIG. 24, the valve device 10 according to the present embodiment is provided with a leaf spring 26 as a biasing part biasing the rotated part 16 toward one side in the valve circumferential direction Dc. For this reason, the coil spring 18 (refer to FIG. 3) is not provided.

A one end portion of the leaf spring 26 is fixed on a spring end fixing portion 11a constituting a part of the housing 11. The other end portion of the leaf spring 26 is anchored to the pin 161c fixed on the rotor 161. The leaf spring 26 is elastically deformed and bent at no load.

As elastic deformation of the leaf spring 26 approaches a no-load state, the rotor 161 is rotated toward one side in the valve circumferential direction Dc. That is, the leaf spring 26 produces energization force Fc biasing the rotated part 16 toward one side in the valve circumferential direction Dc by bending elastic deformation of the leaf spring 26. Therefore, the leaf spring 26 is an elastic member that produces energization force Fc for the rotated part 16 by bending elastic deformation of the leaf spring 26.

The present embodiment is identical with the first embodiment except the foregoing. In the present embodiment, an effect brought about by a configuration element common to the first embodiment is obtained as in the first embodiment.

Though the present embodiment is a modification based on the first embodiment, the present embodiment can also be combined with any of the second to ninth embodiments.

13th Embodiment

A description will be given to a 13th embodiment. With respect to the present embodiment, a description will be mainly given to a difference from the first embodiment.

Figure 25:
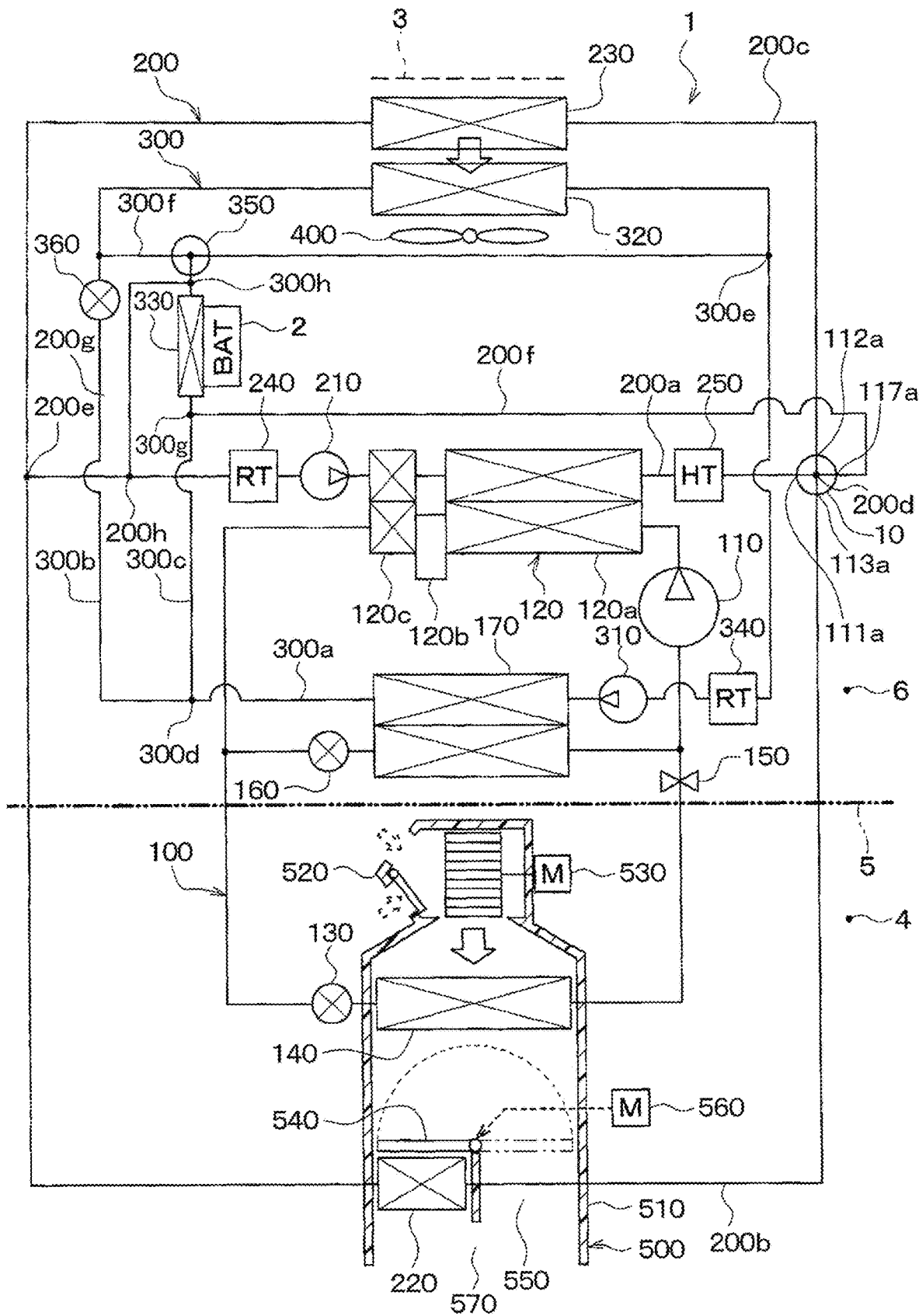
FIG. 25 is an overall block diagram of a vehicular temperature control device in a 13th embodiment.

As shown in FIG. 25, the valve device 10 according to the present embodiment is a high temperature-side four-way valve 10 of a vehicular temperature control device 1. Consequently, in the description of the present embodiment, the valve device 10 will be referred to as high temperature-side four-way valve 10.

The vehicular temperature control device 1 is an air conditioner conditioning air in the cabin (in other words, air-conditioned space) to an appropriate temperature for a vehicle. The vehicular temperature control device 1 is also a battery temperature controller adjusting a battery 2 to an appropriate temperature. The vehicular temperature control device 1 is also a battery cooler cooling the battery 2. The vehicular temperature control device 1 is also a battery heater heating the battery 2.

In the present embodiment, the vehicular temperature control device 1 is applied to an electric automobile (in other words, electric vehicle). The electric automobile is a vehicle that obtains driving force for vehicle running from a traction electric motor. In the electric automobile in the present embodiment, the battery 2 mounted in the vehicle (in other words, onboard battery) can be charged with electric power supplied from an external power source (in other words, commercial power source) when the vehicle is at a stop. For the battery 2, for example, a lithium-ion battery can be adopted.

Electric power accumulated in the battery 2 is supplied to the traction electric motor as well as varied electrically powered equipment and varied onboard equipment of the vehicular temperature control device 1.

The vehicular temperature control device 1 includes a refrigeration cycle device 100. The refrigeration cycle device 100 is a vapor compression refrigerator provided with a compressor 110, a condenser 120, a first expansion valve 130, an air-side evaporator 140, a constant-pressure valve 150, a second expansion valve 160, and a cooling water-side evaporator 170. A refrigerant of the refrigeration cycle device 100 is a chlorofluorocarbon refrigerant. The refrigeration cycle device 100 is a subcritical refrigeration cycle in which a high pressure-side refrigerant pressure does not exceed a critical pressure of a refrigerant.

The second expansion valve 160 and the cooling water-side evaporator 170 are disposed in parallel with the first expansion valve 130, the air-side evaporator 140, and the constant-pressure valve 150 in a refrigerant flow.

In the refrigeration cycle device 100, a first refrigerant circulation circuit and a second refrigerant circulation circuit are formed. In the first refrigerant circulation circuit, a refrigerant is circulated in the order of the compressor 110, the condenser 120, the first expansion valve 130, the air-side evaporator 140, the constant-pressure valve 150, and the compressor 110. In the second refrigerant circulation circuit, a refrigerant is circulated in the order of the compressor 110, the condenser 120, the second expansion valve 160, and the cooling water-side evaporator 170.

Figure 26:
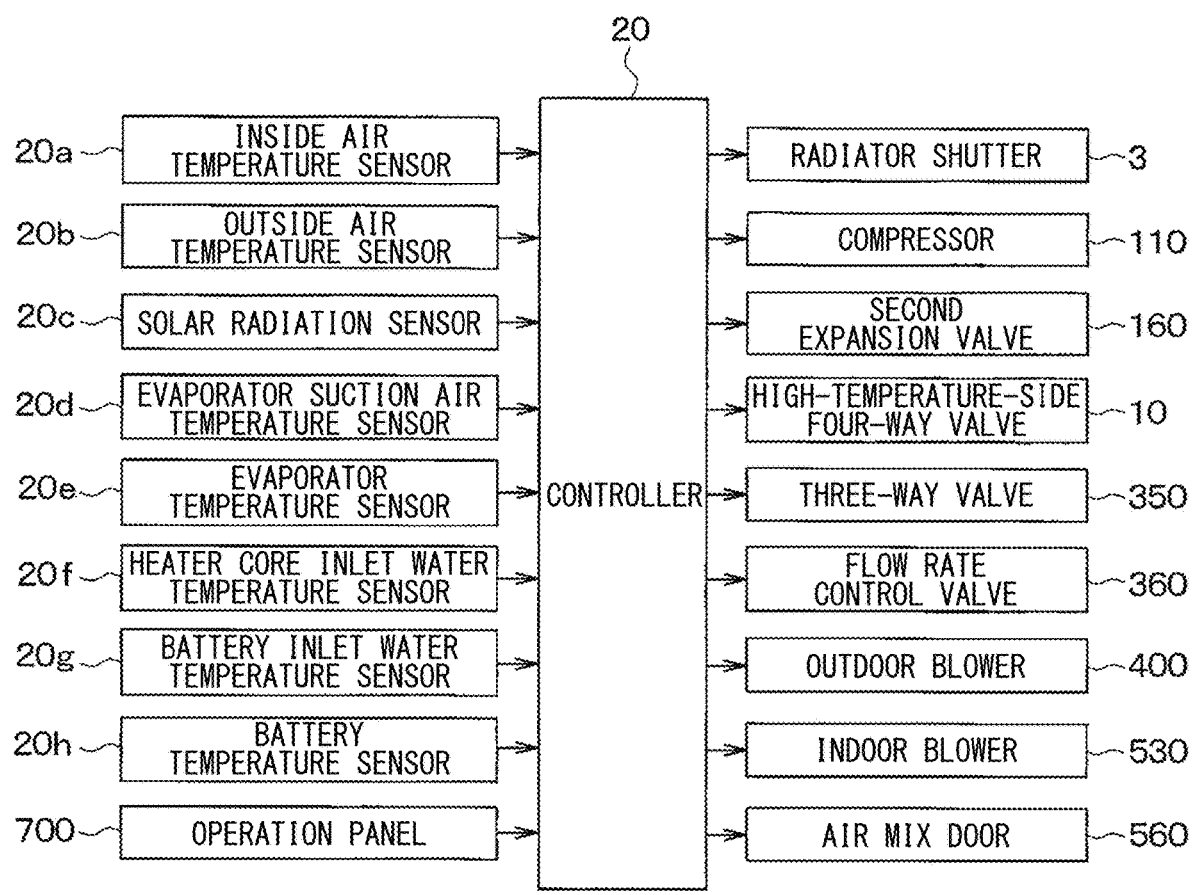
FIG. 26 is a block diagram illustrating an electric control unit of a vehicular temperature control device in the 13th embodiment.

The compressor 110 is a motor compressor driven by electric power supplied from the battery 2 and sucks, compresses, and discharges a refrigerant in the refrigeration cycle device 100. As shown in FIG. 25 and FIG. 26, an electric motor of the compressor 110 is controlled by the control device 20. The compressor 110 may be a variable displacement compressor driven by a belt.

The condenser 120 is a high pressure-side heat exchanger exchanging heat between a high pressure-side refrigerant discharged from the compressor 110 and cooling water in a high-temperature cooling water circuit 200.

The condenser 120 includes a condensing part 120a, a receiver 120b, and a supercooling part 120c. The condensing part 120a exchanges heat between a high pressure-side refrigerant discharged from the compressor 110 and cooling water in the high-temperature cooling water circuit 200, thereby condensing the high pressure-side refrigerant. The condenser 120 is a heat radiator radiating heat from a refrigerant discharged from the compressor 110 to cooling water.

Cooling water in the high-temperature cooling water circuit 200 is a fluid as a heating medium. Cooling water in the high-temperature cooling water circuit 200 is a high-temperature heating medium. In the present embodiment, for cooling water in the high-temperature cooling water circuit 200, a liquid or an antifreeze liquid containing at least ethylene glycol, dimethylpolysiloxane, or a nanofluid is used. The high-temperature cooling water circuit 200 is a high-temperature heating medium circuit in which a high-temperature heating medium is circulated.

The receiver 120*b* is a vapor-liquid separating part that separates a high-pressure refrigerant flowing out of the condenser 120 into vapor and liquid, lets a separated liquid-phase refrigerant flow to the downstream side, and accumulates a surplus refrigerant of the cycle.

The supercooling part 120*c* exchanges heat between a liquid-phase refrigerant flowing out of the receiver 120*b* and cooling water in the high-temperature cooling water circuit 200 and supercools the liquid-phase refrigerant.

The first expansion valve 130 is a first pressure reducing portion depressurizing and expanding a liquid-phase refrigerant flowing out of the receiver 120*b*. The first expansion valve 130 is a mechanical temperature expansion valve. The mechanical expansion valve is a temperature expansion valve having a temperature sensing part and driving a valve body by such a mechanical mechanism as a diaphragm. The first expansion valve 130 may be an electric expansion valve.

The air-side evaporator 140 is an evaporator that exchanges heat between a refrigerant flowing out of the first expansion valve 130 and air blown into a cabin, thereby evaporating the refrigerant. In the air-side evaporator 140, a refrigerant absorbs heat from air blown into the cabin. The air-side evaporator 140 is an air cooler cooling air blown into the cabin.

The constant-pressure valve 150 is a pressure regulating unit maintaining a pressure of a refrigerant on the outlet side of the air-side evaporator 140 at a predetermined value. The constant-pressure valve 150 is constituted of a mechanical or electrical variable throttle mechanism. Specifically, when a pressure of a refrigerant on the outlet side of the air-side evaporator 140 falls below the predetermined value, the constant-pressure valve 150 reduces a passage area of a refrigerant passage. When a pressure of a refrigerant on the outlet side of the air-side evaporator 140 exceeds the predetermined value, the constant-pressure valve increases a passage area of the refrigerant passage. A vapor-phase refrigerant whose pressure is regulated at the constant-pressure valve 150 is sucked into the compressor 110 and compressed. That a passage area of the above-mentioned refrigerant passage is reduced is equivalent to that a throttle opening of the refrigerant passage is reduced; and that a passage area of the above-mentioned refrigerant passage is increased is equivalent to that a throttle opening of the refrigerant passage is increased.

When a flow rate of a circulating refrigerant circulating in the cycle does not vary so much or on other like occasions, a fixed throttle constituted of an orifice, a capillary tube, or the like may be adopted instead of the constant-pressure valve 150.

The second expansion valve 160 is a second pressure reducing portion depressurizing and expanding a liquid-phase refrigerant flowing out of the condenser 120. The second expansion valve 160 is an electric expansion valve. The electric expansion valve is an electric variable throttle mechanism configured with a valve body with a variable throttle opening and an electric actuator varying an opening of the valve body. The second expansion valve 160 is capable of fully closing a refrigerant channel.

The second expansion valve 160 is a refrigerant flow switching unit switching between a state in which a refrigerant flows to the air-side evaporator 140 of the air-side evaporator 140 and the cooling water-side evaporator 170 and a state in which a refrigerant flows to both the air-side evaporator 140 and the cooling water-side evaporator 170.

An operation of the second expansion valve 160 is controlled according to a control signal outputted from the control device 20. The second expansion valve 160 may be a mechanical temperature expansion valve. When the second expansion valve 160 is a mechanical temperature expansion valve, an on-off valve opening and closing a refrigerant channel on the second expansion valve 160 side need be provided separately from the second expansion valve 160.

The cooling water-side evaporator 170 is an evaporator exchanging heat a refrigerant flowing out of the second expansion valve 160 and cooling water in a low-temperature cooling water circuit 300, thereby evaporating the refrigerant. At the cooling water-side evaporator 170, a refrigerant absorbs heat from cooling water in the low-temperature cooling water circuit 300. The cooling water-side evaporator 170 is a heating medium cooler that cools the cooling water in the low-temperature cooling water circuit 300. A vapor-phase refrigerant evaporated at the cooling water-side evaporator 170 is sucked into the compressor 110 and compressed.

Cooling water in the low-temperature cooling water circuit 300 is a fluid as a heating medium. Cooling water in the low-temperature cooling water circuit 300 is a low-temperature heating medium. In the present embodiment, for cooling water in the low-temperature cooling water circuit 300, a liquid or an antifreeze liquid containing at least ethylene glycol, dimethylpolysiloxane, or a nanofluid is used. The low-temperature cooling water circuit 300 is a low-temperature heating medium circuit in which a low-temperature heating medium is circulated.

In the high-temperature cooling water circuit 200, the condenser 120, a high temperature-side pump 210, a heater core 220, a high temperature-side radiator 230, a high temperature-side reserve tank 240, an electric heater 250, and the high temperature-side four-way valve 10 are disposed.

The high temperature-side pump 210 is a heating medium pump sucking and discharging cooling water. The high temperature-side pump 210 is an electric pump with a constant discharge flow rate. The high temperature-side pump 210 may be an electric pump with a variable discharge flow rate.

The heater core 220 exchanges heat between cooling water in the high-temperature cooling water circuit 200 and air flowing into the cabin, thereby heating the air flowing into the cabin. That is, in the heater core 220, cooling water radiates heat to air flowing into the cabin. In short, the heater core 220 is an air heater heating air flowing into the cabin.

The high temperature-side radiator 230 is a heat exchanger that exchanges heat between cooling water in the high-temperature cooling water circuit 200 and air outside the cabin (that is, outside air) and radiates heat from the cooling water to the outside air.

The high temperature-side reserve tank 240 is a cooling water reserving unit reserving surplus cooling water. By reserving surplus cooling water in the high temperature-side reserve tank 240, reduction in a liquid quantity of cooling water circulating in each channel can be suppressed.

The high temperature-side reserve tank 240 has a function of separating cooling water into vapor and liquid. The high temperature-side reserve tank 240 has a function of separating air contained in cooling water (that is, air bubbles).

The high temperature-side reserve tank 240 is a closed reserve tank. Air separated at the high temperature-side reserve tank 240 is reserved in the high temperature-side reserve tank 240. By utilizing compressibility of air reserved in the high temperature-side reserve tank 240, a pressure at a liquid level of cooling water reserved in the high temperature-side reserve tank 240 is adjusted.

The electric heater 250 is a heating unit that produces heat when electric power is supplied and thereby heats cooling water in the high-temperature cooling water circuit 200. The electric heater 250 is a heat producing unit capable of producing heat independently of a running state of the vehicle.

The condenser 120, the high temperature-side pump 210, the high temperature-side reserve tank 240, and the electric heater 250 are disposed in a condenser channel 200a. The condenser channel 200a is a channel through which cooling water in the high-temperature cooling water circuit 200 flows.

The condenser 120, the high temperature-side pump 210, the high temperature-side reserve tank 240, and the electric heater 250 are disposed in the order of the high temperature-side reserve tank 240, the high temperature-side pump 210, the condenser 120, and the electric heater 250 in a cooling water flow direction in the condenser channel 200a.

The heater core 220 is disposed in a heater core channel 200b. The heater core channel 200b is a channel through which cooling water in the high-temperature cooling water circuit 200 flows.

The high temperature-side radiator 230 is disposed in a high temperature-side radiator channel 200c. The high temperature-side radiator channel 200c is a channel through which cooling water in the high-temperature cooling water circuit 200 flows in parallel with the heater core channel 200b.

The heater core channel 200b and the high temperature-side radiator channel 200c are connected to the condenser channel 200a in parallel with each other.

The heater core 220 and the high temperature-side radiator 230 are disposed in parallel with each other in a cooling water flow in the high-temperature cooling water circuit 200.

The heater core channel 200b and the high temperature-side radiator channel 200c is branched off from the condenser channel 200a at a high temperature-side first branch portion 200d. At the high temperature-side first branch portion 200d, cooling water heat-radiated in the condenser 120 is branched to the high temperature-side radiator channel 200c side and the heater core 220 side.

The heater core channel 200b and the high temperature-side radiator channel 200c meet the condenser channel 200a at a high temperature-side first meeting portion 200e. At the high temperature-side first meeting portion 200e, cooling water flowing through the high temperature-side radiator channel 200c and cooling water flowing through the heater core 220 meet each other toward the condenser 120 side.

The high temperature-side four-way valve 10 is disposed at the high temperature-side first branch portion 200d. The high temperature-side four-way valve 10 is an electrically operated valve opening and closing the heater core channel 200b and the high temperature-side radiator channel 200c.

A battery inlet-side channel 200f is also connected to the high temperature-side four-way valve 10. The high temperature-side first branch portion 200d is also a high temperature-side second branch portion at which cooling water heat-radiated in the condenser 120 is branched toward the battery heat exchanger 330 side.

The high temperature-side four-way valve 10 is a high temperature-side switching unit switching between a state in which cooling water heat-radiated in the condenser 120 flows to the battery heat exchanger 330 and a state in which the cooling water does not.

Figure 27:
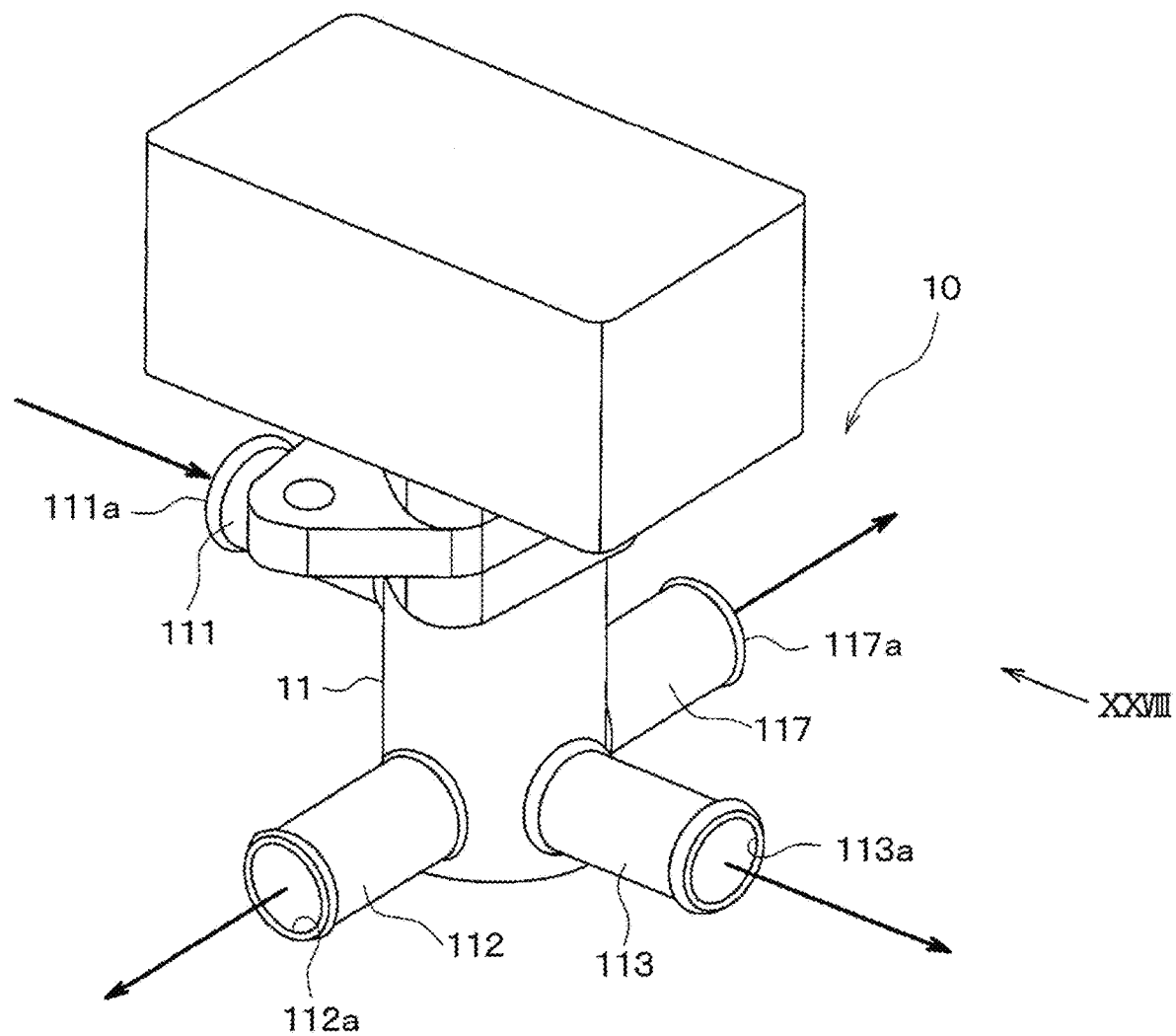
FIG. 27 is a perspective view of a high temperature-side four-way valve of a vehicular temperature control device in the 13th embodiment.

As shown in FIG. 25 and FIG. 27, the high temperature-side four-way valve 10 includes one cooling water inlet 111a and three cooling water outlets 112a, 113a, 117a. The high temperature-side four-way valve 10 adjusts opening areas of the heater core channel 200b and the high temperature-side radiator channel 200c. The high temperature-side four-way valve 10 is a heater core flow rate reducing unit adjusting a flow rate of cooling water of the high-temperature cooling water circuit 200 flowing into the heater core channel 200b. The high temperature-side four-way valve 10 is a high temperature-side radiator flow rate reducing unit adjusting a flow rate of cooling water of the high-temperature cooling water circuit 200 flowing into the high temperature-side radiator channel 200c. Operation of the high temperature-side four-way valve 10 is controlled by the control device 20.

The high temperature-side four-way valve 10 opens and closes the heater core channel 200b, the high temperature-side radiator channel 200c, and the battery inlet-side channel 200f. That is, the high temperature-side four-way valve 10 adjusts opening areas of the heater core channel 200b, the high temperature-side radiator channel 200c, and the battery inlet-side channel 200f.

The high temperature-side four-way valve 10 adjusts a flow rate ratio between cooling water flowing through the heater core 220 and cooling water flowing through the high temperature-side radiator 230.

A battery outlet-side channel 200g is connected to a high temperature-side second meeting portion 200h of the condenser channel 200a. The high temperature-side second meeting portion 200h is disposed in an area of the high temperature-side reserve tank 240 located on the cooling water inlet side in the condenser channel 200a. At the high temperature-side second meeting portion 200h, cooling water flowing through the battery heat exchanger 330 meets toward the condenser 120 side.

The high temperature-side four-way valve 10 is one valve device that opens and closes a cooling water channel on the battery heat exchanger 330 side and further adjusts an opening of a cooling water channel on the high temperature-side radiator 230 side and an opening of a cooling water channel on the heater core 220 side.

Figure 28:
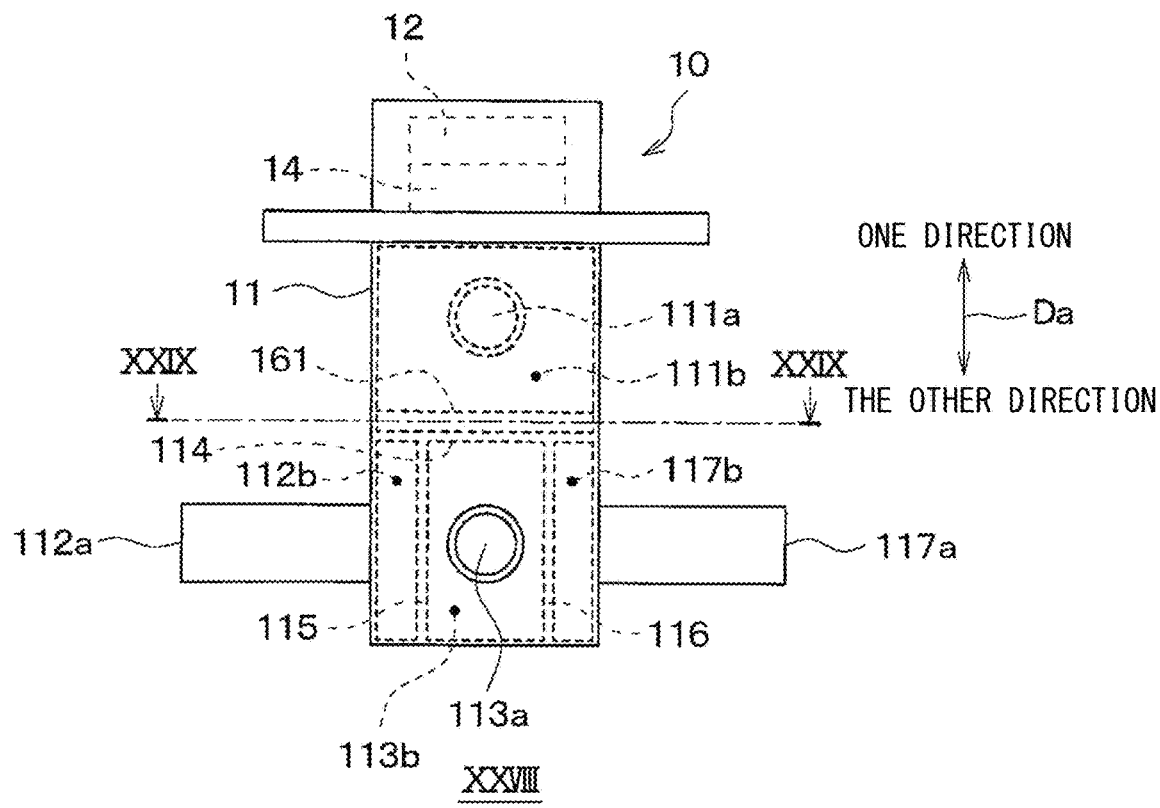
FIG. 28 is a drawing illustrating the high temperature-side four-way valve as viewed from arrow XXVIII in FIG. 27.

As shown in FIG. 27 and FIG. 28, the high temperature-side four-way valve 10 includes the housing 11, the motor 12 as an actuator, the gear mechanism 14, the rotor 161, the valve rotating shaft 162 (refer to FIG. 3), and the coil spring 18 (refer to FIG. 3). FIG. 27 to FIG. 33 are drawings illustrating the high temperature-side four-way valve 10 but in FIG. 27 to FIG. 33, representations of the valve rotating shaft 162 and the coil spring 18 are omitted.

The high temperature-side four-way valve 10 as a valve device according to the present embodiment is different in a number of ports from the valve device 10 in the first embodiment but has the same structure as the valve device 10 in the first embodiment does. Therefore, in the high temperature-side four-way valve 10, the coil spring 18 energizes the rotor 161 toward one side in the valve circumferential direction Dc. The rotor 161 and the valve rotating shaft 162 are rotated according to rotational motion of the motor 12 while being biased toward one side in the valve circumferential direction Dc by the coil spring 18.

The housing 11 of the high temperature-side four-way valve 10 includes a third outlet port 117 with a third outlet 117a formed therein in addition to the inlet port 111, the first outlet port 112, and the second outlet port 113. That is, the cooling water inlet 111a, the first outlet 112a as a radiator-side outlet, the second outlet 113a as a heater core-side outlet, and the third outlet 117a as a battery-side outlet are formed in the housing 11.

The first outlet 112a is connected to the high temperature-side radiator channel 200c. That is, the first outlet port 112 with the first outlet 112a formed therein is coupled with the upstream side of a cooling water flow (in other words, upstream side of a fluid flow) in the high temperature-side radiator 230 as a first heat exchanger and lets the cooling water flow out to the high temperature-side radiator 230.

The second outlet 113a is connected to the heater core channel 200b. That is, the second outlet port 113 with the second outlet 113a formed therein is coupled with the upstream side of a cooling water flow in the heater core 220 as a second heat exchanger and lets the cooling water flow out to the heater core 220.

The third outlet 117a is connected to the battery inlet-side channel 200f.

The cooling water inlet 111a is connected to the condenser channel 200a. That is, the inlet port 111 with the cooling water inlet 111a formed therein is coupled with the downstream side of a cooling water flow in the high temperature-side radiator 230 and the downstream side of a cooling water flow in the heater core 220 and cooling water flows from the high temperature-side radiator 230 and the heater core 220 into the inlet port 111.

The inlet space 111b, the first outlet space 112b as a radiator-side space, the second outlet space 113b as a heater core-side space, and a third outlet space 117b as a battery-side space are formed inside the housing 11.

The inlet space 111b is a heating medium inlet space. The inlet space 111b is in communication with the cooling water inlet 111a. The first outlet space 112b is in communication with the first outlet 112a. The second outlet space 113b is in communication with the second outlet 113a. The third outlet space 117b is in communication with the third outlet 117a.

The housing 11 of the high temperature-side four-way valve 10 includes an outlet-side second partitioning portion 116 in addition to the inlet/outlet partitioning portion 114 and the outlet-side first partitioning portion 115 equivalent to the outlet-side partitioning portion 115 in the first embodiment. The outlet-side second partitioning portion 116 is formed in a shape of a plate and divides the second outlet space 113b and the third outlet space 117b from each other.

The inlet/outlet partitioning portion 114 divides the inlet space 111b, the first outlet space 112b, the second outlet space 113b, and the third outlet space 117b from one another. The inlet space 111b is disposed on one side in the valve axis direction Da with respect to the inlet/outlet partitioning portion 114 and the first outlet space 112b, the second outlet space 113b, and the third outlet space 117b are disposed on the other side in the valve axis direction Da with respect to the inlet/outlet partitioning portion 114.

The second outlet space 113b is positioned between the first outlet space 112b and the third outlet space 117b.

Figure 29:
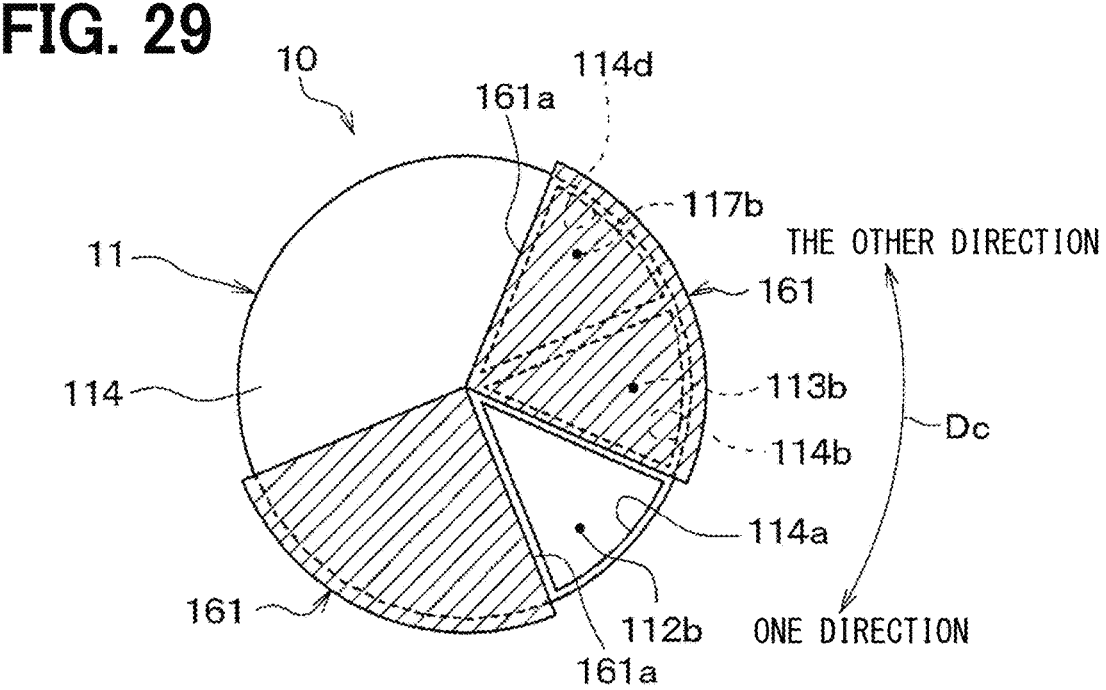
FIG. 29 is a schematic diagram illustrating a section taken along line XXIX-XXIX of FIG. 28, showing an operating state of a high temperature-side four-way valve in the 13th embodiment in a cooling/battery cooling mode.

As shown in FIG. 27 to FIG. 29, first to third flow holes 114a, 114b, 114d through which cooling water passes in the housing 11 are formed in the inlet/outlet partitioning portion 114. The inlet space 111b communicates to the first outlet space 112b through the first flow hole 114a, communicates to the second outlet space 113b through the second flow hole 114b, and communicates to the third outlet space 117b through the third flow hole 114d.

Therefore, in cases where cooling water flows from the inlet port 111 to the first outlet port 112, the cooling water passes through the first flow hole 114a and then flows to the first outlet port 112. In cases where cooling water flows from the inlet port 111 to the second outlet port 113, the cooling water passes through the second flow hole 114b and then flows to the second outlet port 113. In cases where cooling water flows from the inlet port 111 to the third outlet port 117, the cooling water passes through the third flow hole 114d and then flows to the third outlet port 117.

The rotor 161 is a valve body of the high temperature-side four-way valve 10. An area equivalent to the rotor hole 161a (refer to FIG. 3) of the rotor 161 in the first embodiment is in a shape of a notch, not in a shape of a hole, in the present embodiment. Therefore, the area equivalent to the rotor hole 161a is designated as rotor opening 161a in the present embodiment. In the rotor 161, the rotor opening 161a is so formed that the rotor opening is divided into two.

The rotor 161 opens or closes the first flow hole 114a, the second flow hole 114b, and the third flow hole 114d and thereby varies a state of communication between each of the first outlet space 112b, the second outlet space 113b, and the third outlet space 117b and the inlet space 111b.

That the first flow hole 114a is closed is equivalent to that the first outlet space 112b is closed from the inlet space 111b and that the second flow hole 114b is closed is equivalent to that the second outlet space 113b is closed from the inlet space 111b. That the third flow hole 114d is closed is equivalent to that the third outlet space 117b is closed from the inlet space 111b.

A movable range of the rotated part 16 (refer to FIG. 3) in the valve circumferential direction Dc includes not only the above-mentioned first and second opening limiting ranges W1, W2 but also a third opening limiting range within which an opening of the third flow hole 114d is smaller than the fully opened opening and is at the same time larger than the fully closed opening. Energization force Fc (refer to FIG. 4) of the coil spring 18 continues to act on the rotor 161 not only during adjustment of openings of the first and second flow holes 114a, 114b but also during adjustment of an opening of the third flow hole 114d. That is, in cases where the rotated part 16 provided with the rotor 161 is located in a rotational position within the above-mentioned third opening limiting range, the coil spring 18 energizes the rotated part 16 toward one side in the valve circumferential direction Dc wherever the rotational position is within the third opening limiting range.

The rotor 161 is rotationally operated by rotational driving force (in other words, rotating force) of the motor 12. Operation of the motor 12 is controlled by the control device 20.

FIG. 29 shows an operating state of the high temperature-side four-way valve 10 in a cooling/battery cooling mode. In the operating state in FIG. 29, the rotor 161 opens the first outlet space 112b, closes the second outlet space 113b, and closes the third outlet space 117b to the inlet space 111b.

Figure 30:
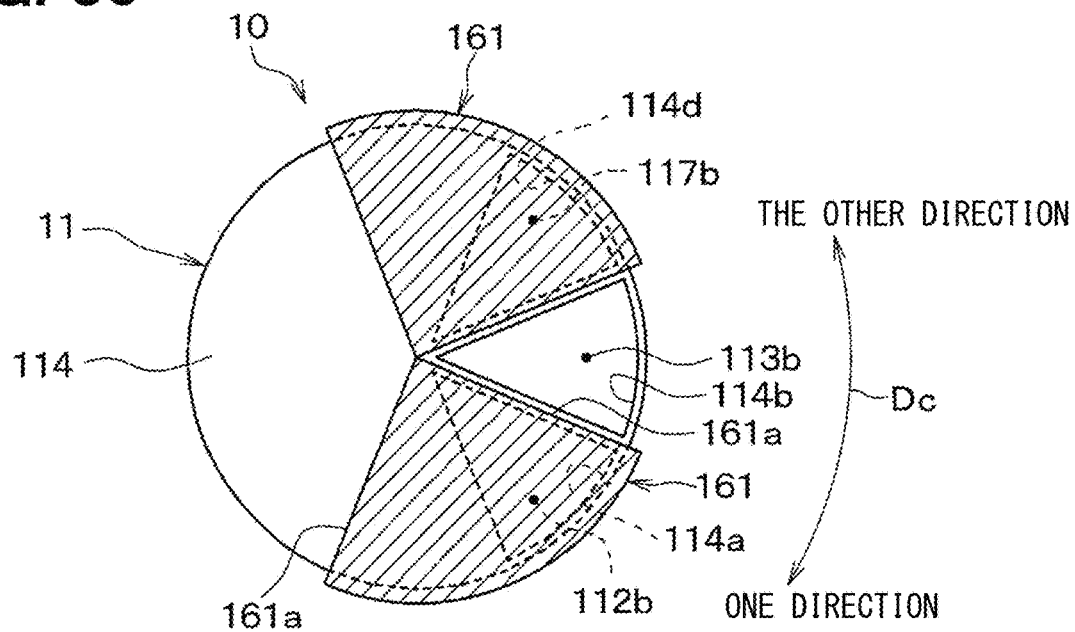
FIG. 30 is a schematic diagram illustrating an operating state of a high temperature-side four-way valve in the 13th embodiment in a heating mode.

FIG. 30 shows an operating state of the high temperature-side four-way valve 10 in a heating mode. In the operating state in FIG. 30, the rotor 161 closes the first outlet space 112b, opens the second outlet space 113b, and closes the third outlet space 117b to the inlet space 111b.

Figure 31:
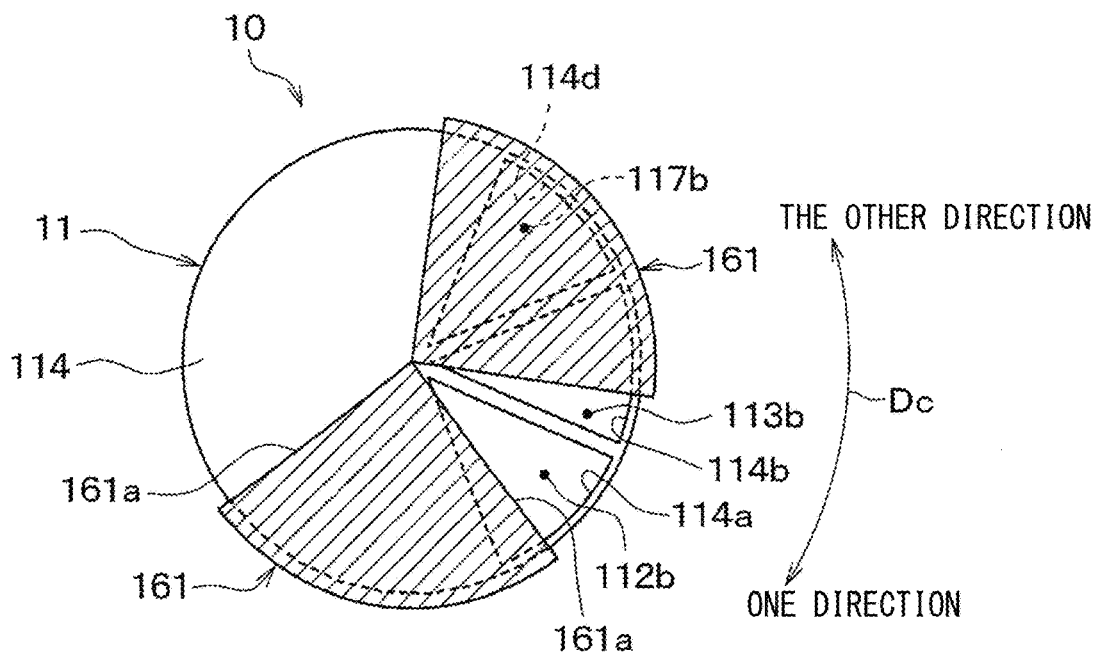
FIG. 31 is a schematic diagram illustrating an operating state of a high temperature-side four-way valve in the 13th embodiment in a dehumidification heating mode.

FIG. 31 shows an operating state of the high temperature-side four-way valve 10 in a dehumidification heating mode. In the operating state in FIG. 31, the rotor 161 is rotationally operated to open the first outlet space 112b, open the second outlet space 113b, and close the third outlet space 117b to the inlet space 111b.

Figure 32:
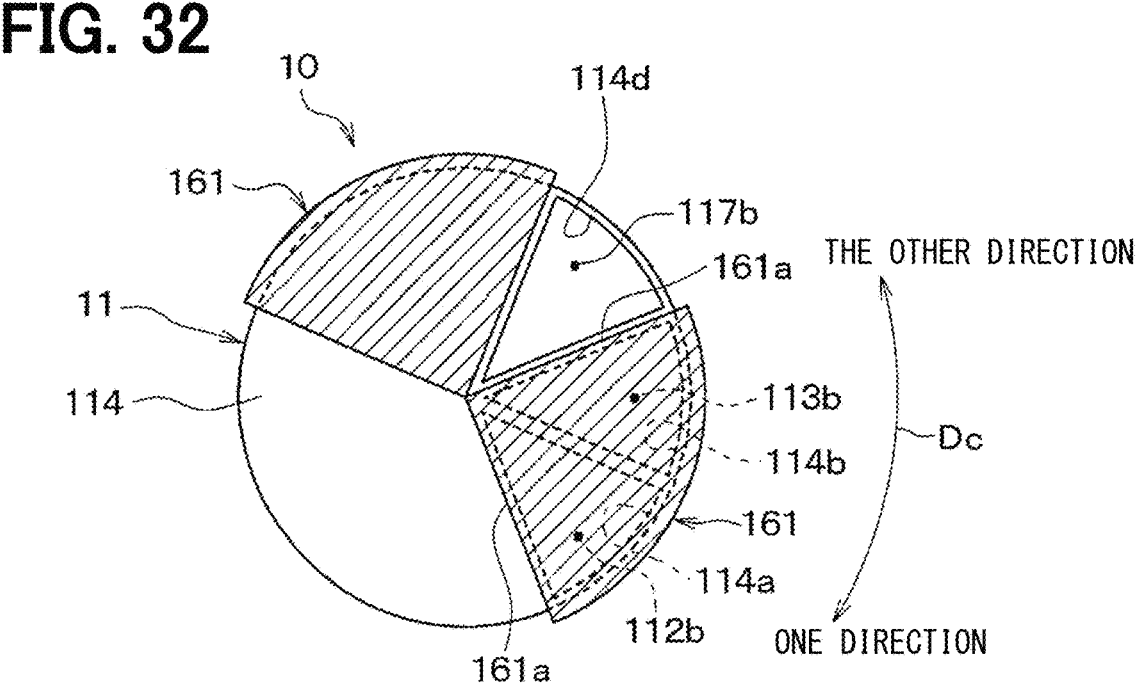
FIG. 32 is a schematic diagram of an operating state of a high temperature-side four-way valve in the 13th embodiment in a battery heat application mode.

FIG. 32 shows an operating state of the high temperature-side four-way valve 10 in a battery heat application mode. In the operating state in FIG. 32, the rotor 161 closes the first outlet space 112b, closes the second outlet space 113b, and opens the third outlet space 117b to the inlet space 111b.

Figure 33:
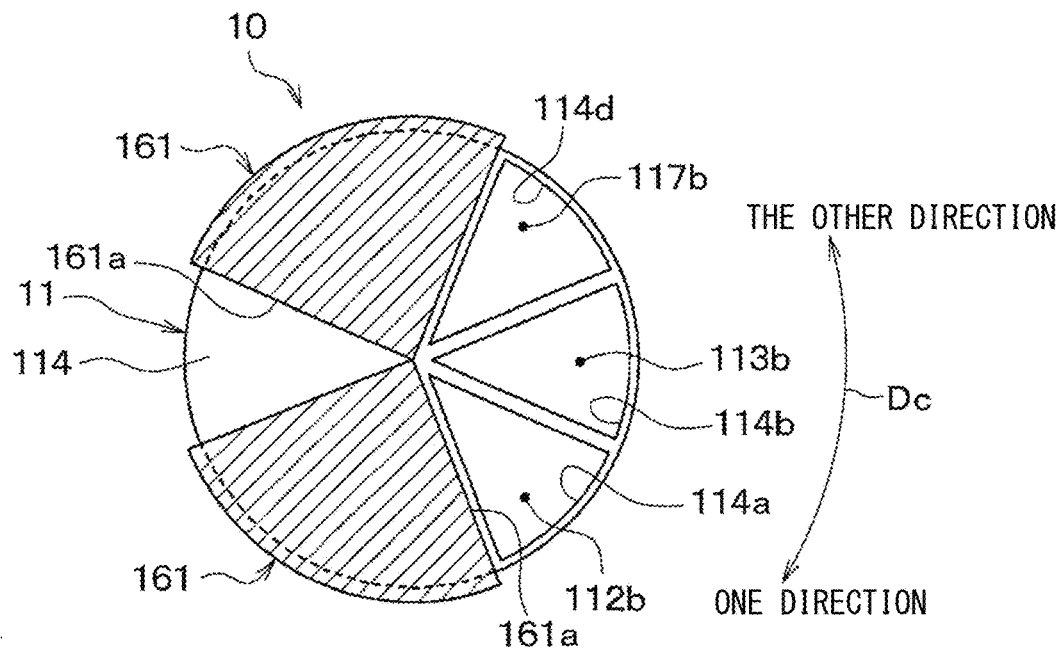
FIG. 33 is a schematic diagram illustrating an operating state of a high temperature-side four-way valve in the 13th embodiment in a water filling mode.

FIG. 33 shows an operating state of the high temperature-side four-way valve 10 in a water filling mode. In the operating state in FIG. 33, the rotor 161 opens the first outlet space 112b, opens the second outlet space 113b, and opens the third outlet space 117b to the inlet space 111b.

As shown in FIG. 25, a low temperature-side pump 310, the cooling water-side evaporator 170, a low temperature-side radiator 320, the battery heat exchanger 330, and a low temperature-side reserve tank 340 are disposed in the low-temperature cooling water circuit 300.

The low temperature-side pump 310 is a heating medium pump sucking and discharging cooling water. The low temperature-side pump 310 is an electrically operated pump.

The low temperature-side radiator 320 is a heat sink that exchanges heat between cooling water in the low-temperature cooling water circuit 300 and the outside air and causes the cooling water in the low-temperature cooling water circuit 300 to absorb heat from the outside air.

The high temperature-side radiator 230 and the low temperature-side radiator 320 are disposed in this order in the direction of an outside air flow. The outside air is blown to the high temperature-side radiator 230 and the low temperature-side radiator 320 by an outdoor blower 400.

The outdoor blower 400 is an outside air blowing unit that blows the outside air toward the high temperature-side radiator 230 and the low temperature-side radiator 320. The outdoor blower 400 is an electric blower driving a fan via an electric motor. Operation of the outdoor blower 400 is controlled by the control device 20.

The high temperature-side radiator 230, the low temperature-side radiator 320, and the outdoor blower 400 are disposed at the forward end of the vehicle. Therefore, when the vehicle is running, traveling air can be applied to the high temperature-side radiator 230 and the low temperature-side radiator 320.

A radiator shutter 3 is disposed at the front of the high temperature-side radiator 230 and the low temperature-side radiator 320. By closing the radiator shutter 3, application of traveling air to the high temperature-side radiator 230 and the low temperature-side radiator 320 can be restricted during running of the vehicle. Operation of the radiator shutter 3 is controlled by the control device 20.

The battery 2 is thermally conductively disposed in the battery heat exchanger 330. The battery heat exchanger 330 is a battery temperature regulating unit adjusting a temperature of the battery 2 with cooling water. The battery heat exchanger 330 radiates waste heat produced in the battery 2 to cooling water in the low-temperature cooling water circuit 300. In addition, the battery heat exchanger 330 absorbs heat from cooling water in the low-temperature cooling water circuit 300 to the battery 2. The heat radiation and heat absorption between cooling water and the battery 2 in the battery heat exchanger 330 are switched according to which is higher, a temperature of cooling water or a temperature of the battery 2.

The low temperature-side reserve tank 340 is a cooling water reserving unit reserving surplus cooling water. By reserving surplus cooling water in the low temperature-side reserve tank 340, reduction in a liquid quantity of cooling water circulating in each channel can be suppressed.

The low temperature-side reserve tank 340 has a function of separating cooling water into vapor and liquid. The low temperature-side reserve tank 340 has a function of separating air contained in cooling water (that is, air bubbles).

The low temperature-side reserve tank 340 is a closed reserve tank. Air separated at the low temperature-side reserve tank 340 is reserved in the low temperature-side reserve tank 340. By utilizing compressibility of air reserved in the low temperature-side reserve tank 340, a pressure at a liquid level of cooling water reserved in the low temperature-side reserve tank 340 is adjusted.

The low temperature-side pump 310, the cooling water-side evaporator 170, and the low temperature-side reserve tank 340 are disposed in an evaporator channel 300a. The evaporator channel 300a is a channel through which cooling water in the low-temperature cooling water circuit 300 flows.

The low temperature-side pump 310, the cooling water-side evaporator 170, and the low temperature-side reserve tank 340 are disposed in the order of the low temperature-side reserve tank 340, the low temperature-side pump 310, and the cooling water-side evaporator 170 in the direction of a cooling water flow in the evaporator channel 300a.

The low temperature-side radiator 320 is disposed in a low temperature-side radiator channel 300b. The low temperature-side radiator channel 300b is a channel through which cooling water in the low-temperature cooling water circuit 300 flows.

The battery heat exchanger 330 is disposed in a battery channel 300c. The battery channel 300c is a channel through which cooling water in the low-temperature cooling water circuit 300 flows.

The low temperature-side radiator channel 300b and the battery channel 300c are branched off from the evaporator channel 300a at a low temperature-side first branch portion 300d. At the low temperature-side first branch portion 300d, cooling water heat-absorbed in the cooling water-side evaporator 170 is branched to the battery heat exchanger 330 side and the low temperature-side radiator 320 side.

The low temperature-side radiator channel 300b and the battery channel 300c meet the evaporator channel 300a at a low temperature-side first meeting portion 300e. At the low temperature-side first meeting portion 300e, cooling water flowing through the battery heat exchanger 330 and cooling water flowing through the low temperature-side radiator 320 meet each other toward the cooling water-side evaporator 170 side.

A battery radiator channel 300f is connected between the cooling water outlet side of the battery heat exchanger 330 in the battery channel 300c and the cooling water inlet side of the low temperature-side radiator 320 in the low temperature-side radiator channel 300b. The battery radiator channel 300f is a channel through which cooling water in the low-temperature cooling water circuit 300 flows.

A three-way valve 350 is disposed in the low-temperature cooling water circuit 300. The three-way valve 350 is disposed at a joint between the battery channel 300c and the battery radiator channel 300f. The three-way valve 350 switches between a first state and a second state. The first state is a state in which cooling water flowing out of the battery heat exchanger 330 directly flows through the battery channel 300c and flows into the evaporator channel 300a. The second state is a state in which cooling water flowing out of the battery heat exchanger 330 flows through the battery radiator channel 300*f* and flows into the low temperature-side radiator channel 300*b*.

Figure 34:
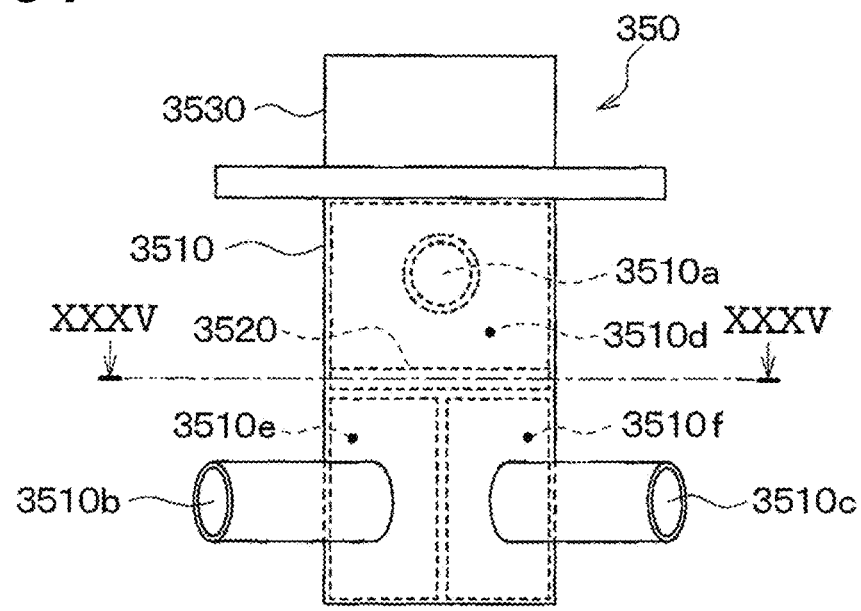
FIG. 34 is a front view illustrating a three-way valve of a vehicular temperature control device in the 13th embodiment.
Figure 35:
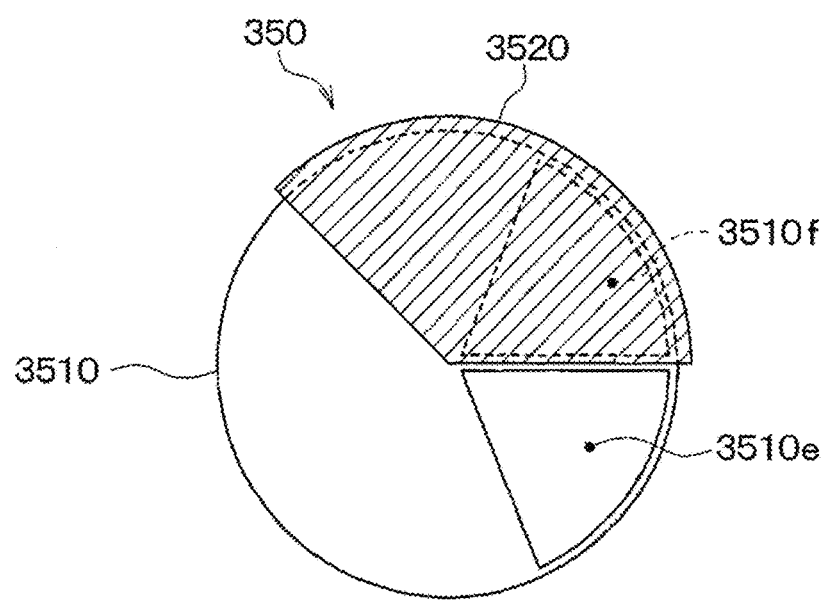
FIG. 35 is a schematic diagram illustrating a section taken along line XXXV-XXXV of FIG. 34, showing an operating state of a three-way valve in the 13th embodiment in a cooling/battery cooling mode.

As shown in FIG. 34 and FIG. 35, the three-way valve 350 includes a housing 3510, a valve body 3520, and an actuator 3530. The housing 3510 includes a cooling water inlet 3510*a*, a battery channel-side outlet 3510*b*, and a battery radiator channel-side outlet 3510*c*.

The cooling water inlet 3510*a* is a heating medium inlet. The cooling water inlet 3510*a* and the battery channel-side outlet 3510*b* are connected to the battery channel 300*c*. The battery radiator channel-side outlet 3510*c* is connected to the battery radiator channel 300*f*.

A cooling water inlet space 3510*d*, a battery channel-side space 3510*e*, and a battery radiator channel-side space 3510*f* are formed inside the housing 3510. The cooling water inlet space 3510*d* is a heating medium inlet space. The cooling water inlet space 3510*d* is in communication with the cooling water inlet 3510*a*. The battery channel-side space 3510*e* is in communication with the battery channel-side outlet 3510*b*. The battery radiator channel-side space 3510*f* is in communication with the battery radiator channel-side outlet 3510*c*.

The battery channel-side space 3510*e* and the battery radiator channel-side space 3510*f* are respectively in communication with the cooling water inlet space 3510*d*. The battery channel-side space 3510*e* and the battery radiator channel-side space 3510*f* adjoin to each other.

The valve body 3520 opens or closes the battery channel-side space 3510*e* and the battery radiator channel-side space 3510*f* to the cooling water inlet space 3510*d*. The valve body 3520 thereby varies a state of communication between each of the battery channel-side space 3510*e* and the battery radiator channel-side space 3510*f* and the cooling water inlet space 3510*d*.

The valve body 3520 is rotationally operated by rotational driving force of the actuator 3530. Operation of the actuator 3530 is controlled by the control device 20.

FIG. 35 shows an operating state of the three-way valve 350 in a cooling/battery cooling mode. In the cooling/battery cooling mode, the valve body 3520 opens the battery channel-side space 3510*e* and closes the battery radiator channel-side space 3510*f* to the cooling water inlet space 3510*d*.

Figure 36:
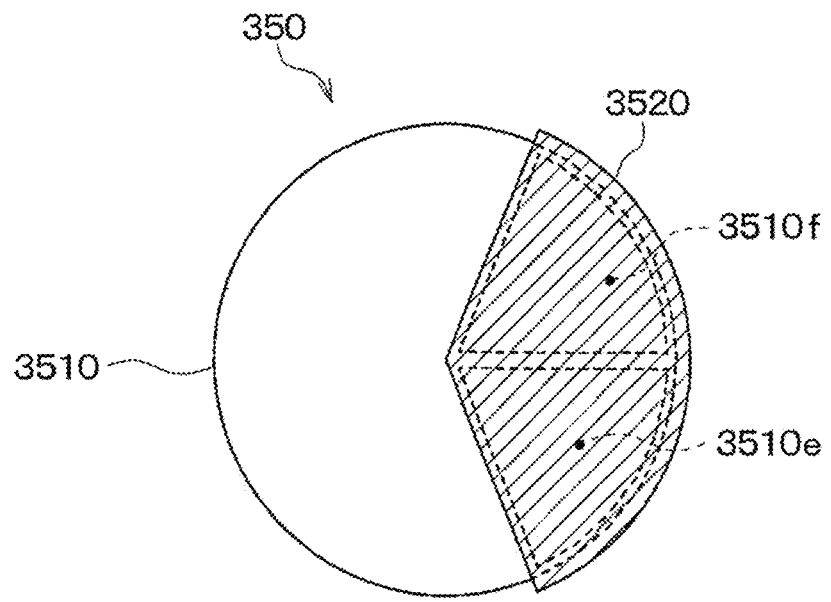
FIG. 36 is a schematic diagram illustrating an operating state of a three-way valve in the 13th embodiment in a heating mode and a battery heat application mode.

FIG. 36 shows an operating state of the three-way valve 350 in a heating mode and a battery heat application mode. In the heating mode and the battery heat application mode, the valve body 3520 closes the battery channel-side space 3510*e* and closes the battery radiator channel-side space 3510*f* to the cooling water inlet space 3510*d*.

Figure 37:
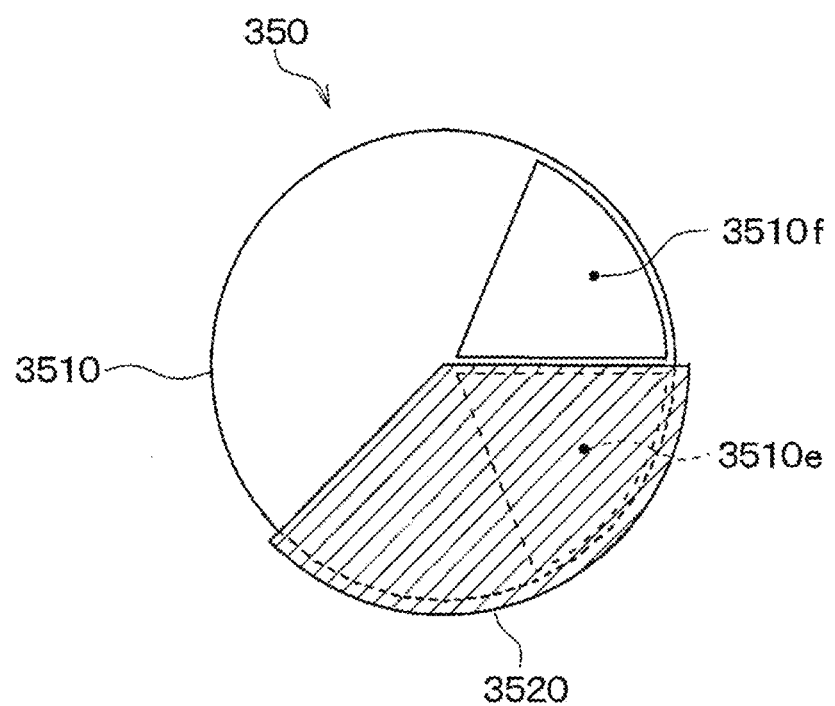
FIG. 37 is a schematic diagram illustrating an operating state of a three-way valve in the 13th embodiment in a battery outside air cooling mode.

FIG. 37 shows an operating state of the three-way valve 350 in a battery outside air cooling mode. In the battery outside air cooling mode, the valve body 3520 closes the battery channel-side space 3510*e* and opens the battery radiator channel-side space 3510*f* to the cooling water inlet space 3510*d*.

Figure 38:
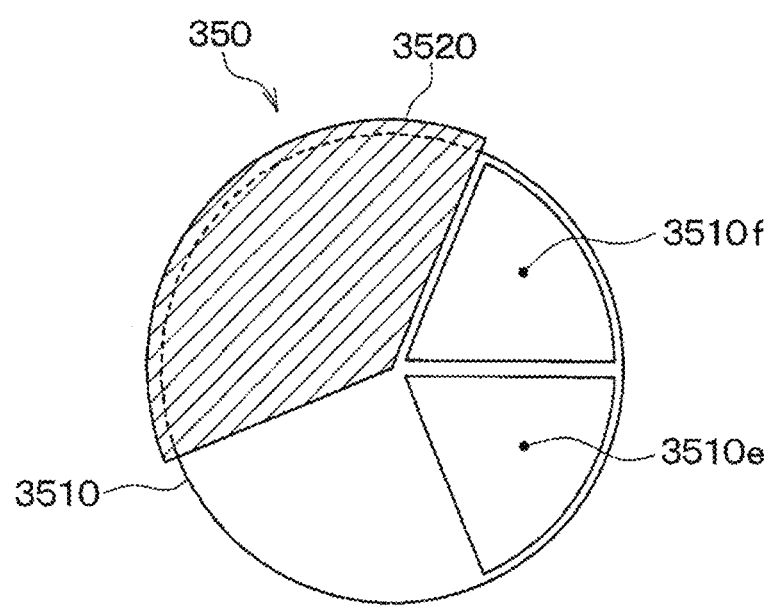
FIG. 38 is a schematic diagram illustrating an operating state of a three-way valve in the 13th embodiment in a water filling mode.

FIG. 38 shows an operating state of the three-way valve 350 in a water filling mode. In the water filling mode, the valve body 3520 opens the battery channel-side space 3510*e* and opens the battery radiator channel-side space 3510*f* to the cooling water inlet space 3510*d*.

As shown in FIG. 25, a flow rate control valve 360 is disposed in an area of the low temperature-side radiator channel 300*b* located on the upstream side of a cooling water flow relative to the joint with the battery radiator channel 300*f*. The flow rate control valve 360 opens and closes the low temperature-side radiator channel 300*b*. The flow rate control valve 360 adjusts an opening area of the low temperature-side radiator channel 300*b*. The flow rate control valve 360 is a low temperature-side radiator flow rate reducing unit that reduces a flow rate of cooling water flowing through the low temperature-side radiator 320.

The battery inlet-side channel 200*f* is connected to the battery channel 300*c* at a low temperature-side second meeting portion 300*g*. The battery inlet-side channel 200*f* is connected to the high temperature-side four-way valve 10.

The low temperature-side second meeting portion 300*g* is disposed in an area of the battery heat exchanger 330 located on the cooling water inlet side in the battery channel 300*c*. At the low temperature-side second meeting portion 300*g*, cooling water heat-radiated in the condenser 120 meets toward the battery heat exchanger 330 side.

The battery outlet-side channel 200*g* is connected to the battery channel 300*c* at a low temperature-side second branch portion 300*h*. The battery outlet-side channel 200*g* is connected to an area of the high temperature-side reserve tank 240 located on the cooling water inlet side in the condenser channel 200*a*.

The low temperature-side second branch portion 300*h* is disposed in an area of the battery heat exchanger 330 located on the cooling water outlet side in the battery channel 300*c*. At the low temperature-side second branch portion 300*h*, cooling water flowing through the battery heat exchanger 330 is branched toward the condenser 120 side.

The air-side evaporator 140 and the heater core 220 are housed in an air conditioner casing 510 of an indoor air conditioner unit 500. The indoor air conditioner unit 500 is disposed inside an instrument panel, not shown, at the front in the cabin. The air conditioner casing 510 is an air passage forming member forming an air passage.

The heater core 220 is disposed on the downstream side of an air flow of the air-side evaporator 140 in an air passage in the air conditioner casing 510. An inside/outside air switching box 520 and an indoor blower 530 are disposed in the air conditioner casing 510.

The inside/outside air switching box 520 is an inside/outside air switching unit that switches between the inside air and the outside air and guides the air into the air passage in the air conditioner casing 510. The indoor blower 530 sucks the inside air and the outside air guided into the air passage in the air conditioner casing 510 through the inside/outside air switching box 520 and blows the air. Operation of the indoor blower 530 is controlled by the control device 20.

An air mix door 540 is disposed between the air-side evaporator 140 and the heater core 220 in the air passage in the air conditioner casing 510. The air mix door 540 adjusts an air flow rate ratio between cold air flowing into the heater core 220 and cold air flowing through a cold air bypass passage 550 with respect to cold air that passed through the air-side evaporator 140.

The cold air bypass passage 550 is an air passage through which cold air passed through the air-side evaporator 140 flows detouring the heater core 220.

The air mix door 540 is a revolving door including a rotating shaft rotatably supported on the air conditioner casing 510 and a door base portion coupled with the rotating shaft. By adjusting an opening position of the air mix door 540, a temperature of conditioned air blown out of the air conditioner casing 510 into the cabin can be adjusted as desired.

The rotating shaft of the air mix door 540 is driven by a servomotor 560. Operation of the servomotor 560 is controlled by the control device 20.

The air mix door 540 may be a slide door that slides and moves to a direction substantially orthogonal to an air flow.

The slide door may be a tabular door formed of a rigid body or may be a film door formed of a flexible film material.

Conditioned air temperature-adjusted by the air mix door 540 is blown out of an air outlet 570 formed in the air conditioner casing 510 into the cabin.

The indoor air conditioner unit 500 and the first expansion valve 130 are disposed in the cabin 4. The cabin 4 is separated from a driving device chamber 6 by a partition wall 5. The partition wall 5 is a partition wall member (so-called firewall) installed for acoustic insulation, fire restriction, and the like in the cabin 4.

The driving device chamber 6 is a space for installing a traction electric motor. The driving device chamber 6 is disposed on the front side of the cabin 4. A grill guiding the outside air into the driving device chamber 6 is formed at the forward end of the vehicle in the driving device chamber 6. For this reason, the space in the driving device chamber 6 is a space external to the cabin into which the outside air is guided.

Varied controlled equipment is connected to the output side of the control device 20 shown in FIG. 26. The control device 20 is a control unit controlling operation of the varied controlled equipment.

The controlled equipment controlled by the control device 20 includes the radiator shutter 3, the compressor 110, the second expansion valve 160, the high temperature-side four-way valve 10, the three-way valve 350, the flow rate control valve 360, the outdoor blower 400, the indoor blower 530, and the servomotor 560 for the air mix door 540, and the like.

Software and hardware of the control device 20 controlling the electric motor of the compressor 110 are a refrigerant discharge capacity control unit. Software and hardware of the control device 20 controlling the second expansion valve 160 are a throttle control unit.

Software and hardware of the control device 20 controlling the high temperature-side four-way valve 10 are a high-temperature heating medium flow control unit.

Software and hardware of the control device 20 controlling the three-way valve 350 and the flow rate control valve 360 are a low-temperature heating medium flow control unit.

Software and hardware of the control device 20 controlling the outdoor blower 400 are an outside air blow capacity control unit.

Software and hardware of the control device 20 controlling the indoor blower 530 are an air blow capacity control unit.

Software and hardware of the control device 20 controlling the servomotor 560 for the air mix door 540 are an air flow rate ratio control unit.

A group of various sensors for control, such as an inside air temperature sensor 20a, an outside air temperature sensor 20b, a solar radiation sensor 20c, an evaporator suction air temperature sensor 20d, an evaporator temperature sensor 20e, a heater core inlet cooling water temperature sensor 20f, a battery inlet cooling water temperature sensor 20g, a battery temperature sensor 20h, and the like, is connected to the input side of the control device 20.

The inside air temperature sensor 20a detects a temperature Tr in the cabin. The outside air temperature sensor 20b detects an outside air temperature Tam. The solar radiation sensor 20c detects a value Ts of solar radiation in the cabin.

The evaporator suction air temperature sensor 20d is an air temperature detection unit detecting a temperature TEin of air sucked into the air-side evaporator 140.

The evaporator temperature sensor 20e is a temperature detection unit detecting a temperature TE of the air-side evaporator 140. Examples of the evaporator temperature sensor 20e include a fin thermistor detecting a temperature of a heat exchange fin of the air-side evaporator 140, a refrigerant temperature sensor detecting a temperature of a refrigerant flowing through the air-side evaporator 140, and the like.

The heater core inlet cooling water temperature sensor 20f is a heating medium temperature detection unit that detects a temperature THin of cooling water flowing into the heater core 220.

The battery inlet cooling water temperature sensor 20g is a heating medium temperature detection unit detecting a temperature of cooling water flowing into the battery 2.

The battery temperature sensor 20h is a battery temperature detection unit detecting a temperature of the battery 2. The battery temperature sensor 20h detects, for example, a temperature of each cell of the battery 2.

Various operation switches, not shown, are connected to the input side of the control device 20. The various operation switches are provided in an operation panel 700 and operated by an occupant. The operation panel 700 is disposed in proximity to the instrument panel at the front in the cabin. Actuating signals are inputted from the various operation switches to the control device 20.

The operation switches are an air conditioner switch, a temperature setting switch, and the like. The air conditioner switch is used to set whether to cool air with the indoor air conditioner unit 500. The temperature setting switch is used to set a set temperature in the cabin.

A description will be given to operation performed with the above-mentioned configuration. The control device 20 switches an operation mode based on a result of detection by the above-mentioned group of sensors 20a to 20h for control, an operating state of the various operation switches in the operation panel 700, and the like. The operation modes include at least cooling/battery cooling mode, heating mode, dehumidification heating mode, battery outside air cooling mode, and battery heat application mode.

In the cooling/battery cooling mode, air blown into the cabin is cooled in the air-side evaporator 140 to cool the interior of the cabin. Further, the battery 2 is cooled by cooling water cooled in the cooling water-side evaporator 170.

In the heating mode, heat is applied to air blown into the cabin by the heater core 220 to heat the interior of the cabin.

In the dehumidification heating mode, the interior of the cabin is dehumidified and heated by cooling and dehumidifying air blown into the cabin in the air-side evaporator 140 and applying heat to air cooled and dehumidified in the air-side evaporator 140 by the heater core 220.

When an amount of heat of cooling water in the high-temperature cooling water circuit 200 is surplus relative to an amount of heat required in the heater core 220 in the dehumidification heating mode, surplus heat of cooling water in the high-temperature cooling water circuit 200 is radiated to the outside air by the high temperature-side radiator 230.

In the battery outside air cooling mode, the battery 2 is cooled with cooling water cooled in the low temperature-side radiator 320. In the battery heat application mode, heat is applied to the battery 2 by cooling water with heat applied thereto in the condenser 120.

A concrete description will be given to operation in the cooling/battery cooling mode, the heating mode, the dehumidification heating mode, the battery outside air cooling mode, and the battery heat application mode.

(1) Cooling/Battery Cooling Mode

In the cooling/battery cooling mode, the control device 20 actuates the compressor 110, the high temperature-side pump 210, and the low temperature-side pump 310.

In the cooling/battery cooling mode, the control device 20 opens the first expansion valve 130 and the second expansion valve 160 with a throttled opening.

In the cooling/battery cooling mode, the control device 20 controls the high temperature-side four-way valve 10 as shown in FIG. 29. As a result, the heater core channel 200*b* is closed; the high temperature-side radiator channel 200*c* is opened; and the battery inlet-side channel 200*f* is closed.

In the cooling/battery cooling mode, the control device 20 controls the three-way valve 350 as shown in FIG. 35. As a result, the battery channel 300*c* is opened and the battery radiator channel 300*f* is closed.

In the cooling/battery cooling mode, the control device 20 controls the flow rate control valve 360 so as to close the low temperature-side radiator channel 300*b*.

As a result, in the refrigeration cycle device 100 in the cooling/battery cooling mode, a refrigerant flows as indicated by bold solid line in FIG. 39 and a state of the refrigerant circulating in the cycle changes as described below:

A high-pressure refrigerant discharged from the compressor 110 flows into the condenser 120. The refrigerant that flowed into the condenser 120 radiates heat to cooling water in the high-temperature cooling water circuit 200. As a result, the refrigerant is cooled and condensed in the condenser 120.

The refrigerant flowing out of the condenser 120 flows into the first expansion valve 130 and is depressurized and expanded at the first expansion valve 130 until the refrigerant turns into a low-pressure refrigerant. The low-pressure refrigerant depressurized at the first expansion valve 130 flows into the air-side evaporator 140 and absorbs heat from air blown into the cabin and is evaporated. As a result, the air blown into the cabin is cooled.

The refrigerant flowing out of the air-side evaporator 140 flows toward the suction side of the compressor 110 and is compressed again in the compressor 110.

In the cooling/battery cooling mode, as mentioned above, a low-pressure refrigerant can be caused to absorb heat from air in the air-side evaporator 140 and the cooled air can be blown out into the cabin. As a result, cooling of the interior of the cabin can be implemented.

Figure 39:
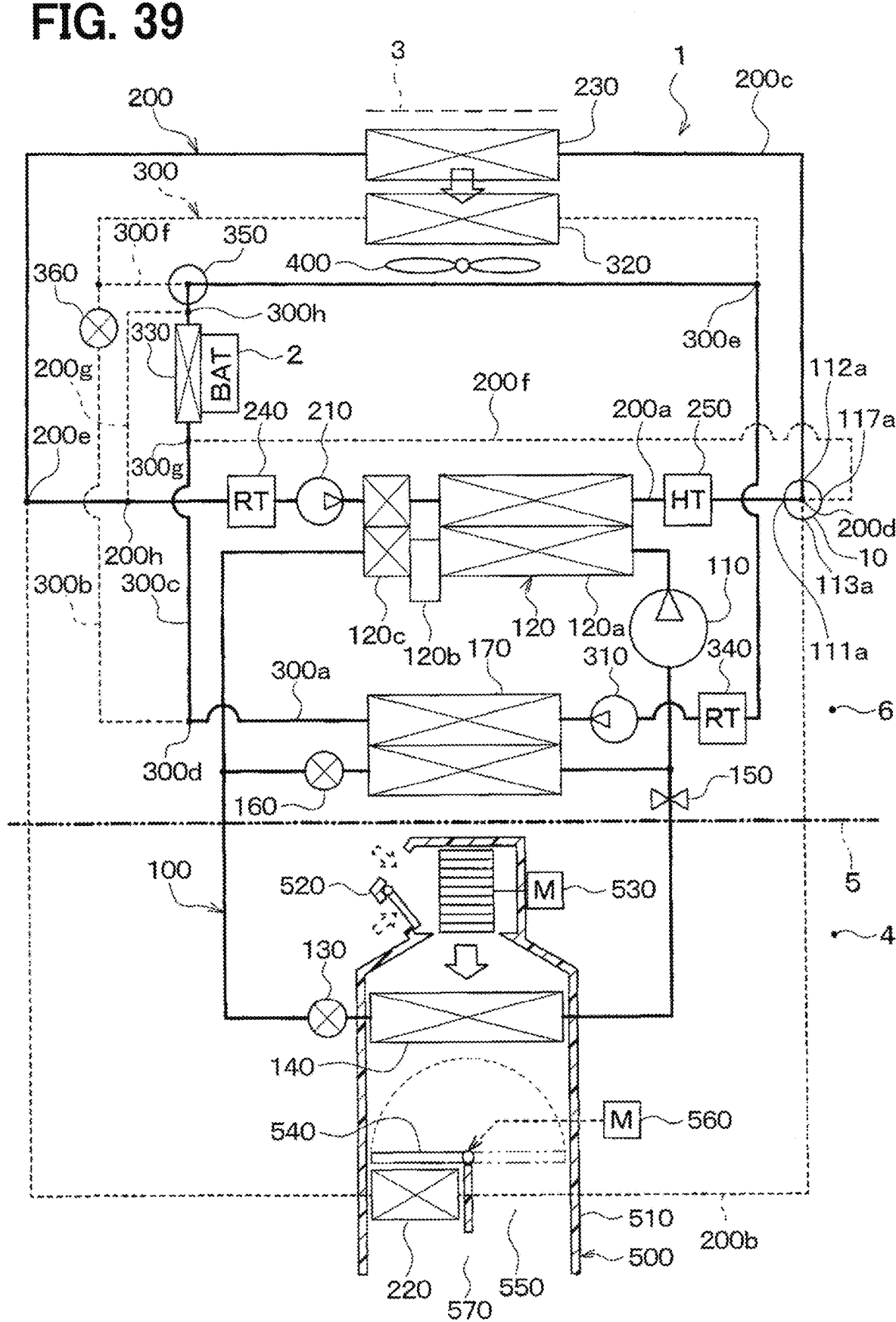
FIG. 39 is an overall block diagram illustrating an operating state of a vehicular temperature control device in the 13th embodiment in a cooling/battery cooling mode.

In the refrigeration cycle device 100 in the cooling/battery cooling mode, at the same time, a refrigerant flowing out of the condenser 120 flows into the second expansion valve 160 as indicated by bold solid line in FIG. 39 and is depressurized and expanded at the second expansion valve 160 until the refrigerant turns into a low-pressure refrigerant. The low-pressure refrigerant depressurized at the second expansion valve 160 flows into the cooling water-side evaporator 170 and absorbs heat from cooling water in the low-temperature cooling water circuit 300 and is evaporated. As a result, cooling water in the low-temperature cooling water circuit 300 is cooled. In the low-temperature cooling water circuit 300, cooling water is circulated to the battery heat exchanger 330 as indicated by bold solid line in FIG. 39 and the battery 2 is cooled.

In the high-temperature cooling water circuit 200 in the cooling/battery cooling mode, cooling water in the high-temperature cooling water circuit 200 is circulated to the high temperature-side radiator 230 as indicated by bold solid line in FIG. 39 and in the high temperature-side radiator 230, heat is radiated from the cooling water to the outside air.

(2) Heating Mode

In the heating mode, the control device 20 actuates the compressor 110, the high temperature-side pump 210, and the low temperature-side pump 310.

In the heating mode, the control device 20 opens the first expansion valve 130 with a throttled opening and closes the second expansion valve 160.

In the heating mode, the control device 20 controls the high temperature-side four-way valve 10 as shown in FIG. 30. As a result, the heater core channel 200*b* is opened; the high temperature-side radiator channel 200*c* is closed; and the battery inlet-side channel 200*f* is closed.

In the heating mode, the control device 20 controls the three-way valve 350 as shown in FIG. 36. As a result, the battery channel 300*c* is closed and the battery radiator channel 300*f* is closed.

In the heating mode, the control device 20 controls the flow rate control valve 360 so as to open the low temperature-side radiator channel 300*b*.

In the refrigeration cycle device 100 in the heating mode, as a result, a refrigerant flows as indicated by bold solid line in FIG. 40 and a state of the refrigerant circulating in the cycle changes as described below:

A high-pressure refrigerant discharged from the compressor 110 flows into the condenser 120. The refrigerant that flowed into the condenser 120 radiates heat to cooling water in the high-temperature cooling water circuit 200. As a result, the refrigerant is cooled and condensed in the condenser 120.

A refrigerant flowing out of the condenser 120 flows into the second expansion valve 160 and is depressurized and expanded at the second expansion valve 160 until the refrigerant turns into a low-pressure refrigerant. The low-pressure refrigerant depressurized at the second expansion valve 160 flows into the cooling water-side evaporator 170 and absorbs heat from cooling water in the low-temperature cooling water circuit 300 and is evaporated. As a result, the cooling water in the low-temperature cooling water circuit 300 is cooled. In the low-temperature cooling water circuit 300, cooling water is circulated to the low temperature-side radiator 320 as indicated by bold solid line in FIG. 40 and the cooling water absorbs heat from the outside air.

Figure 40:
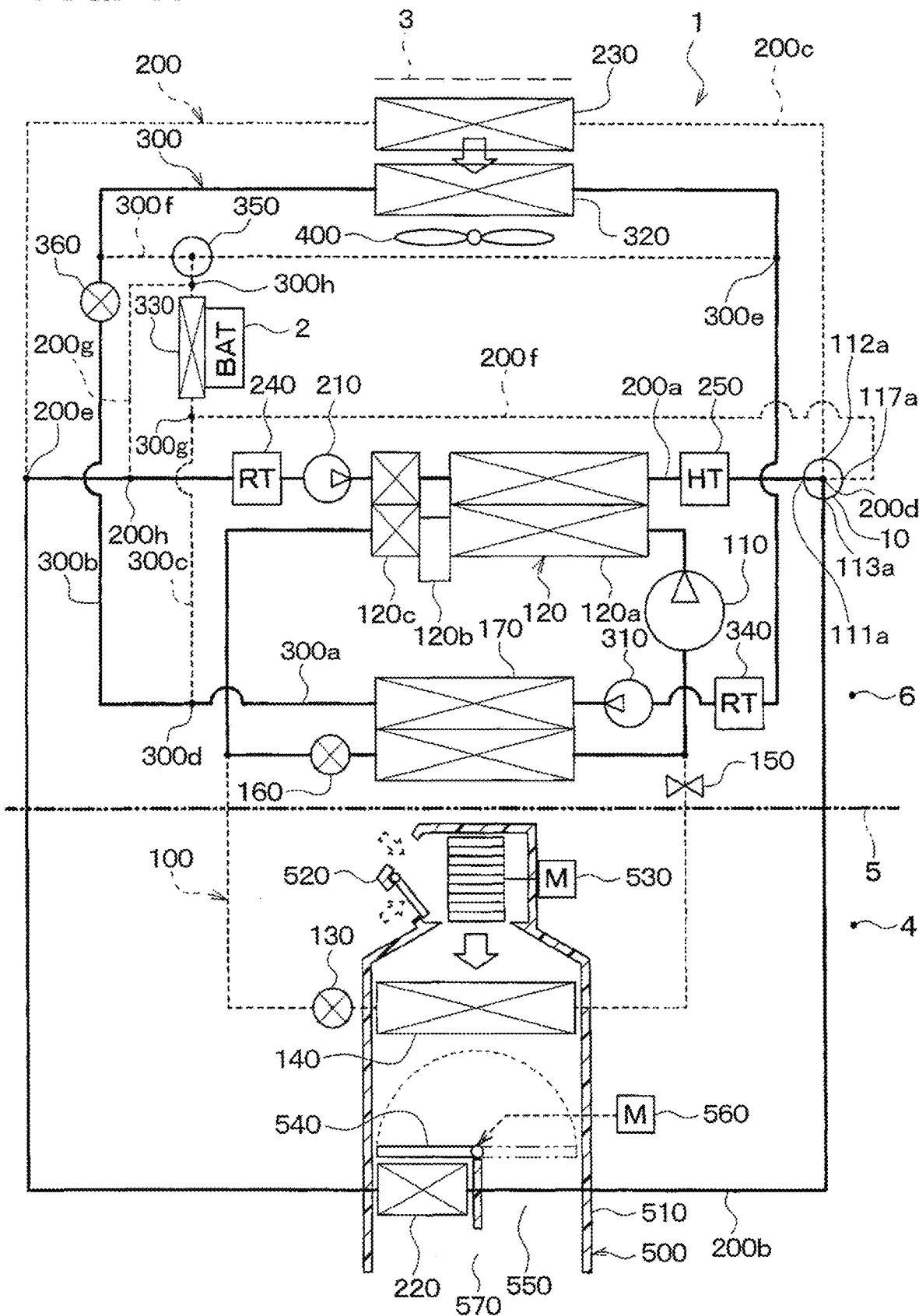
FIG. 40 is an overall block diagram illustrating an operating state of a vehicular temperature control device in the 13th embodiment in a heating mode.

In the high-temperature cooling water circuit 200 in the heating mode, cooling water in the high-temperature cooling water circuit 200 is circulated to the heater core 220 as indicated by bold solid line in FIG. 40 and in the heater core 220, the cooling water radiates heat to air blown into the cabin. As a result, heating of the interior of the cabin can be implemented.

When an amount of heat absorbed from the outside air by cooling water in the low temperature-side radiator 320 is insufficient relative to an amount of heat required to heat the cabin, an amount of heat can be supplemented by actuating the electric heater 250.

(3) Dehumidification Heating Mode

In the dehumidification heating mode, the control device 20 actuates the compressor 110 and the high temperature-side pump 210 and stops the low temperature-side pump 310.

In the dehumidification heating mode, the control device 20 opens the first expansion valve 130 with a throttled opening and closes the second expansion valve 160.

In the dehumidification heating mode, the control device 20 controls the high temperature-side four-way valve 10 as shown in FIG. 31. As a result, the heater core channel 200*b* is opened; the high temperature-side radiator channel 200c is opened; and the battery inlet-side channel 200f is closed.

In the refrigeration cycle device 100 in the dehumidification heating mode, a refrigerant flows as indicated by bold solid line in FIG. 41 and a state of the refrigerant circulating in the cycle changes as described below:

A high-pressure refrigerant discharged from the compressor 110 flows into the condenser 120 and radiates heat by heat exchange with cooling water in the high-temperature cooling water circuit 200. As a result, heat is applied to the cooling water in the high-temperature cooling water circuit 200.

The refrigerant flowing out of the condenser 120 flows into the first expansion valve 130 and is depressurized and expanded at the first expansion valve 130 until the refrigerant turns into a low-pressure refrigerant. The low-pressure refrigerant depressurized at the first expansion valve 130 flows into the air-side evaporator 140 and absorbs heat from air blown into the cabin and is evaporated. As a result, the air blown into the cabin is cooled and dehumidified.

The refrigerant flowing out of the cooling water-side evaporator 170 flows toward the suction side of the compressor 110 and is compressed again in the compressor 110.

Figure 41:
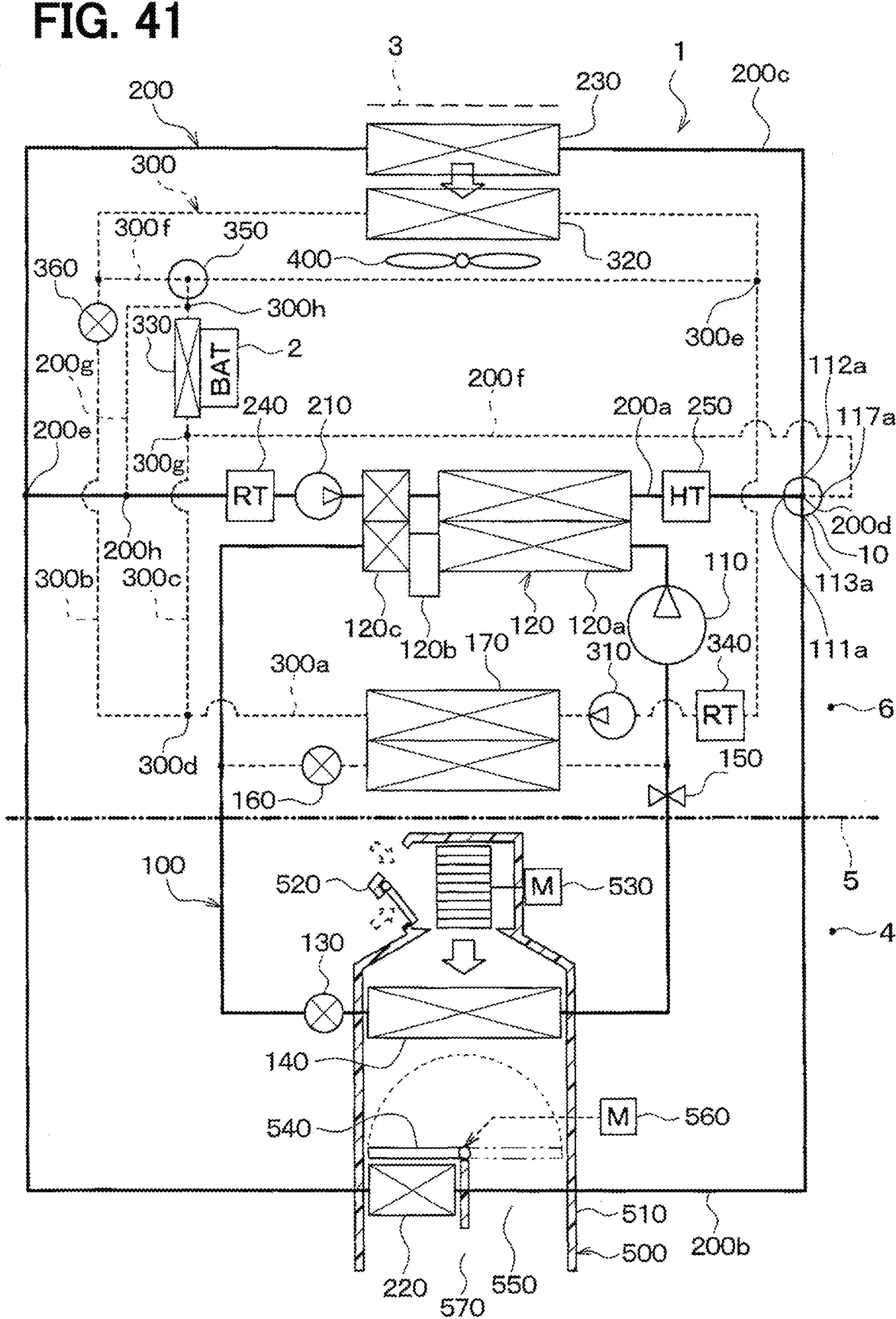
FIG. 41 is an overall block diagram illustrating an operating state of a vehicular temperature control device in the 13th embodiment in a dehumidification heating mode.

In the high-temperature cooling water circuit 200 in the dehumidification heating mode, cooling water in the high-temperature cooling water circuit 200 is circulated to the heater core 220 as indicated by bold solid line in FIG. 41.

A control signal outputted to the servomotor 560 of the air mix door 540 is so determined that the air mix door 540 fully opens an air passage in the heater core 220 and all the quantity of an air flow passed through the air-side evaporator 140 passes through the heater core 220. A position of the air mix door 540 where the air passage in the heater core 220 is fully opened at this time is the position indicated by alternate long and two short dashes line in FIG. 25.

As a result, in the heater core 220, heat is radiated from cooling water in the high-temperature cooling water circuit 200 to air blown into the cabin. Therefore, air cooled and dehumidified in the air-side evaporator 140 has heat applied thereto in the heater core 220 and is blown out into the cabin.

In the high-temperature cooling water circuit 200, at the same time, cooling water is circulated to the high temperature-side radiator 230 as indicated by bold solid line in FIG. 41 and in the high temperature-side radiator 230, heat is radiated from the cooling water to the outside air.

In the dehumidification heating mode, as mentioned above, heat of a high-pressure refrigerant discharged from the compressor 110 can be radiated to cooling water in the high-temperature cooling water circuit 200 in the condenser 120. At the same time, heat of cooling water in the high-temperature cooling water circuit 200 can be radiated to air in the heater core 220 and the air with heat applied thereto in the heater core 220 can be blown out into the cabin.

In the heater core 220, heat is applied to air cooled and dehumidified in the air-side evaporator 140. As a result, dehumidification heating of the interior of the cabin can be implemented.

In the dehumidification heating mode, surplus heat of cooling water in the high-temperature cooling water circuit 200 is radiated to the outside air in the high temperature-side radiator 230. That is, when an amount of heat of cooling water in the high-temperature cooling water circuit 200 is surplus relative to an amount of heat required in the heater core 220, the surplus heat is radiated to the outside air in the high temperature-side radiator 230.

In the dehumidification heating mode, a flow rate of cooling water in the high-temperature cooling water circuit 200 flowing through the high temperature-side radiator 230 only has to be a sufficient flow rate to radiate surplus heat of the cooling water in the high-temperature cooling water circuit 200 to the outside air.

For this reason, in the dehumidification heating mode, an opening of the high temperature-side radiator channel 200c at the high temperature-side four-way valve 10, that is, an opening of the first flow hole 114a (refer to FIG. 31) is an opening with which surplus heat of cooling water in the high-temperature cooling water circuit 200 can be radiated to the outside air in the high temperature-side radiator 230.

When the battery 2 need be cooled in the dehumidification heating mode, the control device 20 exercises the following control: the control device 20 opens the second expansion valve 160 with a throttled opening and further controls the low temperature-side pump 310 and the three-way valve 350 so that cooling water in the low-temperature cooling water circuit 300 is circulated between the cooling water-side evaporator 170 and the battery heat exchanger 330.

As a result, in the refrigeration cycle device 100, a refrigerant flowing out of the condenser 120 flows into the second expansion valve 160 and is depressurized and expanded at the second expansion valve 160 until the refrigerant turns into a low-pressure refrigerant. The low-pressure refrigerant depressurized at the second expansion valve 160 flows into the cooling water-side evaporator 170 and absorbs heat from cooling water in the low-temperature cooling water circuit 300 and is evaporated. As a result, the cooling water in the low-temperature cooling water circuit 300 is cooled. In the low-temperature cooling water circuit 300, cooling water is circulated to the battery heat exchanger 330 and the battery 2 is cooled.

(4) Battery Outside Air Cooling Mode

In the battery outside air cooling mode, the control device 20 stops the compressor 110 and the high temperature-side pump 210 and actuates the low temperature-side pump 310.

In the battery outside air cooling mode, the control device 20 controls the three-way valve 350 as shown in FIG. 37. As a result, the downstream side of a cooling water flow of the three-way valve 350 in the battery channel 300c is closed and the battery radiator channel 300f is opened.

In the battery outside air cooling mode, the control device 20 controls the flow rate control valve 360 so as to close the low temperature-side radiator channel 300b.

Figure 42:
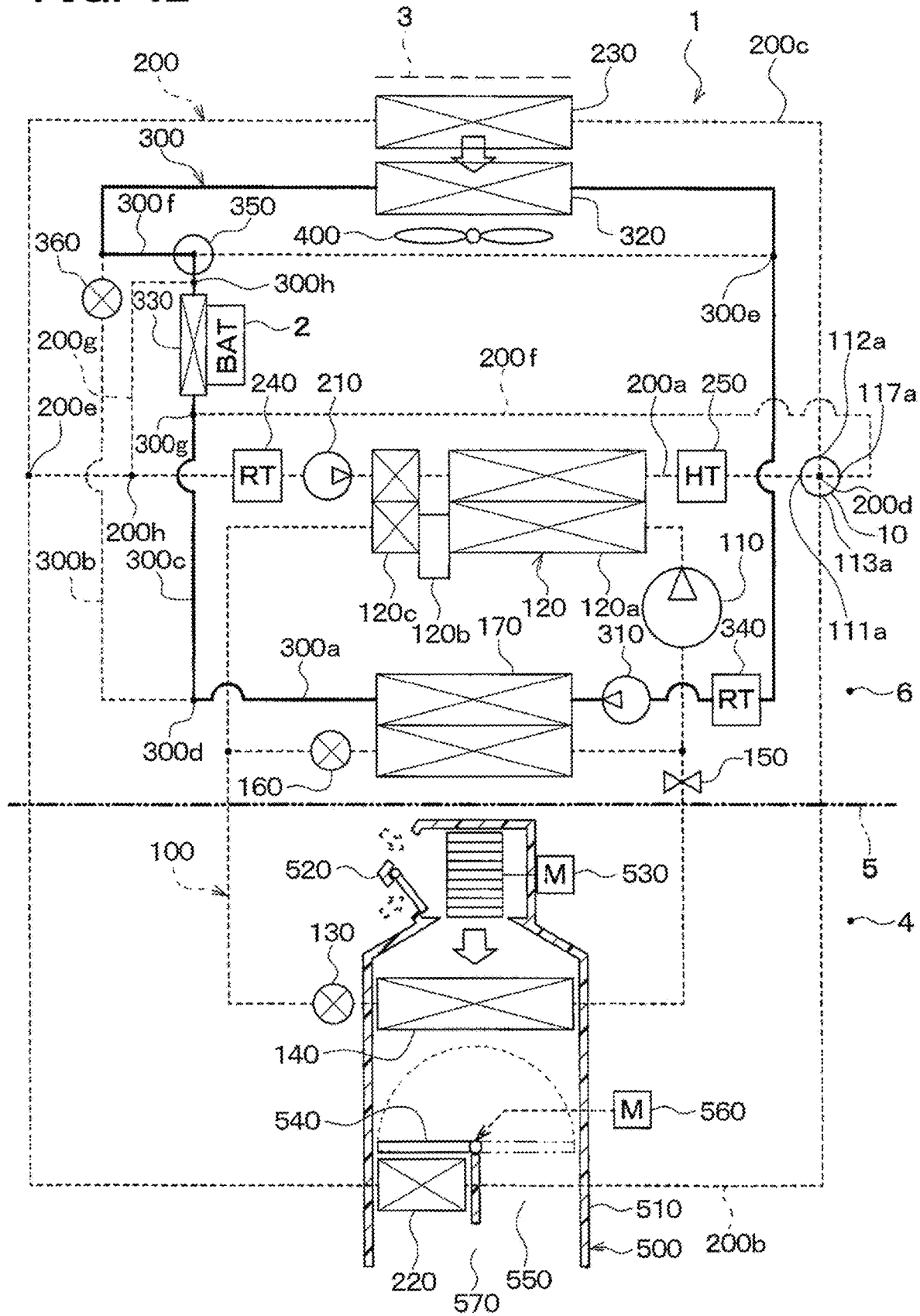
FIG. 42 is an overall block diagram illustrating an operating state of a vehicular temperature control device in the 13th embodiment in a battery outside air cooling mode.

As a result, in the low-temperature cooling water circuit 300 in the battery outside air cooling mode, cooling water is circulated to the low temperature-side radiator 320 and the battery heat exchanger 330 as indicated by bold solid line in FIG. 42. The cooling water is cooled by the outside air in the low temperature-side radiator 320 and the battery 2 is cooled by the cooling water cooled in the low temperature-side radiator 320.

(5) Battery Heat Application Mode

In the battery heat application mode, the control device 20 actuates the high temperature-side pump 210 and the electric heater 250 and stops the compressor 110 and the low temperature-side pump 310.

In the battery heat application mode, the control device 20 controls the high temperature-side four-way valve 10 as shown in FIG. 32. As a result, the heater core channel 200b is closed; the high temperature-side radiator channel 200c is closed; and the battery inlet-side channel 200f is opened.

In the battery heat application mode, the control device 20 controls the three-way valve 350 as shown in FIG. 36. As a result, the downstream side of a cooling water flow of the three-way valve 350 in the battery channel 300c is closed and the battery radiator channel 300f is closed.

In the battery heat application mode, the control device 20 controls the flow rate control valve 360 so as to close the low temperature-side radiator channel 300b.

Figure 43:
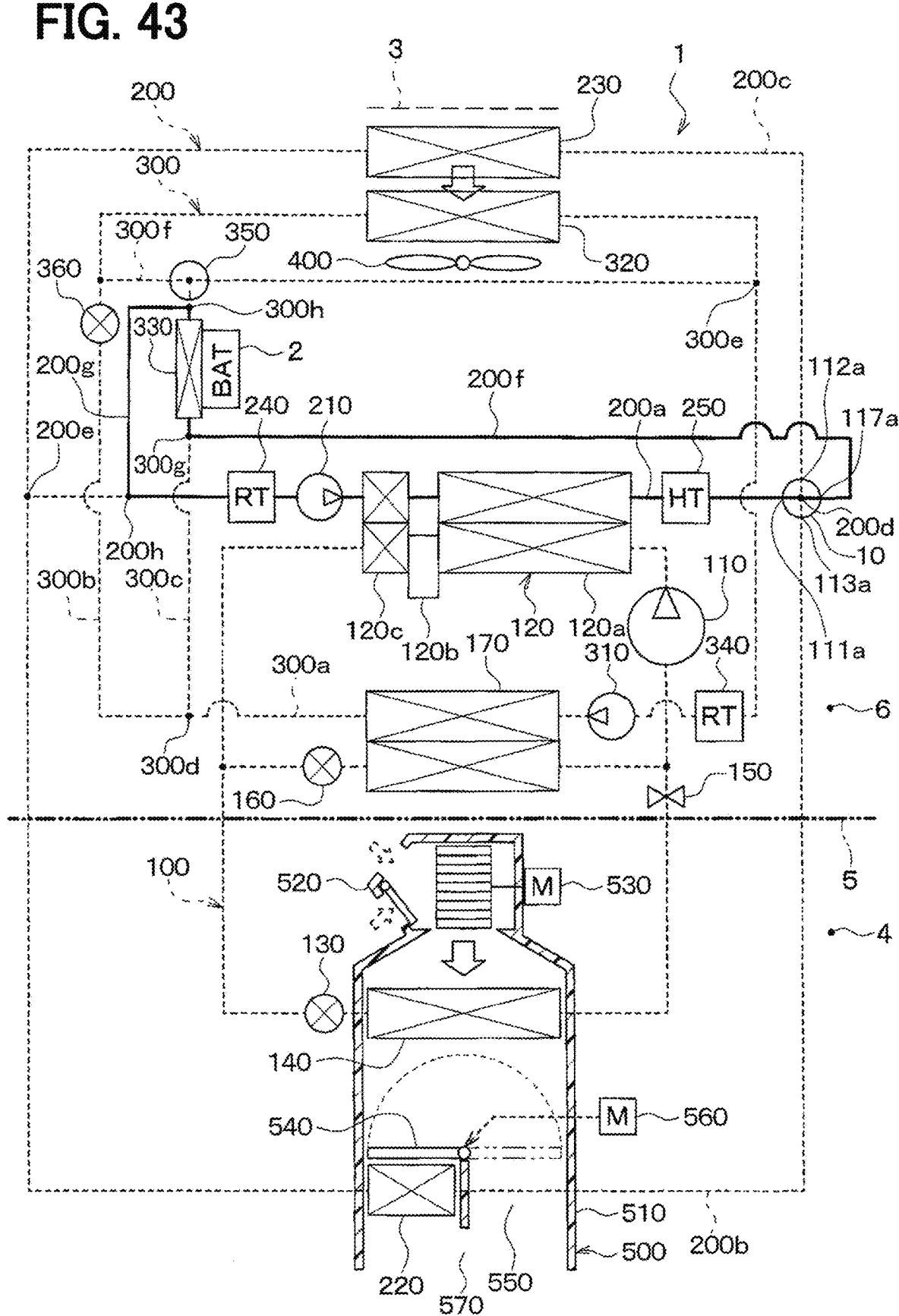
FIG. 43 is an overall block diagram illustrating an operating state of a vehicular temperature control device in the 13th embodiment in a battery heat application mode.

As a result, in the high-temperature cooling water circuit 200 and low-temperature cooling water circuit 300 in the battery outside air cooling mode, cooling water is circulated to the electric heater 250 and the battery heat exchanger 330 as indicated by bold solid line in FIG. 43. Heat is applied to the cooling water in the electric heater 250 and the battery 2 has heat applied thereto by the cooling water with heat applied thereto in the electric heater 250.

Further, the control device 20 is capable of switching between a water filling mode and an air vent mode during maintenance of the vehicular temperature control device 1.

The water filling mode is an operation mode established when cooling water is filled into the high-temperature cooling water circuit 200 and the low-temperature cooling water circuit 300.

The air vent mode is an operation mode established when air is separated from cooling water in the high-temperature cooling water circuit 200 and the low-temperature cooling water circuit 300.

(6) Water Filling Mode

In the water filling mode, the control device 20 controls the high temperature-side four-way valve 10 as shown in FIG. 33. As a result, the heater core channel 200b is opened; the high temperature-side radiator channel 200c is opened; and the battery inlet-side channel 200f is opened.

In the water filling mode, the control device 20 controls the three-way valve 350 as shown in FIG. 38. As a result, the battery channel 300c is opened and the battery radiator channel 300f is opened.

In the water filling mode, the control device 20 controls the flow rate control valve 360 so as to open the low temperature-side radiator channel 300b.

As a result, cooling water filled into the high-temperature cooling water circuit 200 and the low-temperature cooling water circuit 300 can be distributed in the entire high-temperature cooling water circuit 200 and low-temperature cooling water circuit 300 as swiftly as possible.

(7) Air Vent Mode

In the air vent mode, the control device 20 controls the high temperature-side four-way valve 10 so that the high-temperature cooling water circuit 200 is switched from a circuit in the battery outside air cooling mode to a circuit in the heating mode to the battery heat application mode at predetermined time intervals.

In the air vent mode, the control device 20 controls the three-way valve 350 and the flow rate control valve 360 so that the low-temperature cooling water circuit 300 is switched from a circuit in the heating mode to a circuit in the battery outside air cooling mode to a circuit in the cooling/battery cooling mode at predetermined time intervals. As a result, air can be vented without fail.

According to the present embodiment, the high temperature-side radiator 230 and the heater core 220 are disposed in parallel with each other in a flow of cooling water heat-radiated in the condenser 120. The high temperature-side four-way valve 10 is disposed at the high temperature-side first branch portion 200d and reduces a flow rate of cooling water flowing through the high temperature-side radiator 230.

According to the foregoing, a degree of freedom in how to pass cooling water to the high temperature-side radiator 230, the heater core 220, and the battery heat exchanger 330. When cooling water is passed to the battery heat exchanger 330 to apply heat to the battery 2, a heat loss in the high temperature-side radiator 230 can be reduced and thus heat can be efficiently applied to the battery 2.

According to the present embodiment, the high temperature-side four-way valve 10 is disposed at the high temperature-side first branch portion 200d and reduces a flow rate of cooling water flowing through the heater core 220. According to this, when cooling water is passed to the battery heat exchanger 330 to apply heat to the battery 2, a heat loss in the heater core 220 can be reduced and thus heat can be efficiently applied to the battery 2.

According to the present embodiment, the high temperature-side four-way valve 10 is one valve device that opens and closes a cooling water channel on the battery heat exchanger 330 side and further adjusts an opening of a cooling water channel on the high temperature-side radiator 230 side. As a result, a configuration of the high-temperature cooling water circuit 200 can be simplified.

According to the present embodiment, the high temperature-side four-way valve 10 is one valve device that opens and closes a cooling water channel on the battery heat exchanger 330 side and further adjusts an opening of a cooling water channel on the heater core 220 side. As a result, a configuration of the high-temperature cooling water circuit 200 can be simplified.

According to the present embodiment, the high temperature-side pump 210 is disposed in a heating medium channel running from the high temperature-side second meeting portion 200h to the high temperature-side first branch portion 200d by way of the condenser 120.

As a result, a heating medium can be circulated through all of the high temperature-side radiator 230, the heater core 220, and the battery heat exchanger 330 by the high temperature-side pump 210.

According to the present embodiment, as shown in FIG. 25 and FIG. 27 to FIG. 29, the first outlet port 112 of the high temperature-side four-way valve 10 lets cooling water flow out to the high temperature-side radiator 230 and the second outlet port 113 lets cooling water flow out to the heater core 220. Cooling water flows from the high temperature-side radiator 230 and the heater core 220 into the inlet port 111. When cooling water flows from the inlet port 111 to the first outlet port 112, the cooling water passes through the first flow hole 114a and then flows to the first outlet port 112. Further, the rotor 161 is rotated according to rotational motion of the motor 12 while being biased toward one side in the valve circumferential direction Dc by the coil spring 18 (refer to FIG. 3) and an opening of the first flow hole 114a is increased or reduced in conjunction with the rotation of the rotor 161.

Therefore, as in the valve device 10 in the first embodiment, a backlash in the gear mechanism 14 can be eliminated. As a result, a variation in an opening of the first flow hole 114a caused by a backlash in the gear mechanism 14 can be suppressed as compared with, for example, cases where energization in the valve circumferential direction Dc by the coil spring 18 (refer to FIG. 3) is absent.

For this reason, for example, control of a flow rate of cooling water passing through the first flow hole 114a, that is, control of a flow rate of cooling water flowing to the high temperature-side radiator 230 can be exercised with accuracy as compared with cases where energization in the valve circumferential direction Dc by the coil spring 18 is absent. This is the same with control of a flow rate of cooling water passing through the second and third flow holes 114b, 114d.

Attention will be focused on the above-mentioned dehumidification heating mode. In the dehumidification heating mode, both the first flow hole 114a and the second flow hole 114b are opened as shown in FIG. 31 and FIG. 41 and cooling water flows from the high temperature-side four-way valve 10 to both the high temperature-side radiator 230 and the heater core 220. For this reason, cooling water cooled on the high temperature-side radiator 230 side and cooling water passed through the heater core 220 meet each other and are mixed and cooling water at a temperature obtained as the result of the mixture flows to the heater core 220 again.

Therefore, in a mode in which cooling water flows to both the high temperature-side radiator 230 and the heater core 220 like the dehumidification heating mode, a flow rate of cooling water flowing to the high temperature-side radiator 230 has an influence on a temperature of blown air having heat applied thereto in the heater core 220 and flowing into the cabin. As a result, for example, if a flow rate of cooling water flowing to the high temperature-side radiator 230 cannot be controlled with accuracy in this mode, a variation will be prone to occur in a temperature of blown air with heat applied thereto in the heater core 220 (that is, a blown air temperature of the heater core 220).

Figure 44:
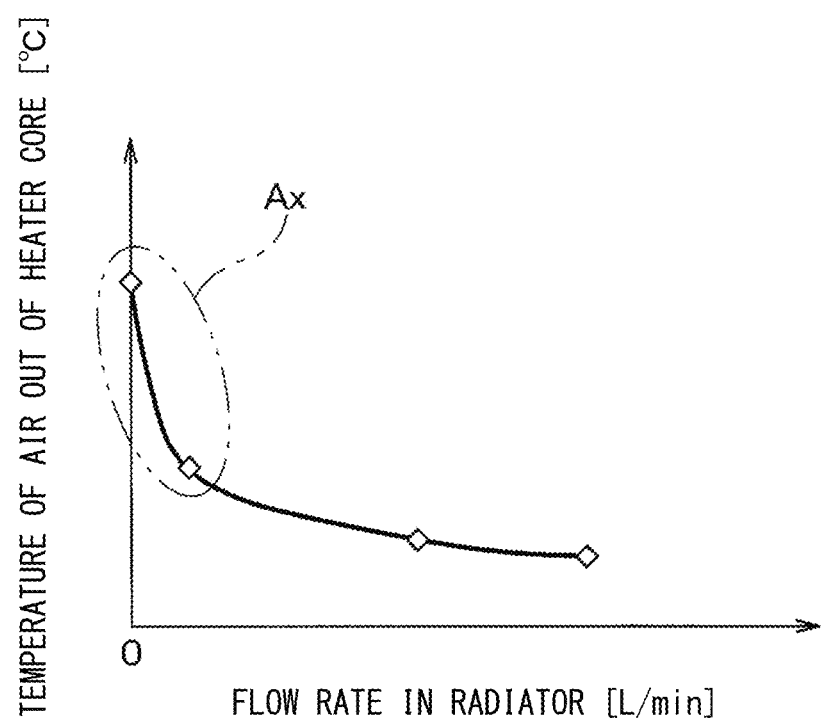
FIG. 44 is a drawing illustrating a relation between a radiator flow rate and a heater core blown air temperature in the 13th embodiment in a dehumidification heating mode.

Especially, in a low-flow rate region Ax where a radiator flow rate as a flow rate of cooling water flowing to the high temperature-side radiator 230 is low, as indicated in FIG. 44, a property that even a slight change in the radiator flow rate will largely change a blown air temperature of the heater core 220 is demonstrated. This property was found by the present inventors for the first time.

In consideration of the foregoing, use of the high temperature-side four-way valve 10 in the present embodiment allows a radiator flow rate to be controlled with accuracy. For example, a variation in a blown air temperature of the heater core 220 caused by a variation in radiator flow rate can be suppressed in the dehumidification heating mode. That is, an event in which a blown air temperature of the heater core 220 caused to fluctuate by incapability of controlling a radiator flow rate with accuracy can be avoided and heating performance of the heater core 220 can be enhanced.

The present embodiment is identical with the first embodiment except the foregoing. In the present embodiment, an effect brought about by a configuration element common to the first embodiment is obtained as in the first embodiment.

Though the present embodiment is a modification based on the first embodiment, the present embodiment can also be combined with any of the second to 12th embodiments.

Other Embodiments (1) In each of the above-mentioned embodiments, a fluid passing through the valve device 10 is cooling water but the fluid may be a fluid other than cooling water. A fluid passing through the valve device 10 may be a gas rather than a liquid.

(2) In each of the above-mentioned embodiments, the valve device 10 is mounted in, for example, an engine vehicle, a hybrid vehicle, or an electric vehicle but the applications of the valve device 10 are not limited to a vehicle.

(3) In each of the above-mentioned embodiments, a driving source for rotating the rotor 161 is the electric motor 12 as shown in FIG. 3, for example, but the driving source need not be motorized and any rotary apparatus other than a motor is acceptable.

(4) In the first embodiment, the rotor 161 and the fixed-side sealing surface 114c shown in FIG. 3 are both formed of resin. For example, either or both of the rotor 161 and the fixed-side sealing surface 114c may be formed of ceramic.

When either or both of the rotor 161 and the fixed-side sealing surface 114c are formed of ceramic as mentioned above, abrasion resistance of the rotor 161 to the fixed-side sealing surface 114c can be stabilized because ceramic is a low-friction material. As a result, an advantage is brought about. For example, designing for setting energization force Fc (refer to FIG. 4) in the valve circumferential direction Dc that is caused to act on the rotated part 16 by the coil spring 18 is facilitated.

(5) In the first embodiment, the valve device 10 is a three-way valve as shown in FIG. 1 but may be a two-way valve or a four-way valve.

(6) In the first embodiment, with the motor 12 side taken as the input side and the rotated part 16 side taken as the output side, the gear mechanism 14 decelerates rotation and transmits the rotation from the input side to the output side as shown in FIG. 5. This is just an example. For example, the gear mechanism 14 may accelerate rotation and transmit the rotation from the input side to the output side or may transmit rotation from the input side to the output side at a reducing ratio of 1.

(7) In the first embodiment, a movable range of the rotated part 16 in the valve circumferential direction Dc includes a non-biasing rotational position in which the coil spring 18 does not energize the rotated part 16 in the valve circumferential direction Dc. This is just an example. The movable range of the rotated part 16 may not include a non-biasing rotational position of the rotated part 16. For example, in whichever rotational position the rotated part 16 is within the above movable range, the coil spring 18 could energize the rotated part 16 toward one side in the valve circumferential direction Dc.

(8) In the first embodiment, the one end portion 181 of the coil spring 18 is coupled with the gear case 146 as shown in FIG. 3. This is just an example. The one end portion 181 of the coil spring 18 may be coupled with anywhere, including the housing 11 of the valve device 10, as long as the coil spring 18 can cause energization force Fc (refer to FIG. 4) in the valve circumferential direction Dc to act on the rotated part 16.

(9) In the first embodiment, the other end portion 182 of the coil spring 18 is coupled with the rotor 161. The present invention is not limited to this. For example, the other end portion 182 of the coil spring 18 could be coupled with the valve rotating shaft 162 or the fourth gear 144 (refer to FIG. 5).

(10) In the first embodiment, in whichever rotational position the rotated part 16 is within the first and second opening limiting ranges W1, W2, the rotated part is biased toward one side in the valve circumferential direction Dc as shown in FIG. 3 and FIG. 4. This is just an example. For example, the present invention may be so configured that: when the rotated part 16 is in a rotational position within the first opening limiting range W1, the rotated part is biased as mentioned above; but when the rotated part is out of the first opening limiting range W1, the rotated part is not biased as mentioned above even though the rotated part is in a rotational position within the second opening limiting range W2. Conversely, the present invention may be so configured that: when the rotated part 16 is in a rotational position within the second opening limiting range W2, the rotated part is biased as mentioned above; but when the rotated part is out of the second opening limiting range W2, the rotated part is not biased as mentioned above even though the rotated part is in a rotational position within the first opening limiting range W1.

(11) In the first embodiment, a range of a rotational position where the rotated part 16 is biased toward one side in the valve circumferential direction Dc by the coil spring 18 is not limited to the first or second opening limiting range W1, W2. This is just an example. The range of a rotational position where the rotated part 16 is biased toward one side in the valve circumferential direction Dc by the coil spring 18 may be limited to the first and second opening limiting ranges W1, W2.

(12) In the first embodiment, the coil spring 18 shown in FIG. 3 is twisted toward the side where a winding number of the coil spring 18 is increased at no load. This is just an example. For example, the coil spring 18 may be twisted toward the side where a winding number of the coil spring 18 is reduced at no load; and as a result, the coil spring may produce energization force Fc (refer to FIG. 4) biasing the rotated part 16 toward one side in the valve circumferential direction Dc. To adopt this configuration, a winding direction of the coil spring 18 only has to be reversed to that in the first embodiment.

(13) In the second embodiment, since a worm gear mechanism is adopted as a structure for restricting transmission of rotating force from the rotated part 16 to the motor 12 as shown in FIG. 7 and FIG. 8, the gear mechanism 14 is a worm gear mechanism. This is just an example. For example, a hypocycloid gear mechanism or a ratchet gear may be adopted as a structure for restricting transmission of rotating force from the rotated part 16 to the motor 12. In cases where a ratchet gear is adopted, a gear that is provided in a route of power transmission from the motor 12 to the rotated part 16 and is rotated integrally with the ratchet gear is the above-mentioned reverse transmission restricting gear.

(14) In the 13th embodiment, the vehicular temperature control device 1 has a function of cooling the battery 2 as shown in FIG. 25. Instead, a vehicular temperature control device 1 that does not have a function of cooling the battery 2 and includes a three-way valve in place of the high temperature-side four-way valve 10 is also possible. When this configuration is adopted, the three-way valve does not include the third outlet port 117 (refer to FIG. 27).

(15) In the first embodiment, a movable range of the rotated part 16 in the valve circumferential direction Dc includes a rotational position of the rotated part 16 where the first flow hole 114a is fully opened as well as a rotational position where the first flow hole 114a is fully closed as shown in FIG. 4. This is just an example. A movable range of the rotated part 16 may not include a rotational position of the rotated part 16 where the first flow hole 114a is fully opened or fully closed.

For example, in cases where a movable range of the rotated part 16 does not include a rotational position of the rotated part 16 where the first flow hole 114a is fully opened, the maximum opening of the first flow hole 114a within the movable range is smaller than the fully opened opening. Conversely, in cases where a movable range of the rotated part 16 does not include a rotational position of the rotated part 16 where the first flow hole 114a is fully closed, the minimum opening of the first flow hole 114a within the movable range is larger than the fully closed opening. This is the same with an opening of the second flow hole 114b and a movable range of the rotated part 16 in the valve circumferential direction Dc may include or may not include a rotational position of the rotated part 16 where the second flow hole 114b is fully opened or fully closed.

(16) In each of the above-mentioned embodiments, the control device 20 need not be an independent device and may be a control unit included in an onboard electronic control device as a functional part of the electronic control device.

(17) It should be appreciated that the present disclosure is not limited to the embodiments described above and can be modified appropriately within the scope of the appended claims. The embodiments above are not irrelevant to one another and can be combined appropriately unless a combination is obviously impossible.

(18) In the respective embodiments above, elements forming the embodiments are not necessarily essential unless specified as being essential or deemed as being apparently essential in principle. In a case where a reference is made to the components of the respective embodiments as to numerical values, such as the number, values, amounts, and ranges, the components are not limited to the numerical values unless specified as being essential or deemed as being apparently essential in principle.

Also, in a case where a reference is made to the components of the respective embodiments above as to materials, shapes and positional relations, the components are not limited to the materials, the shapes and the positional relations unless explicitly specified or limited to particular shapes and positional relations in principle.

What is claimed is:

1. A valve device through which a fluid flows for a vehicular temperature control device including a first heat exchanger exchanging heat between air outside a cabin and the fluid to radiate heat of the fluid to the air and a second heat exchanger exchanging heat between air flowing into the cabin and the fluid to heat the air, comprising:
   a driving source making a rotational motion;
   a rotated part provided rotatably around a predetermined axis;
   a fluid passage portion having a first flow hole and a second flow hole for passing the fluid;
   a gear mechanism having a plurality of gears to transmit the rotational motion of the driving source to the rotated part by engagement between the plurality of gears to rotate the rotated part;
   a biasing part biasing the rotated part toward one side in a circumferential direction about the predetermined axis;
   a first outlet port coupled with an upstream side, in a fluid flow, of the first heat exchanger and letting the fluid flow out to the first heat exchanger;
   a second outlet port coupled with an upstream side, in a fluid flow, of the second heat exchanger and letting the fluid flow out to the second heat exchanger; and
   an inlet port coupled with a downstream side, in a fluid flow, of the first heat exchanger and a downstream side of the second heat exchanger and into which the fluid flows from the first heat exchanger and the second heat exchanger, wherein
   the rotated part includes a rotor increasing or reducing an opening of the first flow hole and an opening of the second flow hole in conjunction with rotation of the rotated part,
   the biasing part biases the rotated part toward the one side in the circumferential direction by an energization force biasing the rotated part toward the one side in the circumferential direction,
   when the fluid flows from the inlet port to the first outlet port, the fluid passes through the first flow hole and then flows to the first outlet port, when the fluid flows from the inlet port to the second outlet port, the fluid passes through the second flow hole and then flows to the second outlet port, and the rotor increases or reduces the opening of the first flow hole by being rotated according to the rotational motion of the driving source while being biased toward the one side in the circumferential direction by the biasing part.

2. The valve device according to claim 1, wherein a movable range of the rotated part in the circumferential direction includes an opening limiting range within which an opening of the flow hole is smaller than a fully opened opening and larger than a fully closed opening, and when the rotated part is positioned within the opening limiting range, the biasing part biases the rotated part toward the one side in the circumferential direction.

3. The valve device according to claim 1, wherein the plurality of gears respectively have tooth flanks engaged with each other at least one point of engagement and in contact with a mating gear at the at least one point of engagement, and the biasing part biases the rotated part toward the one side in the circumferential direction and thereby, at every point of engagement, presses one tooth flank against the other tooth flank of a pair of tooth flanks in contact with each other at the point of engagement.

4. The valve device according to claim 1, wherein the plurality of gears include a driving-side gear provided in a route of power transmission from the driving source to the rotated part and a driven-side gear provided on a side of the rotated part relative to the driving-side gear in the route of power transmission, and the driving-side gear is configured to restrict transmission of rotating force from the driven-side gear to the driving source.

5. The valve device according to claim 1, wherein the biasing part has an elastic member that produces energization force biasing the rotated part toward the one side in the circumferential direction by elastic deformation of the biasing part.

6. A valve device through which a fluid flows, comprising:

a driving source making a rotational motion;

a rotated part provided rotatably around a predetermined axis;

a fluid passage portion having a flow hole for passing the fluid;

a gear mechanism having a plurality of gears to transmit the rotational motion of the driving source to the rotated part by engagement between the plurality of gears to rotate the rotated part; and a biasing part biasing the rotated part toward one side in a circumferential direction about the predetermined axis, wherein the rotated part includes a rotor increasing or reducing an opening of the flow hole in conjunction with rotation of the rotated part and is rotated according to the rotational motion of the driving source while being biased toward the one side in the circumferential direction by the biasing part, the biasing part has an elastic member that produces energization force biasing the rotated part toward the one side in the circumferential direction by elastic deformation of the biasing part, a movable range of the rotated part in the circumferential direction includes an opening limiting range within which an opening of the flow hole is smaller than a fully opened opening and is larger than a fully closed opening, and a rotational position where the biasing part does not bias the rotated part in the circumferential direction, and when the rotated part is positioned within the opening limiting range, the biasing part biases the rotated part toward the one side in the circumferential direction.

7. A valve device through which a fluid flows, comprising:

a driving source making a rotational motion;

a rotated part provided rotatably around a predetermined axis;

a fluid passage portion having a flow hole for passing the fluid;

a gear mechanism having a plurality of gears to transmit the rotational motion of the driving source to the rotated part by engagement between the plurality of gears to rotate the rotated part; and a biasing part biasing the rotated part toward one side in a circumferential direction about the predetermined axis, wherein the rotated part includes a rotor increasing or reducing an opening of the flow hole in conjunction with rotation of the rotated part, the biasing part is a coil spring wound around the predetermined axis and produces energization force biasing the rotated part toward the one side in the circumferential direction by elastic deformation of the biasing part twisted in the circumferential direction, the rotated part is rotated by the rotational motion of the driving source while being biased by the biasing part toward the one side in the circumferential direction, and the coil spring is disposed between the gear mechanism and the rotor in an axial direction of the predetermined axis, and is connected to the rotor.

8. The valve device according to claim 7, wherein the coil spring is disposed between the gear mechanism and the rotor in an axial direction of the predetermined axis, the rotated part includes an intermediate element extended in the axial direction and transmitting rotation between the gear mechanism and the rotor, and the intermediate element is inserted inside the coil spring.

9. The valve device according to claim 7, wherein the coil spring, the rotor, and the fluid passage portion are arranged and disposed in order of the coil spring, the rotor, and the fluid passage portion in an axial direction of the predetermined axis, and the coil spring is disposed at an upstream side of the rotor in a flow passage through which the fluid flows.

10. The valve device according to claim 7, wherein the biasing part includes a rotor coupling portion coupled with the rotor of the rotated part in such a manner that relative rotation is impermissible, and when the biasing part biases the rotated part toward the one side in the circumferential direction, the rotor coupling portion biases the rotor toward the one side in the circumferential direction.

11. The valve device according to claim 7 for a vehicular temperature control device including a first heat exchanger exchanging heat between air outside a cabin and the fluid and a second heat exchanger exchanging heat between air flowing into the cabin and the fluid, comprising:

a first outlet port coupled with an upstream side, in a fluid flow, of the first heat exchanger and letting the fluid flow out to the first heat exchanger;

a second outlet port coupled with an upstream side, in a fluid flow, of the second heat exchanger and letting the fluid flow out to the second heat exchanger; and an inlet port that is coupled with a downstream side, in a fluid flow, of the first heat exchanger and a downstream side of the second heat exchanger and into which the fluid flows from the first heat exchanger and the second heat exchanger, wherein when the fluid flows from the inlet port to the first outlet port, the fluid passes through the flow hole and then flows to the first outlet port.

* * * * *